US010703338B2

(12) United States Patent
Gaucher et al.

(10) Patent No.: US 10,703,338 B2
(45) Date of Patent: Jul. 7, 2020

(54) STREAMLINED FLAT WINDSCREEN WIPER

(71) Applicant: Valeo Systèmes d'Essuyage, Le Mesnil Saint Denis (FR)

(72) Inventors: Vincent Gaucher, Ennezat (FR); Stéphane Houssat, Blanzat (FR); Eric Poton, Pont du Château (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 627 days.

(21) Appl. No.: 14/800,985

(22) Filed: Jul. 16, 2015

(65) Prior Publication Data

US 2016/0016543 A1 Jan. 21, 2016

(30) Foreign Application Priority Data

Jul. 17, 2014 (FR) .................................... 14 56915
Sep. 16, 2014 (FR) .................................... 14 58713

(51) Int. Cl.
*B60S 1/38* (2006.01)
*B60S 1/40* (2006.01)

(52) U.S. Cl.
CPC ............. *B60S 1/3894* (2013.01); *B60S 1/381* (2013.01); *B60S 1/3806* (2013.01); *B60S 1/387* (2013.01); *B60S 1/3881* (2013.01); *B60S 1/4003* (2013.01); *B60S 1/4087* (2013.01); *B60S 2001/3815* (2013.01); *B60S 2001/3822* (2013.01); *B60S 2001/4035* (2013.01)

(58) Field of Classification Search
CPC ........................ B60S 2001/3815; B60S 1/3881
USPC ................................................... 15/250.201
See application file for complete search history.

(56) References Cited

U.S. PATENT DOCUMENTS

| 4,967,438 | A | * | 11/1990 | Arai | ........................ | B60S 1/4009 |
| | | | | | | 15/250.32 |
| 8,898,850 | B2 | | 12/2014 | Yoshimoto | | |
| 9,174,611 | B2 | | 11/2015 | Tolentino et al. | | |
| 2005/0166349 | A1 | * | 8/2005 | Nakano | .................. | B60S 1/3806 |
| | | | | | | 15/250.201 |
| 2008/0098559 | A1 | | 5/2008 | Machida et al. | | |
| 2011/0162161 | A1 | | 7/2011 | Amado | | |
| 2012/0096666 | A1 | * | 4/2012 | Yoshimoto | ............ | B60S 1/3801 |
| | | | | | | 15/250.33 |

(Continued)

FOREIGN PATENT DOCUMENTS

FR 2681028 A1 3/1993
WO 2011/152507 A1 12/2011

OTHER PUBLICATIONS

French Search Report issued in corresponding French Patent Application 1456915 dated Apr. 15, 2015 (7 pages).

*Primary Examiner* — Andrew A Horton
(74) *Attorney, Agent, or Firm* — Osha Liang LLP

(57) ABSTRACT

A streamlined flat windscreen wiper for a vehicle is disclosed. The flat wiper includes a longitudinal wiper blade, at least one longitudinal stiffening member, a longitudinal member for retaining the wiper blade and the stiffening member, a longitudinal streamlined portion including two terminal caps and a central mounting extending between the terminal caps and being connected thereto. The mounting includes means for fixing to the stiffening member or to the member for retaining the stiffening member, and each cap includes means for guiding in translation terminal parts of the member.

13 Claims, 42 Drawing Sheets

(56) References Cited

U.S. PATENT DOCUMENTS

2013/0269141 A1  10/2013  Ku

* cited by examiner

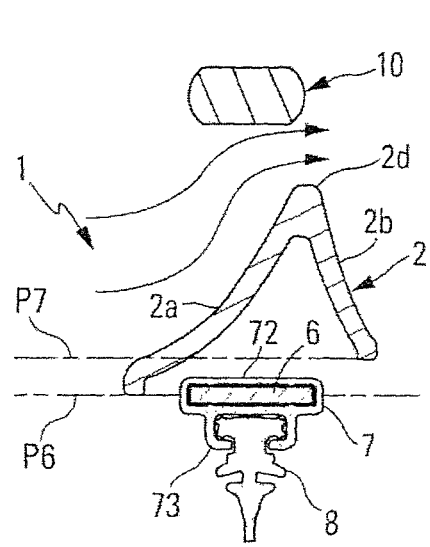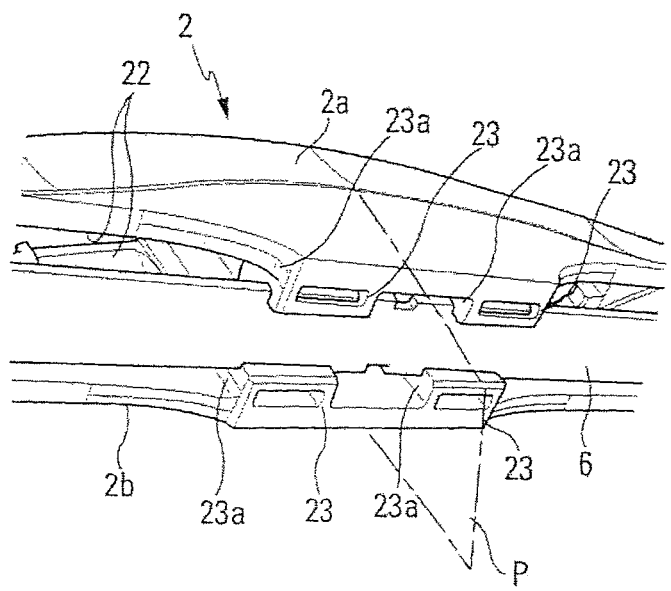
Fig. 6     Fig. 7
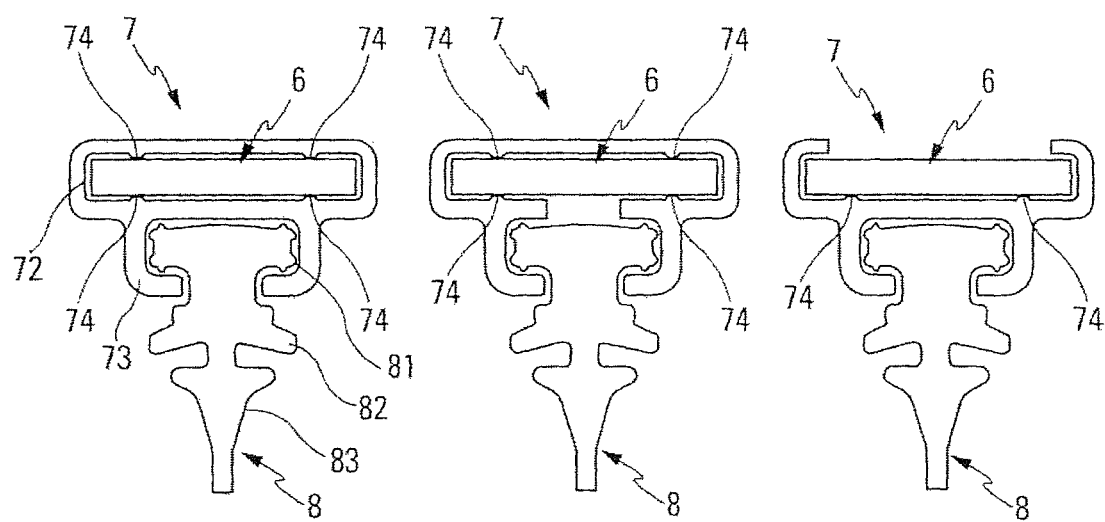
Fig. 8a     Fig. 8b     Fig. 8c

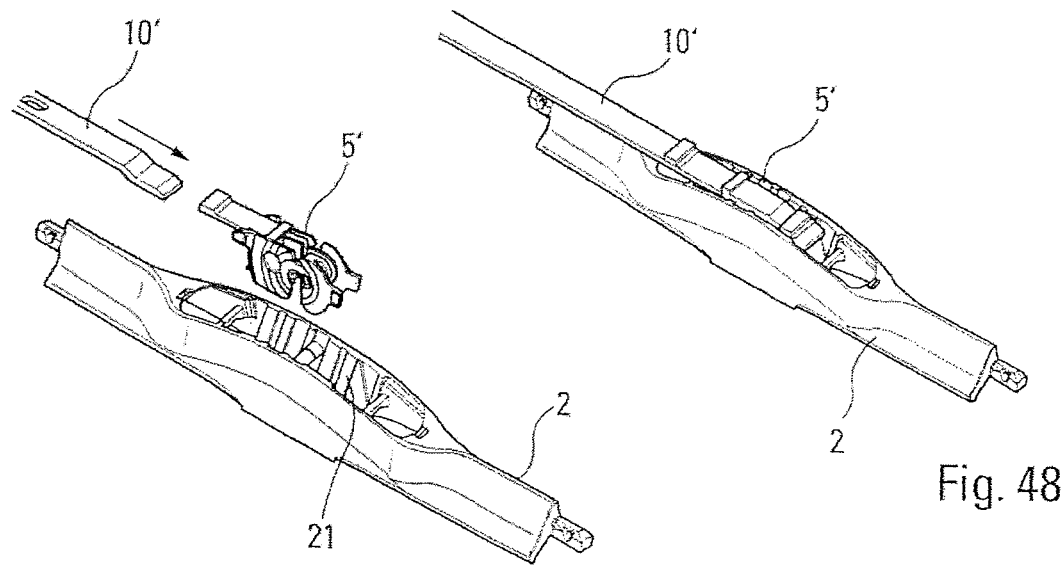
Fig. 48
Fig. 49
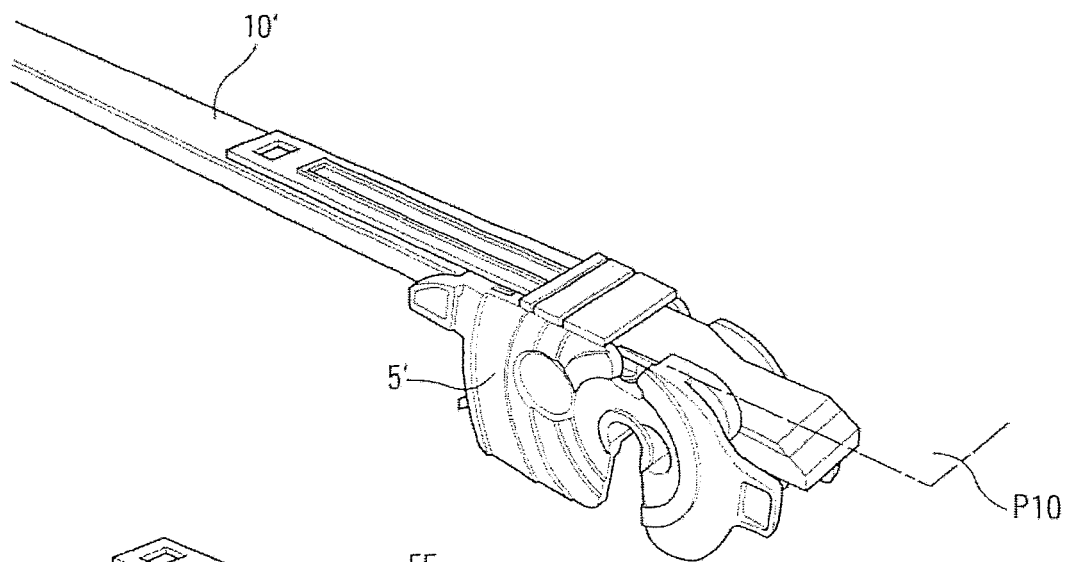
Fig. 50
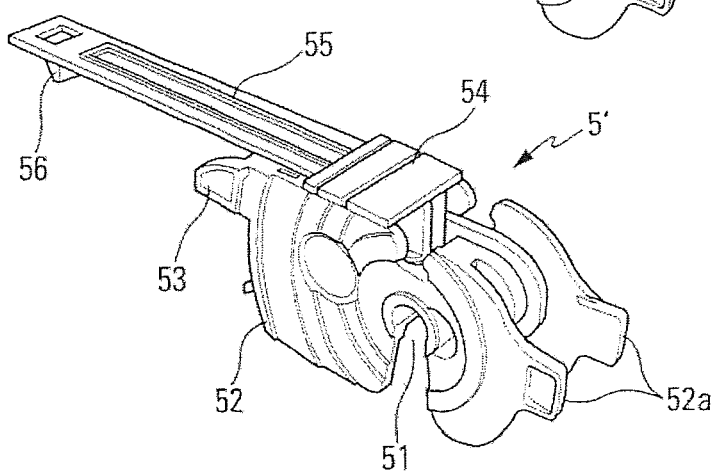
Fig. 51

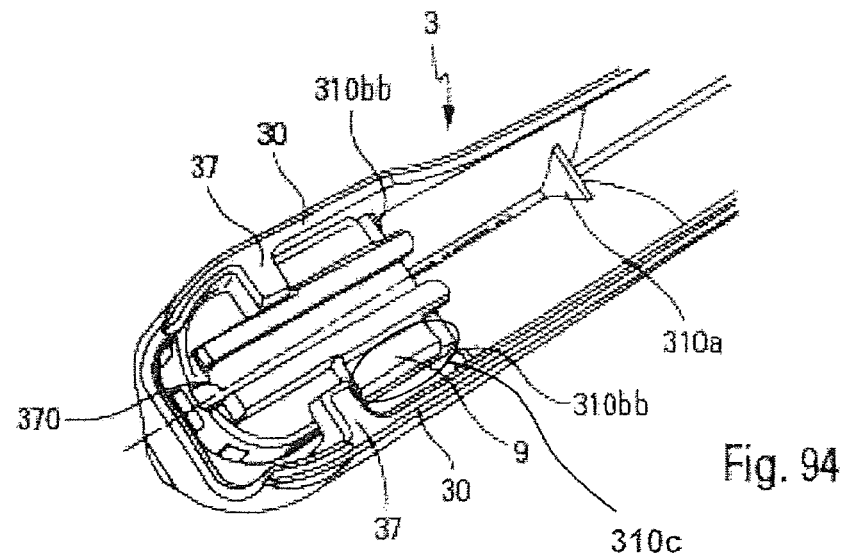
Fig. 94
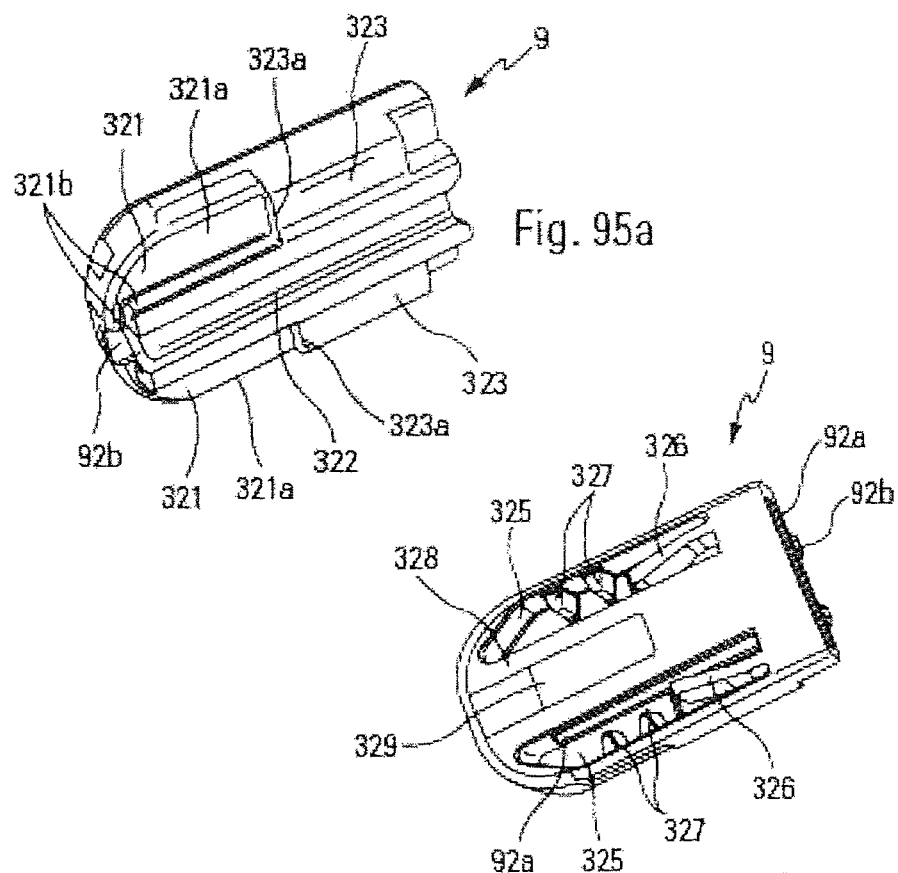
Fig. 95a
Fig. 95b

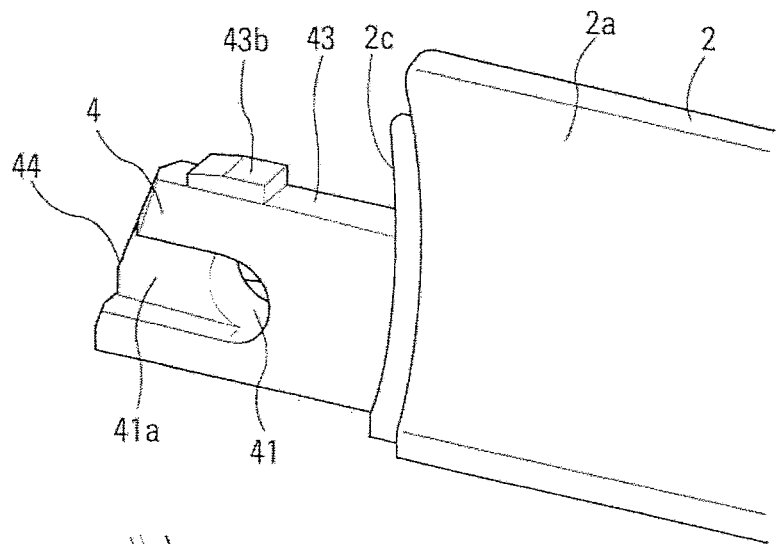
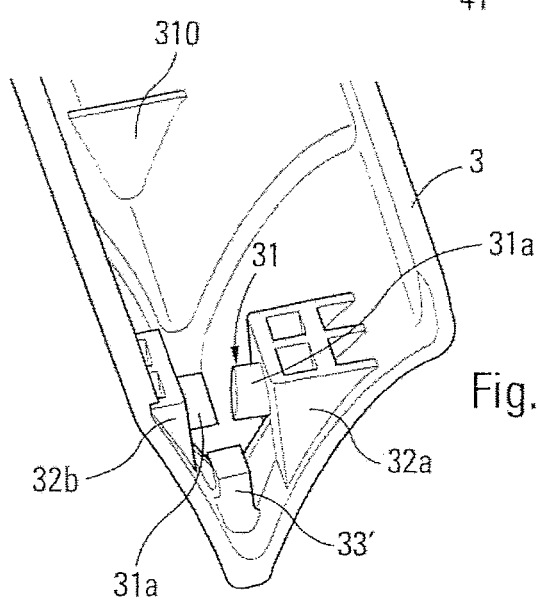
Fig. 101
Fig. 102
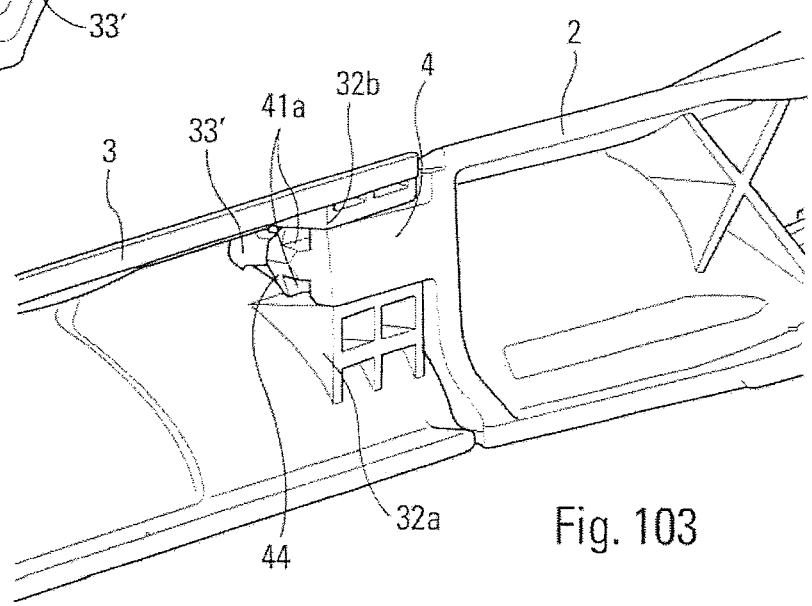
Fig. 103

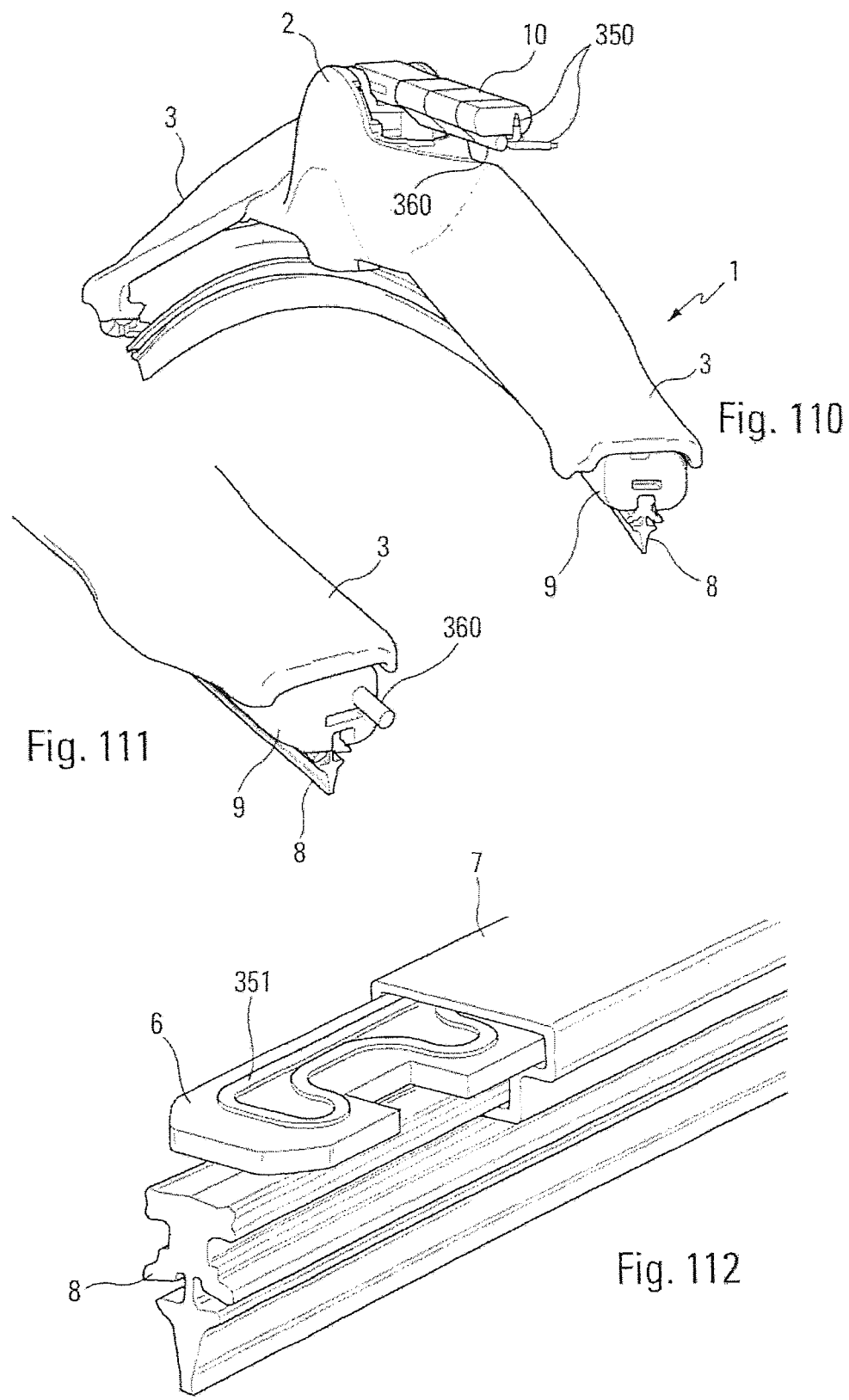

STREAMLINED FLAT WINDSCREEN WIPER

TECHNICAL FIELD

The present invention relates, in particular, to a streamlined flat windscreen wiper.

PRIOR ART

Typically, a windscreen wiper for a window such as the windscreen of a motor vehicle comprises, in particular, a wiper blade which is generally made of rubber and designed to rub against the window of the vehicle to remove water by driving it outside the field of vision of the driver. The wiper is carried by an arm which is driven by a motor in an angular reciprocal movement.

Two windscreen wiper technologies are known, in particular, one wiper technology using a swinging linkage in the form of articulated brackets which hold the wiper blade in a plurality of discrete positions and a further technology using a flat wiper (from the English "flat blade") in the form of a semi-rigid assembly which holds the wiper blade over the entire length thereof.

In both solutions, the wiper is attached to the rotating windscreen wiper arm by an assembly consisting of a mechanical connector and an adapter. The connector is a part which is fixed directly to the structure of the wiper or directly to the flat wiper, the adapter being an intermediate part which permits the fixing of the connector to the arm of the windscreen wiper. These two parts are connected together by a transverse pin which permits the relative rotation thereof.

Wiper technology based on swinging linkages is well known by the person skilled in the art. The application FR-A1-2 681 028 of the Applicant discloses, for example, a windscreen wiper having asymmetrical swinging linkages. A wiper having swinging linkages has the advantage of the wiper blade being applied against the window of the vehicle with a pressure which is relatively uniform over the entire length of the wiper. However, this technology has drawbacks such as, in particular, the space requirement thereof.

Flat wiper technology is also well known to the person skilled in the art. In this case, the wiper is provided with at least one longitudinal stiffening member which stiffens the wiper blade, so as to promote the application of this blade onto the window of the vehicle. This stiffening member is curved and the curvature thereof enables the blade to be held flattened against the window, even at the longitudinal ends of the wiper.

It has already been proposed to streamline a windscreen wiper in order to optimize, in particular, the aerodynamics thereof. It is thus known to provide a wiper having swinging linkages with a streamlined portion.

The Applicant has sought to improve a flat windscreen wiper by providing said wiper with a streamlined portion and thus proposes a streamlined flat windscreen wiper.

SUMMARY OF THE INVENTION

In the present application, a flat blade means a blade notably comprising at least one curving stiffening member or spline. This curving stiffening member is a means of spreading a load over the length of the wiper, such a load being generated by the wiper drive arm so as to press the wiper firmly against the surface that is to be wiped.

A streamlined flat wiper means a flat wiper, for example as mentioned hereinabove, provided with a streamlined portion. A streamlined portion means generally profiled external equipment. Such a streamlined portion covers widthwise and lengthwise the structure of the flat wiper.

The invention has several embodiments, the features thereof naturally being able to be combined with one another.

According to a first embodiment, the invention proposes an end piece for a streamlined flat windscreen wiper, in particular for a vehicle, comprising a first housing which is configured to receive one end of a stiffening member of the wiper, characterized in that it comprises over at least one of its external faces at least one protruding stop which is configured to cooperate with a terminal cap of the wiper.

This is particularly useful in the case where the terminal cap is liable to be displaced relative to the flat wiper, and in particular relative to the end piece of the flat wiper. The displacement path of the terminal cap relative to the end piece is thus limited by stops protruding from the end piece.

The invention may comprise one or more of the following features, said features also being able to be combined with one or more other features of one or more other embodiments of the invention:

- the end piece comprises two substantially parallel lateral external faces connected together by an upper external face,
- the upper external face comprises a protruding stop,
- at least one of the lateral external faces comprises a protruding stop,
- the or each stop has a bearing face oriented in a direction which is substantially parallel to a longitudinal axis of the end piece,
- the or each stop comprises an inclined part forming a ramp which is configured to cooperate with said terminal cap,
- the first housing has an elongated shape and comprises an open longitudinal end for the engagement of the end of the stiffening member in said housing, and a closed longitudinal end,
- the end piece comprises a second housing which is configured to receive one end of a wiper blade of the wiper and/or a third housing which is configured to receive one end of a member for retaining said blade.

The invention also proposes a terminal cap for a streamlined flat windscreen wiper, in particular for a vehicle, said cap having a generally elongated shape and comprising at one longitudinal end two substantially parallel lateral flanges defining relative to one another a space which is configured to receive an end piece of the wiper, characterized in that it comprises at least one protruding stop which is configured to cooperate with said end piece.

It should be noted that the streamlined portion, and in particular the central mounting and its terminal caps is a rigid element, this means that a such element does not need another wiper blade's structure element to keep the shape, contrary to the rubber blade itself, that needs it.

The invention may comprise one or more of the following features, said features also being able to be combined with one or more other features of one or more other embodiments of the invention:

- the lateral flanges comprise substantially parallel internal faces, at least one of said internal faces comprising a protruding stop,
- said longitudinal end comprises a transverse flange for connecting said lateral flanges, said transverse flange defining a protruding stop,
- the or each stop has a bearing face oriented in a direction substantially parallel to a longitudinal axis of the cap, the or each stop comprises an inclined part forming a ramp which is configured to cooperate with the end piece.

The invention also proposes an assembly comprising an end piece and a terminal cap as disclosed above.

The invention also proposes a streamlined flat windscreen wiper, in particular for a vehicle, comprising an end piece and/or a terminal cap as disclosed above.

According to a second embodiment, the invention relates to an assembly comprising a central mounting and a terminal cap for a streamlined flat windscreen wiper, in particular for a vehicle, the mounting comprising means for fixing to a stiffening member of the wiper or to a member for retaining said stiffening member, the central mounting forming one element and the terminal cap forming a further element, one of said elements bearing the means for articulation of the other of said elements about at least one pin, characterized in that said elements comprise protruding stops which are configured to cooperate together and to define an extreme pivoting position of the elements relative to one another about said pin.

The central mounting of the streamlined portion may be incorporated in a connector of the prior art since it comprises means for fixing to the flat wiper, and, in particular, to its stiffening member or to its member for retaining. The mounting and the end piece are articulated and may pivot relative to one another. The protruding stops enable the angular displacement to be limited and accurately define an extreme pivoting position.

The invention may comprise one or more of the following features, said features may also be combined with one or more other features of one or more other embodiments of the invention:
- a first of the elements comprises a protruding finger which is articulated relative to a second of the elements,
- the finger carries a pivot pin or comprises an orifice traversed by a pivot pin,
- the pivot pin is defined by journals carried by the finger and housed at least partially in recesses of said second element, or carried by the second element and housed at least partially in recesses or a through-orifice of the finger,
- the finger comprises a free end forming one of said stops,
- the free end of the finger comprises at least one chamfer defining a stop face,
- the finger has a substantially parallelepipedal elongated shape and comprises an upper longitudinal face which is substantially parallel to said pin and on which is formed at least one of said stops,
- the second element comprises at least two lateral longitudinal walls defining relative to one another a space which is configured to receive said finger, at least one of said walls comprising at least one of said stops which extends in said space,
- the or one stop of the second element is formed by a longitudinal or transverse rib,
- one longitudinal edge of a first of said longitudinal walls of the second element is connected to a longitudinal edge of a second of the longitudinal walls of the second element so that the second element has a substantially dihedral shape,
- the or one stop extends in said space from a connecting area of said longitudinal walls,
- the or one stop of the second element comprises a free edge or a chamfered free end defining a bearing face,
- said first element is the central mounting and said second element is the terminal cap,
- at least one of said elements comprises or forms an air baffle, that is to say an aerodynamic baffle, also called spoiler The invention further proposes a streamlined flat windscreen wiper, in particular for a vehicle, comprising an assembly as disclosed above.

According to a third embodiment, the invention relates to a central mounting for a streamlined flat windscreen wiper, in particular for a vehicle, comprising means for fixing to a stiffening member of the wiper or to a member for retaining said stiffening member, and an aperture which is configured to receive an adapter for connecting the wiper to a drive arm of said wiper, said aperture having an elongated shape and extending between two longitudinal lateral walls, between which extends a transverse pin for the resilient clipping and articulation of the adapter, characterized in that the aperture is configured to permit the mounting of the adapter and the clipping thereof to said pin in a first position in which a first longitudinal end of the adapter is oriented toward a first longitudinal end of the aperture, and in a second position in which said first longitudinal end of the adapter is oriented toward a second opposing longitudinal end of the aperture.

As in the prior art, the wiper is designed to be provided with an adapter for connecting the arm to the wiper and, in particular, to the mounting of the wiper which forms a connector, as disclosed above. The invention is particularly advantageous here as it permits the mounting of the adapter in either direction in the aperture of the mounting. It is thus conceivable to mount the same type of wiper on the two wiper arms of a vehicle windscreen.

In the present application, "resilient clipping" is understood as resilient interlocking, also called clipping.

The invention may comprise one or more of the following features, said features also being able to be combined with one or more other features of one or more other embodiments of the invention:
- the aperture has a symmetry relative to a central longitudinal plane,
- the aperture has a symmetry relative to a central transverse plane,
- said longitudinal lateral walls comprise on the internal faces notches or recesses for receiving and displacing portions of the adapter,
- the mounting comprises an aerodynamic baffle,
- the mounting has an elongated shape and comprises at each of its longitudinal ends means for articulation on a terminal cap of the wiper,
- the means for fixing comprise at least one pair of lateral hooks extending spaced apart from one another and each defining a longitudinal notch which is configured to receive said stiffening member by longitudinal sliding,
- the fixing means comprise two pairs of hooks which are axially spaced apart from one another,
- a transverse plane passing through said pin passes substantially between the two pairs of hooks and is equidistant therefrom.

The invention further proposes an assembly comprising a central mounting as disclosed above and an adapter for connecting to a drive arm of the wiper.

The invention may comprise one or more of the following features, said features also being able to be combined with one or more other features of one or more other embodiments of the invention:
- the adapter comprises two lateral flanges which are substantially parallel and connected together by a central portion defining a cylindrical housing for receiving the mounting pin by resilient clipping, at least one of said lateral flanges of the adapter comprises a lug oriented on the side opposing the other lateral flange and designed to be housed in a notch or recess of the mounting.

The invention further relates to a streamlined flat windscreen wiper, in particular for a vehicle, comprising a central mounting or an assembly as disclosed above.

According to a fourth embodiment, the invention relates to an assembly comprising a central mounting for a streamlined flat windscreen wiper, in particular for a vehicle, and an adapter for connecting the wiper to a drive arm of said wiper, the mounting comprising means for fixing to a stiffening member of the wiper or to a member for retaining said stiffening member, the mounting further comprising an aperture for housing said adapter, said aperture having an elongated shape and extending between two longitudinal lateral walls of the mounting, between which extends a transverse pin for the articulation of the adapter, the adapter having a generally elongated shape and comprising two longitudinal lateral flanges connected together by a central portion defining a cylindrical housing for receiving the pin by resilient clipping, characterized in that, in the mounted position, a first circumference centred on said pin and passing substantially through a first longitudinal end of the adapter has a maximum radius which is less than a minimum radius of a second circumference centred on said pin and passing substantially through the means for fixing the mounting.

This makes it possible to increase the angular displacement of the adapter about the transverse pin. More specifically, the end of the adapter is designed not to be able to come into abutment against the means for fixing the mounting, during the rotation of the adapter about the base.

The invention may comprise one or more of the following features, said features also being able to be combined with one or more other features of one or more other embodiments of the invention:

the maximum radius ranges between 10 and 20 mm, preferably between 12 and 18 mm, and more preferably between 14 and 16 mm, the minimum radius is greater by at least 1 mm than the maximum radius, the means for fixing comprise at least one pair of lateral hooks extending spaced apart from one another and each comprising a longitudinal notch which is configured to receive said stiffening member by longitudinal sliding, the means for fixing comprise two pairs of hooks which are axially spaced apart from one another, a transverse plane passing through said pin passes substantially between the two pairs of hooks and is equidistant therefrom, the adapter comprises, in the region of its second longitudinal end, a lateral stop lug which is configured to cooperate with the mounting and to define an extreme pivoting position of the adapter relative to the mounting about said pin, said aperture is symmetrical relative to a central longitudinal plane, said aperture is symmetrical relative to a central transverse plane, said longitudinal lateral walls comprise, on the internal faces, notches or recesses for receiving and displacing at least one lug of the adapter, the mounting comprises an aerodynamic baffle, the mounting has an elongated shape and comprises at each of its longitudinal ends means for articulation on a terminal cap of the wiper.

The invention further relates to a streamlined flat windscreen wiper, in particular for a vehicle, comprising an assembly as disclosed above.

According to a fifth embodiment, the invention relates to a terminal cap for a streamlined flat windscreen wiper, in particular for a vehicle, comprising means for slidable guiding which are configured to cooperate with a longitudinal member for retaining a wiper blade of the wiper, characterized in that said means for guiding comprise two substantially L-shaped lateral hooks, which are configured to extend on each side of said member, each hook comprising a substantially vertical part, the lower end thereof being connected to a substantially horizontal part extending on the side of the other hook, and the vertical part of at least one of said hooks comprising means for bearing at regular intervals against said member. In this aspect of the invention, the longitudinal retaining member could be one or more stiffening members, also called spline, belonging to the wiper.

The bearing of the hooks at regular intervals against the member enables the friction to be limited and the guidance of the member to be optimized. They may also permit the problem of manufacturing tolerances in the parts to be avoided.

The invention may comprise one or more of the following features, said features also being able to be combined with one or more other features of one or more other embodiments of the invention:

the vertical parts of the two hooks comprise means for bearing at regular intervals against said member, the vertical part of the or each hook comprises a lug, the free end thereof being configured to cooperate with said member, the lug or each lug has a generally rounded shape, the lug is substantially located in the centre of the vertical part of the or each hook, the upper ends of the vertical parts of the hooks are connected together by an upper wall comprising means for bearing at regular intervals against said member, the means for bearing at regular intervals of the upper wall comprise at least one lug, the lug of the upper wall has a generally rounded shape, the lug is located substantially in the centre of the upper wall, the hooks, and possibly said upper wall, are defined by a transverse wall of the cap, the cap has a substantially dihedral shape in section and comprises two longitudinal walls which are connected together and define relative to one another a housing for mounting said member, the transverse wall connects the two longitudinal walls of the cap, the transverse wall is a stiffening wall of the cap.

The invention further relates to an assembly comprising a cap as disclosed above and a member for retaining a wiper blade which is slidably mounted between the hooks of the cap.

The invention further relates to a streamlined flat windscreen wiper, in particular for a vehicle, comprising a cap as disclosed above.

According to a sixth embodiment, the invention relates to a central capped mounting for a streamlined flat windscreen wiper, in particular for a vehicle, having an aperture which is configured to receive an adapter for connecting the wiper to a drive arm of said wiper, the aperture having an elongated shape, characterized in that it comprises at least one capping for the partial closing of said aperture which is detachably fixed to the mounting.

In the present application, a "capping" is understood as an element which defines a generally profiled external face and which may be used to seal an aperture, for example.

In the aforementioned case, the capping enables the aperture of the mounting to be closed and the appearance and the aerodynamics thereof to be improved. It is thus conceivable to provide an aperture of large dimensions in the mounting, for example to facilitate the mounting of the adapter, without otherwise impairing the appearance or the aerodynamics of the wiper.

The invention may comprise one or more of the following features, said features also being able to be combined with one or more other features of one or more other embodiments of the invention:
- the mounting comprises two cappings for closing the aperture,
- a first capping is configured to seal a longitudinal end part of the aperture and a second capping is configured to seal an opposing longitudinal end part of the aperture,
- the or each capping is fixed to the mounting by resilient clipping or interlocking,
- the or each capping comprises at least one tab which is configured to cooperate by interlocking with a recess having a shape which is substantially complementary to the mounting,
- the or each capping comprises at least one resiliently deformable hook which is configured to cooperate by resilient clipping with a complementary means of the mounting,
- the or at least one capping is pivotably mounted about a pin carried by the mounting,
- the or each pin is located in the vicinity of a longitudinal end of the aperture,
- the or each capping comprises means for resilient clipping to the corresponding pin,
- the or each capping comprises means for retaining by abutment which are configured to cooperate with said adapter,
- the or each capping comprises a non-planar external face,
- said aperture has an elongated shape and extends between two longitudinal lateral walls of the mounting, a transverse pin extending therebetween for the articulation of the adapter,
- the mounting has an elongated shape and comprises at each of its longitudinal ends means for articulation on a terminal cap of the wiper,
- the mounting comprises means for fixing to a stiffening member of the wiper or to a member for retaining said stiffening member.

The invention further relates to a streamlined flat windscreen wiper, in particular for a vehicle, comprising a mounting as disclosed above.

According to a seventh embodiment, the invention relates to a central mounting for a streamlined flat windscreen wiper, in particular for a vehicle, comprising an aperture which is configured to receive an adapter for connecting the wiper to a drive arm of said wiper, the aperture having an elongated shape and extending between two longitudinal lateral walls of the mounting, characterized in that the lateral walls are connected together by removable means for connecting and stiffening.

The means for connecting extend between the lateral walls of the mounting and stiffen said mounting. The means for connecting, however, may hinder the mounting of the adapter in the aperture. According to the invention, said means for connecting are removable and may be removed temporarily or permanently, for example, so as to facilitate the mounting of the adapter.

The invention may comprise one or more of the following features, said features also being able to be combined with one or more other features of one or more other embodiments of the invention:
- the means for connecting and stiffening are able to be broken, cut off or dismantled,
- the means for connecting and stiffening comprise at least one crossmember,
- the or each crossmember has an elongated bar shape,
- the or each crossmember is shaped by a material bridge,
- the or each crossmember comprises at least one weakened portion,
- the means for connecting and stiffening comprise two crossmembers which are arranged symmetrically relative to a transverse plane passing substantially through the centre of the slot,
- the mounting has an elongated shape and comprises at each of its longitudinal ends means for articulation on an end cap of the wiper,
- the mounting comprises means for fixing to a stiffening member of the wiper or to a member for retaining said stiffening member,
- said aperture has an elongated shape and extends between two longitudinal lateral walls of the mounting, a transverse pin extending therebetween for articulation of the adapter,
- said aperture comprises at each of its longitudinal ends a transverse pin for mounting a capping for partial closing of the aperture.

The invention further relates to a streamlined flat windscreen wiper, in particular for a vehicle, comprising a mounting as disclosed above.

The invention further relates to a method for mounting a wiper as disclosed above, characterized in that it comprises a step consisting in removing at least one of the means for connecting and stiffening from the mounting before mounting the adapter in the aperture thereof.

According to an eighth embodiment, the invention relates to a streamlined portion for a streamlined flat windscreen wiper, in particular for a vehicle, comprising two terminal caps and a central mounting which is located between the two terminal caps and which comprises means for fixing to a stiffening member of the wiper or to a member for retaining said stiffening member, the mounting further comprising an aperture which is configured to receive an adapter for connecting the wiper to a drive arm of said wiper, characterized in that the caps are connected to the mounting by means for connecting which prevent any displacement of the caps relative to the mounting.

For some wipers, such as short wipers, it may detrimental to have terminal caps which are mobile relative to the central mounting. The invention enables this problem to be resolved by preventing any displacement of the caps relative to the mounting.

The invention may comprise one or more of the following features, said features also being able to be combined with one or more other features of one or more other embodiments of the invention:
- the means for connecting the mounting to each cap comprise means for articulation,
- each cap is connected by a pivot pin to a longitudinal end of the mounting, each cap comprises at least one stop which is configured to prevent any rotation of the cap relative to the mounting about said pin, said at least one stop is configured to cooperate with a finger protruding from the mounting, said finger carries said pin or comprises an orifice traversed by said pin, the mounting and/or each terminal cap comprises or forms an aerodynamic baffle, the mounting and/or each terminal cap has in cross section a substantially dihedral shape on at least one part of its longitudinal dimension, the mounting comprises an aperture which is configured to receive an adapter for connecting the wiper to a drive arm of said wiper.

The invention further relates to a streamlined flat windscreen wiper, in particular for a vehicle, comprising a streamlined portion as disclosed above.

According to a ninth embodiment, the invention relates to a streamlined portion for a streamlined flat windscreen wiper, in particular for a vehicle, comprising two terminal caps and a central mounting which is located between the two terminal caps and which comprises means for fixing to a stiffening member of the wiper or to a member for retaining said stiffening member, the mounting further comprising an aperture which is configured to receive an adapter for connecting the wiper to a drive arm of said wiper, characterized in that the caps are produced in one piece with the mounting. In order to stiffen the central mounting and the terminal caps forming a single piece, this embodiment comprises at least one stiffening rib that may take the form of a crossbar and/or of a strip of extension perpendicular or substantially perpendicular to the longitudinal lateral walls concerned.

This permits, in particular, the manufacture of the streamlined portion to be simplified.

According to one embodiment, the streamlined portion thus produced has a length ranging between 250 mm and 350 mm, and preferably of 300 mm.

The invention may comprise one or more of the following features, said features also being able to be combined with one or more other features of one or more other embodiments of the invention:

the streamlined portion comprises at least one defining mark extending between the mounting and each cap, said at least one defining mark comprises a groove, the mounting and/or each terminal cap comprises or forms an aerodynamic baffle, the mounting and/or each terminal cap has in cross section a substantially dihedral shape over at least one part of its longitudinal dimension, the mounting comprises an aperture which is configured to receive an adapter for connecting the wiper to a drive arm of said wiper, the streamlined portion comprises means for guiding in translation a member for retaining the wiper blade and/or a stiffening member.

The invention further relates to a streamlined flat windscreen wiper, in particular for a vehicle, comprising a streamlined portion as disclosed above.

According to a tenth embodiment, the invention relates to a central mounting for streamlined flat windscreen wiper, in particular for a vehicle, the mounting having an elongated shape and comprising at each of its longitudinal ends means for connecting to a terminal cap of the wiper, the mounting further comprising means for fixing to a stiffening member of the wiper or to a member for retaining said stiffening member, characterized in that it further comprises or forms an aerodynamic baffle.

The aerodynamic baffle forms an air intake and during use enables the wiper to be maintained in the bearing position against the windscreen.

The invention may comprise one or more of the following features, said features also being able to be combined with one or more other features of one or more other embodiments of the invention:

the fixing means are formed on the central mounting between the two connecting means, in such a case, the fixing means are formed equidistant from the two connecting means, the fixing means are formed in line with an aperture made in an upper face of the central mounting, such an aperture being intended notably to receive at least an adapter for connection to an arm. "In line with the aperture" means that the fixing means are formed on the central mounting between a first plane passing through a first longitudinal end of the aperture and a second plane passing through a second longitudinal end of the aperture, the connection means to the central mounting are positioned inside a dihedron formed by longitudinal walls of the terminal cap, the means for connecting are means for articulation, the mounting comprises at each of its longitudinal ends a protruding finger carrying a pivot pin or comprising an orifice which is configured to be traversed by a pivot pin, the finger protruding from the longitudinal end of the central mounting forms one embodiment of a means of connection mentioned in this text, the mounting comprises two longitudinal lateral walls, one longitudinal edge of a first of said walls being connected to a longitudinal edge of a second of said walls so as to form substantially a dihedron at least in the region of the longitudinal ends of the mounting, each finger extends from a transverse wall for connecting said longitudinal lateral walls, each finger has an axis of elongation which extends in a longitudinal plane which is substantially perpendicular to said corresponding pivot pin and which passes substantially through said longitudinal edges, each finger has a generally substantially parallelepipedal shape, the mounting further comprises an aperture which is configured to receive an adapter for connecting the wiper to a drive arm of said wiper, said axis of elongation of each finger being substantially parallel and spaced apart from a central longitudinal plane of the aperture.

The invention further relates to a terminal cap for a streamlined flat windscreen wiper, in particular for a vehicle, the cap having an elongated shape and comprising at at least one of its longitudinal ends means for connecting to a central mounting of the wiper, characterized in that it further comprises or forms an aerodynamic baffle.

The invention may comprise one or more of the following features, said features also being able to be combined with one or more other features of one or more other embodiments of the invention:

the means for connecting are means for articulation, said longitudinal end carries a pivot pin or comprises at least one orifice which is configured to receive a pivot pin, the cap comprises two longitudinal lateral walls, one longitudinal edge of a first of said walls being connected to a longitudinal edge of a second of said walls so as to form substantially a dihedron, said pin or said orifice is carried by or is formed on at least one reinforcement of at least one of said longitudinal lateral walls.

The invention further relates to an assembly comprising a mounting and a cap as disclosed above.

The invention further relates to a streamlined flat windscreen wiper, in particular for a vehicle, comprising a mounting and/or a cap as disclosed above.

According to an eleventh embodiment, the invention relates to a central mounting for a streamlined flat windscreen wiper, in particular for a vehicle, the mounting having an elongated shape and comprising at each of its longitudinal ends means for connecting to a terminal cap of the wiper, the mounting further comprising means for fixing to a stiffening member of the wiper or to a member for retaining said stiffening member, characterized in that it comprises at each of its longitudinal ends a first peripheral edge which is configured to be at least partially engaged in a longitudinal end of the corresponding cap and to be at least partially covered by a second peripheral edge of said longitudinal end of the cap.

This permits the passage of air between the mounting and cap to be limited or even prevented, in particular during use, and thus the aerodynamics of the wiper to be improved. This also permits the appearance thereof to be improved. Such a structure makes it possible further to minimize the risk of trapping when handling it because the peripheral edge reduces the angle of opening. Furthermore, this structure of the peripheral edges is perfectly compatible with the method of assembling the streamlined flat wiper.

The invention may comprise one or more of the following features, said features also being able to be combined with one or more other features of one or more other embodiments of the invention:

the means for connecting are means for articulation,
the mounting comprises two longitudinal lateral walls, one longitudinal edge of a first of said walls being connected to a longitudinal edge of a second of said walls so as to form substantially a dihedron at least in the region of the longitudinal ends of the mounting,
the means for connecting extend from the transverse walls for connecting said longitudinal lateral walls,
each first edge is defined by the external periphery of one of said transverse walls,
each first edge extends over the entire transverse extent of said longitudinal walls,
each first edge extends over the entire height of said longitudinal walls,
each first edge is formed by a groove of the external periphery of the mounting,
each first edge has an axial dimension ranging approximately between 1 and 5 mm, and preferably between 1 and 3 mm.

The invention further relates to an assembly comprising a mounting as disclosed above and a terminal cap.

The invention further relates to a terminal cap for a streamlined flat windscreen wiper, in particular for a vehicle, the cap having an elongated shape and comprising at one of its longitudinal ends means for connecting to a central mounting of the wiper, characterized in that it comprises at this longitudinal end a second peripheral edge which is configured to be at least partially engaged in or on one longitudinal end of the mounting and to cover at least partially a first peripheral edge of said longitudinal end of the mounting.

The means for connecting may be means for articulation.

The invention further relates to an assembly comprising a terminal cap as disclosed above and a central mounting.

The invention further relates to a streamlined flat windscreen wiper, in particular for a vehicle, comprising a mounting or a cap as disclosed above.

According to a twelfth embodiment, the invention relates to a central mounting for a streamlined flat windscreen wiper, in particular for a vehicle, the mounting having an elongated shape and comprising means for fixing to a stiffening member of the wiper or to a member for retaining said stiffening member, the mounting further comprising an aperture which is configured to receive an adapter for connecting the wiper to a drive arm of said wiper, characterized in that it comprises a baffle, one longitudinal upper edge thereof extending substantially parallel and spaced apart from a substantially vertical central longitudinal plane of the aperture and/or a substantially vertical central longitudinal plane of the means for fixing.

The edge of the baffle is thus offset in the transverse direction of the centre of the wiper. The longitudinal edge of the baffle is substantially or strictly parallel to the central longitudinal plane P1, along the entire length of the edge. This advantageous feature allows the air baffle to have the same aerodynamic performance spread over the entire length of the baffle.

The invention may comprise one or more of the following features, said features also being able to be combined with one or more other features of one or more other embodiments of the invention:

the mounting comprises two longitudinal lateral walls, one longitudinal edge of a first of said lateral walls being connected to a longitudinal edge of a second of said lateral walls so as to form said edge of the baffle,
said lateral walls form substantially a dihedron at least in the region of the longitudinal ends of the mounting,
the mounting comprises at each of its longitudinal ends means for connecting to a terminal cap of the wiper,
the means for connecting extend from transverse walls for connecting said longitudinal lateral walls,
the means for connecting are means for articulation,
the mounting comprises at each of its longitudinal ends a protruding finger carrying a pivot pin or comprising an orifice which is configured to be traversed by a pivot pin,
each finger has a longitudinal axis extending in a longitudinal plane which is substantially perpendicular to said corresponding pivot pin and which passes substantially through said edge,
each finger has a generally substantially parallelepipedal shape.

The invention further relates to an assembly comprising a mounting as disclosed above and a terminal cap.

The invention further relates to a streamlined flat windscreen wiper, in particular for a vehicle, comprising a mounting or an assembly as disclosed above.

According to a thirteenth embodiment, the invention relates to a central mounting for a streamlined flat windscreen wiper, in particular for a vehicle, the mounting having an elongated shape and comprising means for fixing to a stiffening member of the wiper or to a member for retaining said stiffening member, the mounting further comprising an aperture which is configured to receive an adapter for connecting the wiper to a drive arm of said wiper, the aperture having an elongated shape and extending between two longitudinal lateral walls, a pivot pin of said adapter extending therebetween, characterized in that said pin is located above a longitudinal plane which is substantially parallel to said pin and passes substantially through the upper ends of the longitudinal end parts of the mounting.

The pivot pin of the adapter is thus raised, which enables, in particular, a greater angular displacement of the arm relative to the wiper to be permitted.

The invention may comprise one or more of the following features, said features also being able to be combined with one or more other features of one or more other embodiments of the invention:
- at least in the region of the longitudinal end pieces of the mounting, one upper longitudinal edge of a first of said lateral walls is connected to an upper longitudinal edge of the second of said lateral walls so as to form an upper edge of an aerodynamic baffle, said longitudinal plane passing substantially through said upper edge of the longitudinal end parts of the mounting,
- said lateral walls form substantially a dihedron in the region of the longitudinal end parts of the mounting,
- in the region of said aperture of the mounting, the upper longitudinal edges of said lateral walls are spaced apart from one another to define the peripheral edges of said aperture,
- said peripheral edges of the aperture have upper ends located above said plane,
- said peripheral edges of the aperture have a generally rounded shape,
- the mounting comprises at each of its longitudinal ends means for connecting to a terminal cap of the wiper,
- the means for connecting extend from the transverse walls for connecting said longitudinal lateral walls,
- the means for connecting are means for articulation,
- the mounting comprises at each of its longitudinal ends a protruding finger carrying a pivot pin or comprising an orifice which is configured to be traversed by a pivot pin,
- each finger has an axis of elongation extending in a longitudinal plane which is substantially perpendicular to said corresponding pivot pin and which passes substantially through said edge,
- each finger has a generally substantially parallelepipedal shape.

The invention further relates to an assembly comprising a mounting as disclosed above and a terminal cap.

The invention further relates to a streamlined flat windscreen wiper, in particular for a vehicle, comprising a mounting or an assembly as disclosed above.

According to a fourteenth embodiment, the invention relates to an assembly of two streamlined portions for streamlined flat windscreen wipers, in particular for a vehicle, comprising a short streamlined portion and a long streamlined portion, each streamlined portion having an elongated shape and comprising two terminal caps and a central mounting which extends between the terminal caps and which comprises at its longitudinal ends means for connecting to the terminal caps, characterized in that the central mountings of the two streamlined portions are identical and thus interchangeable.

This is particularly advantageous as it enables the number of parts for the central mounting to be limited, a single part being able to serve, for example, for producing streamlined portions of several different lengths.

The invention may comprise one or more of the following features, said features also being able to be combined with one or more other features of one or more other embodiments of the invention:
- each mounting comprises means for fixing to a stiffening member or to a member for retaining said stiffening member,
- each mounting comprises an aperture which is configured to receive an adapter for connecting the wiper to a drive arm of said wiper,
- the aperture has an elongated shape and extends between two longitudinal lateral walls, a pivot pin of said adapter extending therebetween,
- the means for connecting are means for articulation,
- each mounting forms or comprises an aerodynamic baffle,
- each mounting comprises two longitudinal lateral walls, the first longitudinal edges thereof being connected together so that said walls form substantially a dihedron at least in the region of the longitudinal ends of the mounting,
- the dihedron defines an upper longitudinal edge of the mounting,
- said edge extends substantially parallel and spaced apart from a central longitudinal plane of the means for fixing the mounting,
- said longitudinal lateral walls comprise, opposite said first longitudinal edges, second longitudinal edges which are free or connected to longitudinal lateral flanges,
- the second longitudinal edge of one of said longitudinal lateral walls is substantially located in a first substantially horizontal longitudinal plane which is remote from a second substantially horizontal longitudinal plane passing substantially through the second longitudinal edge of the other of said longitudinal lateral walls,
- said lateral flanges are connected to means which are configured to guide in translation a member for retaining a wiper blade of the wiper,
- said lateral flanges are connected together by a transverse wall, a passage for the guidance of said member being formed therein,
- the mountings have a length ranging between 15 and 30 cm.

The invention further relates to a method for mounting streamlined portions for streamlined flat windscreen wipers, in particular for a vehicle, comprising a step of mounting a short streamlined portion and a step of mounting a long streamlined portion, each streamlined portion having an elongated shape and comprising two terminal caps and a central mounting which comprises at its longitudinal ends means for connecting to the terminal caps, characterized in that the step of mounting a short streamlined portion comprises the assembly of a first central mounting part to a first terminal cap part for the short streamlined portion, and in that the step of mounting a long streamlined portion comprises the assembly of said first central mounting part to a second terminal cap part for the long streamlined portion.

According to a fifteenth embodiment, the invention relates to a streamlined portion for a streamlined flat windscreen wiper, in particular for a vehicle, the streamlined portion having an elongated shape and comprising two terminal caps and a central mounting which extends between the terminal caps and which comprises at its longitudinal ends means for connecting to the terminal caps, the mounting comprising an aperture which is configured to receive an adapter for connecting the wiper to a drive arm of said wiper, the aperture having an elongated shape and extending between two longitudinal lateral walls, a transverse pin for the articulation of the adapter extending therebetween, characterized in that the ratio between the longitudinal distance between a first transverse plane passing substantially through said pin and a second transverse plane passing substantially through the means for connecting the mounting to each cap, and half of the length of the streamlined portion, ranges between 20 and 70%.

The invention may comprise one or more of the following features, said features also being able to be combined with one or more other features of one or more other embodiments of the invention:
- the ratio ranges between 25 and 65% and preferably between 27 and 59%,
- each mounting comprises means for fixing to a stiffening member or to a member for retaining said stiffening member,
- the means for connecting are means for articulation,
- at least one of the elements from the mounting and the caps forms or comprises an aerodynamic baffle,
- at least one of the elements from the mounting and the caps comprises two longitudinal lateral walls, the first longitudinal edges thereof being connected together so that said walls form substantially a dihedron over at least one part of the longitudinal dimension of the element,
- the dihedron defines an upper longitudinal edge of the mounting or the cap,
- said edge extends substantially parallel to and spaced apart from a central longitudinal plane of the aperture,
- said longitudinal lateral walls comprise, opposite said first longitudinal edges, second longitudinal edges which are free or connected to the longitudinal lateral flanges,
- the second longitudinal edge of one of said longitudinal lateral walls is located substantially in a first substantially horizontal longitudinal plane which is spaced apart from a second substantially horizontal longitudinal plane passing substantially through the second longitudinal edge of the other of said longitudinal lateral walls,
- said lateral flanges are connected to means which are configured to guide in translation a member for retaining a windscreen wiper blade,
- said lateral flanges are connected together by a transverse wall, a passage being formed therein for the guidance of said member,
- the mounting has a length ranging between 15 and 30 cm.

The invention further relates to a streamlined flat windscreen wiper, in particular for a vehicle, comprising a streamlined portion as disclosed above.

According to a sixteenth embodiment, the invention relates to a central mounting for a streamlined flat windscreen wiper, in particular for a vehicle, the mounting having an elongated shape and comprising means for fixing to a stiffening member of the wiper or to a member for retaining said stiffening member, the mounting further comprising an aperture which is configured to receive an adapter for connecting the wiper to a drive arm of said wiper, characterized in that it comprises at least one stiffening rib comprising at least one mark of a bearing point for the ejection of the mounting from a manufacturing mould.

This is particularly advantageous as the mark left by a bearing point for the ejection of the mounting is not attractive. When this mark is located on a face of large dimensions, it is visible and unattractive. As the bearing point is provided on a stiffening rib this permits the visibility of the mark of the bearing point to be restricted. Moreover, the mark is produced by pushing in material which may affect the integrity o the part. As the rib forms a relatively stiff and strong part, the mark does not affect the integrity of the part in this case.

The invention may comprise one or more of the following features, said features also being able to be combined with one or more other features of one or more other embodiments of the invention:
- the mounting comprises at least two stiffening ribs, each comprising at least one mark,
- said ribs are substantially transverse,
- the mounting comprises at least two intersecting stiffening ribs, at least one mark being located at a joining area of the ribs,
- the or each mark is formed on a free terminal edge of a rib,
- the mounting comprises two longitudinal lateral walls which are connected together so as to form substantially a dihedron at least in the region of the longitudinal ends of the mounting, said at least one rib extending between the internal faces of said longitudinal lateral walls,
- the mounting comprises at each of its longitudinal ends means for connecting to a terminal cap of the wiper.

The invention further relates to a terminal cap for a streamlined flat windscreen wiper, in particular for a vehicle, the cap having an elongated shape and comprising at one of its longitudinal ends means for connecting to a central mounting of the wiper, characterized in that it comprises at least one stiffening rib comprising at least one mark of a bearing point for the ejection of the cap from a manufacturing mould.

The invention may comprise one or more of the following features, said features also being able to be combined with one or more other features of one or more other embodiments of the invention:
- the cap comprises at least two stiffening ribs each comprising at least one mark,
- said ribs are substantially transverse,
- the cap comprises at least two intersecting stiffening ribs, at least one mark being located on a joining area of the ribs,
- the or each mark is formed on a free terminal edge of a rib,
- the cap comprises two longitudinal lateral walls which are connected together so as to form substantially a dihedron, said at least one rib extending between the internal faces of said longitudinal lateral walls.

The invention further relates to an assembly comprising a mounting and a cap as disclosed above.

The invention further relates to a streamlined flat windscreen wiper, in particular for a vehicle, comprising a mounting or a cap as disclosed above.

According to a seventeenth embodiment, the invention relates to a streamlined flat windscreen wiper, in particular for a vehicle, characterized in that it comprises:
- a longitudinal wiper blade,
- at least one longitudinal stiffening member,
- a longitudinal member for retaining said wiper blade and said stiffening member,
- a longitudinal streamlined portion comprising two terminal caps and a central mounting extending between the terminal caps and being connected thereto, the mounting comprising means for fixing to said stiffening member or to said member for retaining said stiffening member, and each cap comprising means for guiding in translation terminal parts of said member.

The invention may comprise one or more of the following features, said features also being able to be combined with one or more other features of one or more other embodiments of the invention:

- the mounting comprises at each of its longitudinal ends means for articulation of the corresponding terminal cap,
- the mounting comprises an aperture which is configured to receive an adapter for connecting the wiper to a drive arm of said wiper,
- the aperture has an elongated shape and extends between two longitudinal lateral walls of the mounting, a pivot pin of said adapter extending therebetween,
- the member comprises a first longitudinal housing for receiving a heel of the wiper blade and a second longitudinal housing for receiving the stiffening member,
- the stiffening member bears against the heel of the blade or is separated from said heel by a longitudinal wall of said member,
- the wiper comprises a single stiffening member,
- at least one of the elements from the mounting and the caps forms or comprises an aerodynamic baffle,
- at least one of the elements from the mounting and the caps comprises two longitudinal lateral walls, the first longitudinal edges thereof being connected together so that said walls form substantially a dihedron over at least one longitudinal part of said element,
- the dihedron defines an upper longitudinal edge of the mounting or of the cap,
- said edge extends substantially parallel to and spaced apart from a central longitudinal plane of the means for fixing the mounting,
- said longitudinal lateral walls comprise, opposite said first longitudinal edges, second longitudinal edges which are free or connected to longitudinal lateral flanges,
- the second longitudinal edge of one of said longitudinal lateral walls is substantially located in a first substantially horizontal longitudinal plane which is remote from a second substantially horizontal longitudinal plane passing substantially through the second longitudinal edge of the other of said longitudinal lateral walls,
- said means for guiding extend between said lateral flanges,
- said lateral flanges are connected together by a transverse wall, a passage for the guidance of said member being formed therein.

According to an eighteenth embodiment, the invention relates to a central mounting for a streamlined flat windscreen wiper, in particular for a vehicle, the mounting having an elongated shape and comprising at each of its longitudinal ends means for articulation on a terminal cap of the wiper about at least one pin, the mounting further comprising means for fixing to a stiffening member of the wiper or to a member for retaining said stiffening member, characterized in that a first central longitudinal plane of the means for articulation, substantially perpendicular to said pin, is substantially parallel to and spaced apart from a second central longitudinal plane of said means for fixing.

The means for articulation are thus offset in the transverse direction of the means for fixing.

The invention may comprise one or more of the following features, said features also being able to be combined with one or more other features of one or more other embodiments of the invention:

- the mounting comprises at each of its longitudinal ends a protruding finger carrying a pivot pin or comprising an orifice which is configured to be traversed by a pivot pin,
- the mounting comprises two longitudinal lateral walls, one longitudinal edge of a first of said walls being connected to a longitudinal edge of a second of said walls so as to form substantially a dihedron at least in the region of the longitudinal ends of the mounting,
- each finger extends from a transverse wall for connecting said longitudinal lateral walls,
- each finger has an axis of elongation extending in a longitudinal plane which is substantially perpendicular to said corresponding pivot pin and which passes substantially through said longitudinal edges,
- each finger has a generally substantially parallelepipedal shape,
- the mounting further comprises an aperture which is configured to receive an adapter for connecting the wiper to a drive arm of said wiper, said first central longitudinal plane being substantially parallel to and spaced apart from a third central longitudinal plane of the aperture.

The invention further relates to a terminal cap for a streamlined flat windscreen wiper, in particular for a vehicle, the cap having an elongated shape and comprising at one of its longitudinal ends means for articulation on a central mounting of the wiper, the cap further comprising means for guiding in translation a member for retaining a wiper blade of the wiper, characterized in that a first central longitudinal plane of the means for articulation, substantially perpendicular to said pin, is substantially parallel to and spaced apart from a second central longitudinal plane of said means for guiding.

The invention may comprise one or more of the following features, said features also being able to be combined with one or more other features of one or more other embodiments of the invention:

- said longitudinal end carries a pivot pin or comprises at least one orifice which is configured to receive a pivot pin,
- the cap comprises two longitudinal lateral walls, one longitudinal edge of a first of said walls being connected to a longitudinal edge of a second of said walls so as to form substantially a dihedron,
- said pin or said orifice is formed on an internal longitudinal wall of at least one of said longitudinal lateral walls.

The invention further relates to an assembly comprising a mounting and a cap as disclosed above.

The invention further relates to a streamlined flat windscreen wiper, in particular for a vehicle, comprising a mounting and/or a cap as disclosed above.

According to a nineteenth embodiment, the invention relates to a terminal cap for a streamlined flat windscreen wiper, in particular for a vehicle, said cap having an elongated shape and comprising means defining a longitudinal passage for sliding a longitudinal member for retaining a wiper blade of the wiper, characterized in that it further comprises at least one guide ramp which is configured to facilitate the insertion of said member in said passage.

The invention may comprise one or more of the following features, said features also being able to be combined with one or more other features of one or more other embodiments of the invention:

- said means comprise at least one transverse wall protruding over an internal face of the cap and defining said longitudinal passage, said transverse wall comprises two substantially L-shaped lateral hooks which are configured to extend on each side of said member, each hook comprising a substantially vertical part, the lower end thereof being connected to a substantially horizontal part extending on the side of the other hook, the upper ends of said vertical parts of the hooks are connected together by an upper horizontal part of said transverse wall, said horizontal part of each hook has an overthickness in the longitudinal direction in which a guide ramp is formed, the cap comprises two longitudinal lateral walls, the first longitudinal edges thereof being connected together so that said longitudinal lateral walls substantially form a dihedron, said longitudinal lateral walls comprise, opposite said first longitudinal edges, second longitudinal walls which are free or connected to longitudinal lateral flanges, the second longitudinal edge of one of said longitudinal lateral walls is substantially located in a first substantially horizontal longitudinal plane which is spaced apart from a second substantially horizontal longitudinal plane passing substantially through the second longitudinal edge of the other of said longitudinal lateral walls, said means extend between said lateral flanges, the cap comprises two ramps which are symmetrical relative to a substantially vertical central longitudinal plane of said means, said ramps comprise inclined guide faces which are substantially coplanar.

The invention further relates to an assembly comprising a cap as disclosed above and a member for retaining a wiper blade which is slidably mounted in the passage of said means.

The invention further relates to a streamlined flat windscreen wiper, in particular for a vehicle, comprising a cap as disclosed above.

According to a twentieth embodiment, the invention relates to a central mounting for a streamlined flat windscreen wiper, in particular for a vehicle, the mounting having an elongated shape and comprising means for fixing to a stiffening member of the wiper or to a member for retaining said stiffening member, the mounting further comprising an aperture which is configured to receive an adapter for connecting the wiper to a drive arm of said wiper, said aperture comprising a pivot pin of said adapter, the mounting comprising two longitudinal lateral walls which define relative to one another a space for housing said member, characterized in that said longitudinal lateral walls comprise free lower longitudinal edges which are respectively located in two longitudinal planes substantially parallel to said pin, which are separate.

The invention may comprise one or more of the following features, said features also being able to be combined with one or more other features of one or more other embodiments of the invention:

said longitudinal lateral walls comprise upper longitudinal edges which are connected together so that the mounting has a substantially dihedral shape over at least one part of its length, the mounting comprises at each of its longitudinal ends means for connecting to a terminal cap of the wiper, the means for connecting extend from transverse walls for connecting said longitudinal lateral walls, the means for connecting are means for articulation, the mounting comprises at each of its longitudinal ends a protruding finger carrying a pivot pin or comprising an orifice which is configured to be traversed by a pivot pin, each finger has an axis of elongation extending in a longitudinal plane which is substantially perpendicular to said corresponding pivot pin and which passes substantially through said edge, each finger has a generally substantially parallelepipedal shape.

The invention further relates to an assembly comprising a mounting as disclosed above and a terminal cap.

The invention further relates to a streamlined flat windscreen wiper, in particular for a vehicle, comprising a mounting or an assembly as disclosed above.

According to a twenty-first embodiment, the invention relates to an adapter for connecting a rod-shaped drive arm to a streamlined flat windscreen wiper, in particular for a vehicle, said adapter having an elongated shape and comprising two longitudinal lateral flanges connected together by a central portion defining a cylindrical housing which is configured to receive a pivot pin, characterized in that it comprises a longitudinal housing which is configured to receive an end of said rod-shaped arm, and means for locking which are configured to cooperate with the arm and to ensure the retention thereof in said longitudinal housing.

In the present application, a drive arm of the type having an angled or U-shaped end ("U-shaped arm") is distinguished from a drive arm of the type having a straight end ("rod-shaped arm"). The invention relates to a U-shaped arm or rod-shaped arm, or even any other type of drive arm.

The invention may comprise one or more of the following features, said features also being able to be combined with one or more other features of one or more other embodiments of the invention:

the cylindrical housing is configured to receive said pivot pin by resilient clipping, said means for locking comprise a longitudinal tab, one free longitudinal end thereof comprising at least one finger for retaining said arm, said tab delimits at least one part of said longitudinal housing, said tab has a generally planar and elongated shape and extends substantially in a plane passing through an upper end of the adapter, said finger and said flanges of the adapter extend substantially on the same side from said plane, said longitudinal housing is open at both longitudinal ends thereof.

The invention further relates to an assembly comprising an adapter as disclosed above and a central mounting of a streamlined flat windscreen wiper.

The invention may comprise one or more of the following features, said features also being able to be combined with one or more other features of one or more other embodiments of the invention:

the mounting comprises means for fixing to a stiffening member of the wiper or to a member for retaining this stiffening member, the mounting has an elongated shape and comprises at each of its longitudinal ends means for articulation on a terminal cap of the wiper, the mounting comprises at each of its longitudinal ends a protruding finger carrying a pivot pin or comprising an orifice which is configured to be traversed by a pivot pin, the mounting comprises two longitudinal lateral walls, a longitudinal edge of a first of said walls being connected to a longitudinal edge of a second of said walls so as to form substantially a dihedron at least in the region of the longitudinal ends of the mounting, the mounting further comprises an aperture which is configured to receive said adapter, said aperture comprising a pivot pin of said adapter, the mounting comprises or forms an aerodynamic baffle.

The invention further relates to a streamlined flat windscreen wiper, in particular for a vehicle, comprising an adapter or an assembly as disclosed above.

According to a twenty-second embodiment, the invention relates to a member for the offset connection of a streamlined flat windscreen wiper, in particular for a vehicle, to an adapter for connecting said wiper to a drive arm, the member comprising means for connecting to said wiper and a pivot pin of said adapter, a first central transverse plane of said pin being parallel to and spaced apart from a second central plane parallel to said first plane and passing through said means for connecting, characterized in that said means for connecting at least partially define a capping.

As explained above, a capping is an element which defines a generally profiled external face and which may be used for sealing an aperture, for example.

The member according to the invention thus has a dual function of attaching the wiper to an adapter and a function of capping.

The invention may comprise one or more of the following features, said features also being able to be combined with one or more other features of one or more other embodiments of the invention:

the member is formed in one piece with a central mounting of said wiper, said means for connecting comprise means for fixing which are configured to cooperate by interlocking or resilient clipping with at least one pin of said wiper, said means for fixing are configured to cooperate by interlocking or resilient clipping with two or three separate pins of said wiper, said means for connecting have an elongated shape and substantially comprise in the centre thereof means for resiliently clipping onto a pin of said wiper, and at each of their longitudinal ends means for interlocking on a further pin of said wiper, said capping is configured to seal at least partially an aperture of said wiper, the capping extends an upper surface of the central mounting, the member has generally a U-shape and comprises two lateral walls, the lower edges thereof being connected together by a central wall, said pin extending between said lateral walls and an upper edge of one of said lateral walls being connected to an edge defining said capping.

The invention further relates to an assembly comprising a connection member as disclosed above and a central mounting of a streamlined flat windscreen wiper.

The invention may comprise one or more of the following features, said features also being able to be combined with one or more other features of one or more other embodiments of the invention:

the mounting comprises means for fixing to a stiffening member of the wiper or to a member for retaining said stiffening member, the mounting has an elongated shape and comprises at each of its longitudinal ends means for articulation on a terminal cap of the wiper, the mounting comprises at each of its longitudinal ends a protruding finger carrying a pivot pin or comprising an orifice which is configured to be traversed by a pivot pin, the mounting comprises two longitudinal lateral walls, one longitudinal edge of a first of these walls being connected to a longitudinal edge of a second of these walls so as to form substantially a dihedron at least in the region of the longitudinal ends of the mounting, the mounting comprises an aperture, comprising at least one pin for the interlocking or resilient clipping of said means for connecting the member, said capping of the member at least partially seals said aperture of the mounting.

The invention further relates to a streamlined flat windscreen wiper, in particular for a vehicle, comprising a member or an assembly as disclosed above.

According to a twenty-third embodiment, the invention relates to a connection member for a streamlined flat windscreen wiper, in particular for a vehicle, to an adapter for connecting said wiper to a drive arm, the member comprising means for connecting to said wiper and means for the articulation of said adapter about a pin, characterized in that said means for connecting at least partially define a capping.

Said member also has the dual function of attaching the wiper to an adapter and a function of capping.

The invention may comprise one or more of the following features, said features also being able to be combined with one or more other features of one or more other embodiments of the invention:

the member is formed in one piece with a central mounting of said wiper, said means for connecting comprise means for fixing which are configured to cooperate by interlocking, engagement and/or resilient clipping with a central mounting of said wiper, said means for connecting have an elongated shape and comprise at a first longitudinal end means for engagement or interlocking which are configured to cooperate with said mounting and, at the opposing longitudinal end, resilient clipping means which are configured to cooperate with said mounting, said means for connecting further comprise substantially in the centre thereof additional means for engagement or interlocking which are configured to cooperate with said mounting, said capping is configured to seal at least partially an aperture of said mounting, said housing is defined by a protruding part on said capping, the means for articulation comprise an orifice for housing a pivot pin or journals defining a pivot pin.

The invention further relates to an assembly comprising a connection member as disclosed above and a central mounting of a streamlined flat windscreen wiper.

The invention may comprise one or more of the following features, said features also being able to be combined with one or more other features of one or more other embodiments of the invention:

the mounting comprises means for fixing to a stiffening member of the wiper or to a member for retaining said stiffening member, the mounting has an elongated shape and comprises at each of its longitudinal ends means for articulation on a terminal cap of the wiper, the mounting comprises at each of its longitudinal ends a protruding finger carrying a pivot pin or comprising an orifice which is configured to be traversed by a pivot pin, the mounting comprises two longitudinal lateral walls, one longitudinal edge of a first of said walls being connected to a longitudinal edge of a second of said walls so as to form substantially a dihedron at least in the region of the longitudinal ends of the mounting, the mounting comprises an aperture for mounting said member, said capping of the member seals at least partially said aperture of the mounting.

The invention further relates to a streamlined flat windscreen wiper, in particular for a vehicle, comprising an adapter or an assembly as disclosed above.

According to a twenty-fourth embodiment, the invention relates to a streamlined portion for a streamlined flat windscreen wiper, in particular for a vehicle, the streamlined portion comprising two terminal caps and a central mounting which is located between the two terminal caps and which comprises means for fixing to a stiffening member of the wiper or to a member for retaining said stiffening member, the central mounting comprising at each of its longitudinal ends means for connecting to one of the terminal caps, characterized in that the means for connecting are configured to cooperate by interlocking with complementary means of the corresponding terminal cap, and in that the streamlined portion is configured so that the force required to detach said means for connecting from said complementary means, by dismantling them from one another, is greater than the resistance to rupture of at least one part of the streamlined portion.

The invention thus permits the streamlined portion to be undetachable and thus prevents inadvertent detachment of the central mounting from the terminal caps. The only manner of detaching the central mounting from the terminal caps is to break said cap(s), which makes the streamlined portion useless.

The invention may comprise one or more of the following features, said features also being able to be combined with one or more other features of one or more other embodiments of the invention:

the means for connecting are means for articulation, said means for connecting comprise a first finger and said complementary means comprise a second finger, one of the first and second fingers comprises a recess for engagement of the other of the first and second fingers, the first finger comprises two lateral walls defining said recess relative to one another, said lateral walls comprise opposing internal lateral faces each comprising a blind hole for receiving a substantially cylindrical pin of the second finger, the blind hole has a generally trapezoidal shape, the small base thereof having a concave curved shape and forming a portion for guiding said pin in rotation, the recess traverses said finger and the large base of said blind hole of each internal face is located at a through-end of said recess, the second finger comprises two external lateral faces comprising said substantially cylindrical pins, the second finger has a generally trapezoidal shape, the second finger extends between two reinforcements, each pin comprises a chamfered part which is configured to facilitate the insertion of the pin in the recess of the first finger and a non-chamfered part to make the removal of the pin from the recess more difficult, the second finger is connected by its base to at least one substantially transverse reinforcing rib, said first and second fingers have substantially perpendicular orientations, the streamlined portion comprises two longitudinal lateral walls, one longitudinal edge of a first of said walls being connected to a longitudinal edge of a second of said walls so as to form substantially a dihedron over at least one part of the longitudinal dimension of the streamlined portion, at least one of said longitudinal lateral walls comprising at least one thinned area in the vicinity of said means for connecting and articulation of said complementary means, so as to form at least one weakened area.

The present invention further relates to a streamlined flat windscreen wiper, in particular for a vehicle, comprising a streamlined portion as disclosed above.

According to a twenty-fifth embodiment, the invention relates to an end piece for a streamlined flat windscreen wiper, in particular for a vehicle, comprising a first housing which is configured to receive an end of a stiffening member of the wiper, characterized in that it comprises means for resilient clipping which are configured to cooperate with a streamlined portion of said wiper.

The resilient clipping of the end piece permits, in particular, the retention and the position thereof relative to the streamlined portion to be improved. It may permit the end piece to be held captively and unreleasably which facilitates the mounting thereof.

The invention may comprise one or more of the following features, said features also being able to be combined with one or more other features of one or more other embodiments of the invention:

said resilient clipping means are located on at least one external face of said end piece, said resilient clipping means are located on at least one side of said end piece, the end piece comprises two substantially parallel lateral faces and said resilient clipping means protrude over said lateral faces, said resilient clipping means comprise at least one ramp having an inclined wall which is configured to cooperate by sliding with a corresponding means of the streamlined portion and a stop face which is configured to cooperate with said corresponding means of the streamlined portion, said resilient clipping means are located on a central part of the end piece, said resilient clipping means are substantially coplanar, the end piece comprises a central longitudinal plane of symmetry, the end piece comprises at one longitudinal end stop means which are configured to cooperate with a corresponding means of said streamlined portion after the resilient clipping of said means.

The present invention further relates to a streamlined portion for a streamlined flat windscreen wiper, in particular for a vehicle, comprising slidable means for guiding which are configured to cooperate with an end piece as disclosed above.

The means for guiding may comprise two substantially L-shaped lateral hooks which are configured to extend on each side of said end piece, each hook comprising a substantially vertical part, the lower end thereof being connected to a substantially horizontal part extending at the side of the other hook.

The present invention further relates to an assembly comprising an end piece and a streamlined portion as disclosed above.

The clipping means may be configured to cooperate with said vertical parts of the hooks.

Said stop means may be configured to cooperate with said hooks.

The present invention further relates to a streamlined flat windscreen wiper, in particular for a vehicle, comprising at least one end piece, a streamlined portion, or an assembly as disclosed above.

According to a twenty-sixth embodiment, the invention relates to a central mounting for a streamlined flat windscreen wiper, in particular for a vehicle, the mounting having an elongated shape and comprising at each of its longitudinal ends means for connecting to a terminal cap of the wiper, the mounting comprising means for fixing to a stiffening member of the wiper or to a member for retaining said stiffening member, characterized in that it further comprises means for longitudinal locking of said stiffening member.

The invention thus proposes to block the stiffening member longitudinally by means of the central mounting, which may permit the simplification of other parts of the wiper, such as for example the end pieces thereof.

The invention may comprise one or more of the following features, said features also being able to be combined with one or more other features of one or more other embodiments of the invention:
  the means for connecting are means for articulation,
  the means for locking are located on one lower end of the mounting,
  the means for locking are located substantially in the centre of the mounting,
  the means for locking are configured to extend on both sides of the stiffening member,
  the means for locking are substantially coplanar,
  the means for locking comprise at least one protruding element,
  the means for locking comprise at least one element protruding over one internal lateral face of the central mounting and at least one element protruding over an internal lateral face opposite the central mounting,
  each protruding element has a generally trapezoidal shape, the large base thereof being connected to the central mounting,
  said means for fixing comprise at least one pair of lateral hooks extending spaced apart from one another and each comprising a longitudinal notch which is configured to receive said stiffening member by longitudinal sliding,
  the mounting comprises two pairs of hooks which are axially spaced apart from one another, said means for locking being located between said pairs of hooks.

The present invention further relates to an assembly comprising a central mounting of the type disclosed above and a stiffening member, said stiffening member comprising over at least one of its longitudinal edges at least one notch which is configured to receive by interlocking said means for locking.

The or each notch may be generally U-shaped or C-shaped. The stiffening member may comprise a notch over each of its longitudinal edges.

The present invention further relates to a streamlined flat windscreen wiper, in particular for a vehicle, comprising a mounting or an assembly as disclosed above.

According to a twenty-seventh embodiment, the invention relates to a member for retaining a stiffening member, for a streamlined flat windscreen wiper, in particular for a vehicle, the member having an elongated shape and comprising a first longitudinal housing for receiving the stiffening member and a second longitudinal housing for receiving a heel of a wiper blade, characterized in that it further comprises first means for guiding in the longitudinal direction, which are configured to cooperate with a streamlined portion of said wiper in order to guide the longitudinal sliding of said member relative to said streamlined portion.

The invention thus proposes to guide the member by means of the streamlined portion.

The invention may comprise one or more of the following features, said features also being able to be combined with one or more other features of one or more other embodiments of the invention:
  the member comprises an upper longitudinal tube internally defining said first housing and two lower longitudinal hooks defining relative to one another said second housing, said means for guiding extending along longitudinal edges of said tube,
  the means for guiding comprise two ribs, respectively extending along the two opposing longitudinal edges of said tube,
  said tube comprises two lateral walls which are connected together by at least one transverse wall, said ribs extending downwardly, on the side of said hooks, into the extension of said lateral walls,
  the hooks have a substantially L-shaped section and each comprise a substantially vertical portion, one upper end thereof being connected to said tube and one lower end thereof being connected to a substantially horizontal portion of the hook, said ribs extending substantially parallel to and spaced apart from vertical portions of said hooks.

The present invention further relates to a streamlined portion for a streamlined flat windscreen wiper, in particular for a vehicle, comprising second means for slidable guiding which are configured to cooperate with said first means for guiding a member as disclosed above.

The second means for guiding may comprise two substantially L-shaped lateral hooks which are configured to extend on each side of said member, each hook comprising a substantially vertical part, the lower end thereof being connected to a substantially horizontal part extending on the side of the other hook.

The substantially horizontal part of each hook may comprise a longitudinal groove which is configured to receive one of said ribs of the member. The vertical parts of the hooks may comprise means for bearing at regular intervals against said member. The vertical parts of the hooks may each comprise a lug, the free end thereof being configured to cooperate with said member. The lug or each lug may have a generally rounded shape. The lug may be substantially located in the centre of the vertical part of the or each hook.

The present invention further relates to an assembly comprising a member and a streamlined portion as disclosed above.

The present invention further relates to a streamlined flat windscreen wiper, in particular for a vehicle, comprising a member and/or a streamlined portion as disclosed above.

According to a twenty-eighth embodiment, the invention relates to an end piece for a streamlined flat windscreen wiper, in particular for a vehicle, comprising a first housing which is configured to receive an end of a stiffening member of the wiper, characterized in that it comprises means for guiding and longitudinal sliding which are configured to cooperate with a streamlined portion of said wiper.

The invention thus proposes to guide the sliding of the end piece by means of the streamlined portion. In this case, in addition to the other embodiments of the invention in which the streamlined portion is designed to cooperate with the end piece, the streamlined portion may comprise the aforementioned means at its free ends, which stiffens the streamlined portion and thus the wiper and is therefore advantageous.

The invention may further comprise one or more of the following features, said features also being able to be combined with one or more other features of one or more other embodiments of the invention:

- said means for guiding and sliding comprise two longitudinal lateral and parallel tracks, each defining at least one sliding surface of a corresponding means of said streamlined portion,
- each of said tracks comprises a first sliding surface, one longitudinal edge thereof being connected to a longitudinal edge of a second sliding surface,
- said first and second surfaces are substantially perpendicular,
- each of said tracks is connected by one of its longitudinal ends to a transverse stop face,
- said means for guiding are located on a lower face of said end piece,
- the end piece comprises a further housing for receiving an end of a wiper blade and a longitudinal groove which is formed on a lower face of the end piece and opens into said further housing, said means for guiding extending along and on both sides of said groove,
- the end piece comprises resilient clipping means which are configured to cooperate with the streamlined portion of said wiper.

The present invention further relates to a streamlined portion for a streamlined flat windscreen wiper, in particular for a vehicle, characterized in that it comprises means for slidable guiding which are configured to cooperate with an end piece as disclosed above.

The means for guiding may comprise two substantially L-shaped lateral hooks, which are configured to extend on each side of said end piece, each hook comprising a substantially vertical part, the lower end thereof being connected to a substantially horizontal part extending on the side of the other hook.

The present invention further relates to an assembly comprising an end piece and a streamlined portion as disclosed above.

Said means for guiding the streamlined portion may cooperate by sliding with said tracks of the end piece. Said means for clipping may cooperate with the vertical parts of said hooks. The end piece may further comprise stop means which are configured to cooperate with said hooks after the resilient clipping.

The present invention further relates to a streamlined flat windscreen wiper, in particular for a vehicle, comprising an end piece, a streamlined portion, or an assembly as disclosed above.

According to a twenty-ninth embodiment, the invention relates to a streamlined portion for a streamlined flat windscreen wiper, in particular for a vehicle, the streamlined portion having an elongated shape, characterized in that it comprises at each of its longitudinal ends a housing for mounting and longitudinal sliding of an end piece of said wiper, each longitudinal end of the streamlined portion comprising first stop means which are configured to cooperate with said end piece and to block said end piece in a longitudinal direction, and second stop means which are configured to cooperate with said end piece and to block said end piece in the opposing longitudinal direction, said first and second means being spaced apart longitudinally relative to one another so as to form a retaining cage for said end piece.

The invention thus proposes the longitudinal blocking of the end piece by means of a retaining cage for the end piece, said cage being formed by means of the streamlined portion.

The invention may comprise one or more of the following features, said features also being able to be combined with one or more other features of one or more other embodiments of the invention:

- the streamlined portion comprises two longitudinal lateral walls, one longitudinal edge of a first of said walls being connected to a longitudinal edge of a second of said walls so as to form substantially a dihedron over at least one part of the longitudinal dimension of the streamlined portion, said housings being located inside the dihedron,
- said first and second means for blocking protrude inside said dihedron,
- said first and second means for blocking comprising at least one transverse rib, said rib preferably being a rib for connecting said longitudinal lateral walls,
- a first transverse rib forms stop means of the end piece in a first longitudinal direction,
- said first transverse rib comprises a central part extending between said longitudinal lateral walls, and two lateral parts respectively located at least partially on said longitudinal lateral walls, at least one part of said lateral parts comprising a stop face which is configured to cooperate with said end piece,
- said first and second means for blocking comprise at least one pair of substantially L-shaped lateral hooks which are configured to extend on each side of said end piece,
- each hook comprises a substantially vertical part, the lower end thereof being connected to a substantially horizontal part extending on the side of the other hook, the horizontal parts of the hooks comprising stop faces which are configured to cooperate with said end piece,
- the streamlined portion comprises, substantially at right angles to said hooks, a second transverse rib for connecting said longitudinal lateral walls,
- said second rib comprises a lower edge comprising means for bearing at regular intervals against said end piece,
- the streamlined portion comprises two terminal caps and a central mounting which is located between the two end caps and which comprises means for fixing to a stiffening member of the wiper or to a member for retaining said stiffening member, each terminal cap comprising one of said housings at its free longitudinal end.

The present invention further relates to an assembly comprising a streamlined portion as disclosed above and at least one end piece for a streamlined flat windscreen wiper, in particular for a vehicle, the or each end piece comprising a first housing which is configured to receive one end of a stiffening member of the wiper.

The or each end piece may comprise at least one first transverse stop face which is configured to cooperate with said first stop means, and at least one second transverse stop face which is configured to cooperate with said second stop means.

Said at least one first stop face may be substantially located in the centre of said end piece and said at least one second stop face is located at one longitudinal end of said end piece.

The present invention further relates to a streamlined flat windscreen wiper, in particular for a vehicle, comprising a streamlined portion or an assembly as disclosed above.

According to a thirtieth embodiment, the invention relates to a streamlined portion for a streamlined flat windscreen wiper, in particular for a vehicle, comprising two longitudinal lateral walls, a longitudinal edge of a first of said walls being connected to a longitudinal edge by a second of said walls so as to form substantially a dihedron over at least one part of the longitudinal dimension of the streamlined part, characterized in that the lower or internal faces of said walls are connected together by reinforcing ribs, at least some thereof having different heights.

The subject of the present invention is, in particular, to confer to the reinforcing ribs of the streamlined portion additional functions which are, in particular, dependent on their height. In the present application, the "height" of a rib is understood as its substantially vertical transverse dimension. The other dimensions of a reinforcing rib are its thickness, measured substantially along the longitudinal axis of the streamlined portion, and its width or length, measured substantially in a substantially horizontal transverse direction.

The invention may comprise one or more of the following features, said features also being able to be combined with one or more other features of one or more other embodiments of the invention:
  the streamlined portion comprises two terminal caps and a central mounting which is located between the two terminal caps and which comprises means for fixing to a stiffening member of the wiper or to a member for retaining this stiffening member, said ribs of different heights being located on the central mounting and/or said terminal caps,
  each terminal cap comprises reinforcing ribs of smaller height and reinforcing ribs of greater height, said ribs of greater height being located in the vicinity of the free longitudinal ends of the terminal caps,
  the reinforcing ribs of greater height comprise stops means and/or means for guiding in the longitudinal direction which are configured to cooperate with at least one end piece of said wiper, said reinforcing ribs of greater height preferably being two in number,
  a first of the reinforcing ribs of greater height comprises a central part extending between said longitudinal lateral walls and two lateral parts respectively located at least partially on said longitudinal lateral walls, at least one of said lateral parts comprising a stop face which is configured to cooperate with an end piece,
  a second of the reinforcing ribs of greater height comprises a lower edge comprising means for bearing at regular intervals against an end piece,
  the means for bearing at regular intervals comprise at least one lug, the free end thereof being configured to cooperate with said end piece,
  the lug or each lug has a generally rounded shape,
  the lug is located substantially in the centre of said lower edge,
  said second of the reinforcing ribs of greater height is located between said first of the reinforcing ribs of greater height and the free end closest to said terminal cap,
  the streamlined portion comprises or forms at least one baffle.

The present invention also relates to a terminal cap for a streamlined flat windscreen wiper, in particular for a vehicle, the cap having an elongated shape and comprising at one of its longitudinal ends means for connecting to a central mounting of the wiper, characterized in that it comprises two longitudinal lateral walls, one longitudinal edge of a first of said walls being connected to a longitudinal edge of a second of said walls so as to form substantially a dihedron, over at least one part of its longitudinal dimension, characterized in that the lower or internal faces of said walls are connected together by reinforcing ribs, at least some thereof having different heights.

The present invention further relates to a streamlined flat windscreen wiper, in particular for a vehicle, comprising a streamlined portion or at least one terminal cap as disclosed above.

According to a thirty-first embodiment, the invention relates to a streamlined flat windscreen wiper, in particular for a vehicle, the streamlined portion comprising two terminal caps and a central mounting which is located between the two terminal caps and which comprises means for fixing to a stiffening member of the wiper or to a member for retaining said stiffening member, the central mounting comprising at each of its longitudinal ends means for articulation which are configured to cooperate with complementary means of one of the terminal caps, characterized in that the means for articulation comprise a first finger comprising at least one first and one second surface for the pivotable guiding of said terminal cap about a pivot pin, said at least one second guide surface being radially spaced apart from said at least one first guide surface, relative to said pin, and the circumferential ends of said at least one second guide surface being connected to stop surfaces.

The present invention thus proposes an improvement to the means for articulation of the prior art, one of the guide surfaces here being associated with the stop surfaces.

The invention may comprise one or more of the following features, said features also being able to be combined with one or more other features of one or more other embodiments of the invention:
  said at least one second guide surface is located radially outside said at least one first guide surface,
  said first and second guide surfaces have angular dimensions which are close to one another and, for example, range between 20 and 50° approximately,
  the stop surfaces each have a substantially radial orientation relative to said pivot pin,
  said means for articulation comprise a first finger and said complementary means comprise a second finger, one of the first and second fingers comprising a recess for engagement of the other of the first and second fingers,
  the first finger comprises two lateral walls defining relative to one another said recess,
  said lateral walls comprise opposing internal lateral faces each comprising a blind hole for receiving a substantially cylindrical pin of the second finger,
  the blind hole has a generally trapezoidal shape, the small base thereof having a curved concave shape and defining said first guide surface, the lateral walls comprise upper longitudinal edges which each comprise a notch defining said at least one second guide surface, the recess passes through said finger and the large base of said blind hole of each internal face is located at one through-end of said recess, the second finger comprises two external lateral faces comprising said substantially cylindrical pins, the second finger has a generally trapezoidal shape, the second finger extends between two reinforcements, each pin comprises a chamfered part which is configured to facilitate the insertion of the pin in the recess of the first finger and a non-chamfered part to make the removal of the pin from the recess more difficult, the second finger is connected by its base to at least one substantially transverse reinforcing rib, the free lower edge(s) thereof being configured to cooperate with said second guide surface and with said stop surfaces.

The present invention further relates to a streamlined flat windscreen wiper, in particular for a vehicle, comprising a streamlined portion as disclosed above.

According to a thirty-second embodiment, the invention relates to a method for mounting a streamlined flat windscreen wiper, in particular for a vehicle, said wiper comprising a streamlined portion comprising two terminal caps and a central mounting which is located between the two terminal caps, said central mounting comprising means for connecting the caps and means for fixing to a stiffening member of the wiper or to a member for retaining said stiffening member, said wiper further comprising two end pieces which are each configured to receive one end of said stiffening member or one end to a member for retaining said stiffening member, the method being characterized in that it comprises the steps consisting in:

a) mounting the end pieces on the stiffening member or to a member for retaining said stiffening member, b) then mounting the terminal caps on the end pieces and the central mounting.

In contrast to the prior art, the terminal caps are in this case mounted after mounting the end pieces. The mounting of the terminal caps may permit the locking of the assembly of the parts of the wiper.

The invention may comprise one or more of the following features, said features also being able to be combined with one or more other features of one or more other embodiments of the invention:

the method comprises the step consisting in:

c) before step a) mounting the central mounting on the stiffening member or on the member for retaining said stiffening member;

the method comprises the step consisting in:

d) before step c), mounting a heel of a wiper blade in a first longitudinal housing of said member for retaining;

step c) comprises the sub-steps consisting in:

c1) mounting the central mounting on said member for retaining, then c2) inserting the stiffening member in a second longitudinal housing of said member for retaining;

as the means for fixing the central mounting comprise at least one pair of lateral hooks extending spaced apart from one another and each comprise a longitudinal notch which is configured to receive said stiffening member by longitudinal sliding, the sub-step c1) consists in engaging said hooks in cut-outs of said member for retaining so that said notches of the hooks are aligned with said second housing of said member for retaining;

step a) consists in mounting the end pieces on the stiffening member and the wiper blade, each end piece comprising a housing for receiving one end of the stiffening member and a housing for receiving one end of the wiper blade;

step b) comprises the sub-steps, consisting in:

b1) engaging one of the end pieces in a longitudinal end of one of the terminal caps, then b2) connecting the opposing longitudinal end of said cap to the central mounting so as to assemble the means for connecting thereof, the sub-steps b1 and b2) being carried out for each end piece;

during the sub-step b1) said terminal cap is presented in an inclined manner relative to said stiffening member;

during the sub-step b2) said longitudinal end opposing the terminal cap is folded down onto the central mounting;

the folding-down is carried out until the means for connecting are formed by the interlocking of a means of said terminal cap in a means complementary to said central mounting;

the means for connecting are of the undetachable type, the force required to dismantle said means for connecting being greater than the resistance to rupture of at least one part of the streamlined portion so that it breaks in the event of an attempt to dismantle the connection;

as the stiffening portion has a curved portion in the resting position, it comprises a step consisting in applying stress to the stiffening member so that it has a substantially rectilinear shape during at least one part of the aforementioned steps;

during step a) the end pieces are mounted simultaneously on the ends of the stiffening member.

According to a thirty-third embodiment, the invention relates to a streamlined flat windscreen flat wiper, in particular for a vehicle, said wiper having an elongated shape and comprising at least one baffle extending along said wiper over at least part of its longitudinal dimension, characterized in that it comprises at each of its longitudinal ends a second baffle which extends substantially between a longitudinal end of the first baffle and a longitudinal edge of the wiper.

The invention permits, in particular, the aerodynamics of the wiper to be improved. The second baffle here has a function which is comparable with that of the winglets located at the ends of the wings of an aircraft. The second baffle makes it possible, in particular, to improve the flattening of the wiper against the window of the vehicle to be cleaned, in the region of the end of the wiper, said second baffle being located in the region thereof.

The invention may comprise one or more of the following features, said features also being able to be combined with one or more other features of one or more other embodiments of the invention:

said second baffle substantially extends between the longitudinal end of the first deflector and a longitudinal end of said longitudinal edge of the wiper, the first baffle comprises a first edge which extends along the wiper and in which the second baffle comprises a second edge, one end thereof being connected to one end of the first edge, the second edge has a substantially transverse orientation relative to a longitudinal axis of the wiper, the second edge is at the interface of two faces which form relative to one another an angle of less than 90°, the second edge is at the interface of two faces, one thereof being of curved concave shape and connected to said first edge, said concave curved face has a radius of curvature which varies along said second rib, said concave curved face comprises a hollow portion in the vicinity of the second baffle, in longitudinal section, said concave curved face has an angle α relative to a longitudinal axis of the wiper which is less than or equal to 20°, said second edge comprises a central rectilinear portion and two curved end portions for respectively connecting to said first edge and to said longitudinal edge, the wiper is a flat streamlined wiper and comprises a streamlined portion comprising two terminal caps and a central mounting which is located between the two terminal caps, the first baffle extending along the terminal caps and at least one part of the central mounting and each terminal cap comprising a second baffle at its free longitudinal end, the second baffles are carried by end pieces.

The present invention further relates to a streamlined portion for a streamlined flat windscreen wiper, in particular for a vehicle, comprising two longitudinal lateral walls, one longitudinal edge of a first of said walls being connected to a longitudinal edge of a second of said walls so as to form substantially a dihedron over at least one part of the longitudinal dimension of the streamlined portion, characterized in that it further comprises at least one first baffle extending over at least one part of its longitudinal dimension and, at each of its longitudinal ends, a second baffle which extends substantially between one longitudinal end of the first baffle and a longitudinal edge of the streamlined portion.

The streamlined portion may comprise two terminal caps and a central mounting which is located between the two terminal caps and which comprises means for fixing to a stiffening member of the wiper or to a member for retaining said stiffening member, the second baffles being located respectively at the free ends of the terminal caps or being carried by the streamlined elements independently of said caps and located at the free ends of the caps.

The present invention further relates to a terminal cap for a streamlined flat windscreen wiper, in particular for a vehicle, the cap having an elongated shape and comprising at one of its longitudinal ends means for connecting to a central mounting, characterized in that it further comprises a first baffle extending over at least one part of its longitudinal dimension and, at its longitudinal end opposing said means for connecting, a second baffle which extends substantially between one longitudinal end of the first baffle and one longitudinal edge of the terminal cap.

The present invention further relates to an end piece for a streamlined flat windscreen wiper, in particular for a vehicle, comprising a first housing which is configured to receive one end of a stiffening member of the wiper, and a second housing which is configured to receive one end of a wiper blade of a wiper, characterized in that it further comprises a streamlined element forming a baffle which extends substantially in a transverse direction relative to a longitudinal axis of the end piece.

According to a thirty-fourth embodiment, the invention relates to an end piece for a streamlined flat windscreen wiper, in particular for a vehicle, comprising:

a first housing which is configured to receive one end of a stiffening member of the wiper, a second housing which is configured to receive one end of a wiper blade of the wiper, a mounting groove of said end of the wiper blade, said groove opening into said second housing and being located on a lower face of the end piece, characterized in that said first housing is closed on the side of said lower face of the end piece.

The invention permits, in particular, the appearance of the end piece to be improved, as it is its lower face which may be visible to the user, its upper face being generally concealed by the streamlined portion of the wiper.

The invention may comprise one or more of the following features, said features also being able to be combined with one or more other features of one or more other embodiments of the invention:

said first housing is open on the side of an upper face of the end piece, opposing said lower face, the end piece comprises on said upper face two openings which are elongated and parallel and which communicate with said first housing, the end piece comprises in one or each of said openings a protruding locking tab for said stiffening member, said locking tab is resiliently deformable and is configured to cooperate by resilient clipping with said stiffening member, the end piece comprises in one or each of said openings at least one protruding element for centring and guiding said stiffening member, said openings extend on both sides of a strip of material which defines said upper face and which comprises on said face at least one protruding element for guiding the end piece, said groove extends substantially in the centre of the end piece and extends between two longitudinal tracks of the end piece which each comprise at least one longitudinal guide surface of the end piece, each of said longitudinal tracks of the end piece comprises at least one transverse stop surface, which is connected to said at least one guide surface.

The present invention further relates to a terminal cap for a streamlined flat windscreen wiper, in particular for a vehicle, said cap having a generally elongated shape and comprising at one longitudinal end two substantially parallel lateral flanges, defining relative to one another a space which is configured to receive said end piece, the cap comprising further means for slidable guiding which are configured to cooperate with said end piece.

The invention may comprise one or more of the following features, said features also being able to be combined with one or more other features of one or more other embodiments of the invention:

the means for guiding comprise two substantially L-shaped lateral hooks which are configured to extend on each side of said end piece, each hook comprising a substantially vertical part, the lower end thereof being connected to a substantially horizontal part extending on the side of the other hook and configured to extend in the region of said lower face of the end piece, the upper ends of the vertical parts of the hooks are substantially connected together by an upper wall comprising means for bearing at regular intervals against said end piece, the means for bearing at regular intervals of the upper wall comprise at least one lug, the lug of the upper wall has a generally rounded shape and is, for example, located in the centre of the upper wall, the hooks and possibly said upper wall are defined by a transverse wall of the cap, the cap has in section a substantially dihedral shape and comprises two longitudinal walls connected together and defining relative to one another a housing for mounting said end piece, the transverse wall connects the two longitudinal walls of the cap, the transverse wall is a wall for stiffening the cap.

The present invention further relates to an assembly comprising an end piece and a terminal cap as disclosed above.

The present invention further relates to a streamlined flat windscreen wiper, in particular, for a vehicle comprising an end piece and/or a terminal cap as disclosed above.

According to a thirty-fifth embodiment, the invention relates to a streamlined portion for a streamlined flat windscreen wiper, in particular for a vehicle, comprising two longitudinal lateral walls, one longitudinal edge of a first of said walls being connected to a longitudinal edge of a second of said walls so as to form substantially a dihedron, over at least one part of the longitudinal dimension of the streamlined portion, characterized in that at least one of the faces of said walls, located inside the dihedron, comprises a groove which is configured to permit the mounting and/or the sliding of an element of the wiper or an element for supporting the wiper.

The invention may comprise one or more of the following features, said features also being able to be combined with one or more other features of one or more other embodiments of the invention:

the streamlined portion comprises two terminal caps and a central mounting which is located between the two terminal caps and which comprises means for fixing to a stiffening member of the wiper or to a member for retaining said stiffening member, at least one of the lower or internal faces of the longitudinal lateral walls of the mounting and/or the terminal caps comprising a groove which is configured to permit the mounting of an element of the wiper or an element for supporting the wiper, the mounting comprises two first grooves which are configured to permit the mounting of said support element of the wiper, which are respectively located in the vicinity of the longitudinal ends of the mounting, the first grooves are located on the lower face of just one of said walls of the mounting, The first grooves are means of sliding and/or clearance fitted in the central mounting. These means are provided to allow sliding of the member for retaining said stiffening member relative to the central mounting, the first grooves are substantially aligned, the mounting comprises at each of its longitudinal ends a transverse wall for connecting said longitudinal lateral walls, the first grooves extend substantially in a plane passing through the lower free edges of said transverse walls, said plane passes substantially through a free lower edge of one of the longitudinal lateral walls, each terminal cap comprises a second groove which is configured to permit the mounting and the sliding of an end piece of the wiper, said terminal cap is articulated on the central mounting.

said second groove is located in the vicinity of a longitudinal end of each terminal cap, each terminal cap comprises at its free longitudinal end a transverse wall for connecting said longitudinal lateral walls, said second groove extends substantially in a plane passing through a free lower edge of said transverse wall, said second groove extends in the vicinity of a means for guiding and/or stop means which is configured to cooperate with an end piece of the wiper, said means for guiding and/or stop means comprises at least one protruding rib for connecting said longitudinal lateral walls, the or each groove has an elongated shape which extends substantially parallel to a longitudinal axis of the streamlined portion.

It should be noted that the invention covers either the central mounting comprising at least a first groove as detailed above, or at least one terminal cap comprising at least one groove, otherwise called second groove, as detailed above, or a streamlined comprising a central mounting and two terminal caps, these two elements comprising their respective groove according to any of the aspects detailed above.

The present invention further relates to a streamlined flat windscreen wiper, in particular for a vehicle, comprising a streamlined portion as disclosed above.

According to a thirty-sixth embodiment, the invention relates to an element of a streamlined flat windscreen wiper, in particular for a vehicle, said element comprising a longitudinal housing which is configured to receive a heel of a wiper blade of said wiper, and a lower longitudinal groove which opens into said first housing and in which part of the blade is able to slide longitudinally, characterized in that said groove is connected to an opening which is configured to permit the passage of said heel and the dismantling of the blade.

It is thus conceivable to remove the blade from the element of the wiper, for example, for the purpose of its replacement in the case of wear. Thus, even if the wiper is of the undetachable type, as disclosed above, the blade could be replaced in the case of wear.

The invention may comprise one or more of the following features, said features also being able to be combined with one or more other features of one or more other embodiments of the invention:

the opening has a generally rectangular shape, the opening has a width or transverse dimension which is configured to be at least equal to that of said heel, the opening has a width or transverse dimension which is substantially equal to that of said first housing, the opening extends from a longitudinal end of said groove to a longitudinal end of said element, the opening and the groove are substantially coplanar, the element comprises a second housing for receiving a stiffening member of said wiper, the element is an end piece of the wiper or a member for retaining a wiper blade.

The present invention further relates to a streamlined flat windscreen wiper, in particular for a vehicle, comprising an element as disclosed above.

The opening may be longitudinally spaced apart from the free longitudinal end closest to said wiper.

The present invention further relates to a method for dismantling a wiper blade of a streamlined flat windscreen wiper, in particular for a vehicle, characterized in that it comprises the steps consisting in:

a) sliding one longitudinal end of the heel of the wiper blade into the first housing of said element until it is located in the region of said opening, b) removing said end of the heel from said housing via said opening, then c) removing the blade completely from said housing via said opening.

At least one part of the wiper blade may be compressed in the longitudinal direction during step a).

According to a thirty-seventh embodiment, the invention relates to a streamlined portion for a streamlined flat windscreen wiper, in particular for a vehicle, comprising external faces which are configured to be visible in the position of use of said wiper, characterized in that at least some of said external faces have different surface states.

The invention may permit the appearance of the streamlined portion to be improved. It may also permit the surface state of an external face to be adapted as a function of the predicted use of this face.

The invention may comprise one or more of the following features, said features also being able to be combined with one or more other features of one or more other embodiments of the invention:
- at least some of said external faces have different degrees of roughness,
- the streamlined portion comprises two terminal caps and a central mounting which is located between the two terminal caps and which comprises means for fixing to a stiffening member of the wiper or to a member for retaining said stiffening member, said external faces which have different surface states being located on the central mounting,
- the central mounting comprises two substantially parallel lower lateral faces and two upper lateral faces, said lower faces being smoother than said upper faces,
- at least one of said lower faces is configured to receive a stamped or engraved mark,
- at least one of said lower faces is configured to receive an adhesively bonded means such as a label, for example an aging patch,
- the lower faces have a surface state of the VDI15 type,
- the upper faces have a surface state of the VDI30 type.

The present invention further relates to a central mounting for a streamlined flat windscreen wiper, in particular for a vehicle, the central mounting having an elongated shape and comprising at each of its longitudinal ends means for connecting to a terminal cap, the central mounting further comprising external faces which are configured to be visible in the position of use of said wiper, characterized in that at least some of said external faces have different surface states.

The present invention further relates to a streamlined flat windscreen wiper, in particular for a vehicle, comprising a streamlined portion or a central mounting of the type disclosed above.

The present invention further relates to a method for producing a streamlined portion or a central mounting of the aforementioned type, the streamlined portion or the mounting being produced by injection-moulding, a method in which before the injection into a mould only some internal moulding faces of the mould are textured.

According to a thirty-eighth embodiment, the invention relates to an end piece for a streamlined flat windscreen wiper, in particular for a vehicle, comprising a first housing which is configured to receive an end of a stiffening member of the wiper, characterized in that it is resiliently deformable so as to permit the mounting of the stiffening member in said first housing by resilient deformation of the end piece.

The invention thus proposes an improvement to the prior art in which the end piece is resiliently deformable.

The invention may comprise one or more of the following features, said features also being able to be combined with one or more other features of one or more other embodiments of the invention:
- the end piece comprises a second housing which is configured to receive an end of a wiper blade and a first longitudinal groove which is located on a lower wall of said end piece and which opens into said second housing,
- said first and second housings are separated from one another by a transverse wall which comprises a second longitudinal groove opening into said housings,
- the end piece is configured to be deformable by separating and bringing together the longitudinal end pieces extending on both sides of said first or second groove,
- the end piece comprises means for guiding and longitudinal sliding which are configured to cooperate with a streamlined portion of said wiper,
- said means for guiding and sliding comprise two longitudinal lateral and parallel tracks each defining at least one sliding surface of a corresponding means of said streamlined portion,
- each of said tracks comprises a first sliding surface, one longitudinal edge thereof being connected to a longitudinal edge of a second sliding surface,
- said first and second surfaces are substantially perpendicular,
- each of said tracks is connected by one of its longitudinal ends to a transverse stop face,
- said means for guiding are located on a lower face of said end piece.

The present invention further relates to a streamlined portion for a streamlined flat windscreen wiper, in particular for a vehicle, characterized in that it comprises means for locking and blocking an end piece as disclosed above, in order to limit or even prevent a deformation thereof.

Said means for locking may comprise means for the slidable guiding of said end piece.

Said means for guiding may comprise two substantially L-shaped lateral hooks which are configured to extend on each side of said end piece, each hook comprising a substantially vertical part, the lower end thereof being connected to a substantially horizontal part extending on the side of the other hook.

The present invention also relates to an assembly comprising an end piece and a streamlined part as disclosed above.

The present invention also relates to a streamlined flat windscreen wiper, in particular for a vehicle, comprising an end piece, a streamlined portion or an assembly as disclosed above.

According to a thirty-ninth embodiment, the invention relates to a streamlined flat windscreen wiper, in particular for a vehicle, comprising a streamlined portion and a flat wiper, said flat wiper comprising at least two stiffening members which are substantially coplanar and are configured to grip between one another a part of a wiper blade, characterized in that said streamlined portion comprises means which are configured to cooperate with the stiffening members in order to guide by longitudinal sliding the flat wiper relative to the streamlined portion.

An embodiment consists in that the guide means cooperating with the stiffening members, are positioned on a portion of the terminal cap, said terminal cap being configured to receive an end piece. Once the wiper blade is assembled, the guide means are provided adjacent to the terminal end of the end piece. Specifically, the guide means are located at the boundary between the terminal cap and the portion of the terminal cap covering the end piece on top and laterally at the guide means area.

The invention may comprise one or more of the following features, said features also being able to be combined with one or more other features of one or more other embodiments of the invention:

the means for guiding comprise two substantially L-shaped lateral hooks, which are configured to extend on each side of said streamlined member, each hook comprising a substantially vertical part, the lower end thereof being connected to a substantially horizontal part extending on the side of the other hook, the substantially horizontal part of each hook extends below the corresponding stiffening member, the substantially vertical part of each hook extends at the side of the corresponding stiffening member, the blade is configured to act transversely upon the stiffening members so that they bear against the hooks, the hooks comprise means for bearing at regular intervals against the stiffening members or against the heel of the wiper blade.

The present invention further relates to a streamlined portion for a streamlined flat windscreen wiper, in particular for a vehicle, comprising means for slidable guiding which are configured to cooperate with the stiffening members of said wiper.

The invention may comprise one or more of the following features, said features also being able to be combined with one or more other features of one or more other embodiments of the invention:

the means for guiding comprise two substantially L-shaped lateral hooks which are configured to extend on each side of said streamlined member, each hook comprising a substantially vertical part, the lower end thereof being connected to a substantially horizontal part extending on the side of the other hook, the substantially horizontal part of each hook is configured to extend below the corresponding stiffening member, the substantially vertical part of each hook is configured to extend at the side of the corresponding stiffening member, the blade is configured to act transversely upon the stiffening members so that they bear against the hooks, the hooks comprise means for bearing at regular intervals against the stiffening members or the heel of the wiper blade.

According to a fortieth embodiment, the invention relates to a streamlined flat windscreen wiper, in particular for a vehicle, characterized in that it comprises means for heating and/or fluid distribution.

The invention may comprise one or more of the following features, said features also being able to be combined with one or more other features of one or more other embodiments of the invention:

the wiper comprises a streamlined portion and a flat wiper, said means for heating and/or fluid distribution being carried by the streamlined portion and/or the flat wiper, the flat wiper comprises at least one stiffening member having an elongated shape, said stiffening member comprising means for heating on at least one of its longitudinal faces, the wiper comprises means for heating on the upper longitudinal face of the stiffening member, the means for heating comprise at least one resistive heating element designed to be connected to an electrical supply source, the wiper comprises a streamlined portion and a flat wiper, the flat wiper comprising at least one longitudinal spray line for fluid distribution and for supplying fluid to spray orifices, the wiper comprises a spray line on each side of the flat wiper, the or each spray line is connected to a tube or channel for the supply of fluid in the region of a central part of the wiper or in the region of an end part of the wiper, the or each spray line is fixed to a longitudinal member for retaining a stiffening member and/or a wiper blade of said wiper.

The different features and variants disclosed above and presented by way of example in the form of a list (with bullet points) may naturally be combined with one another, even in the case where the features relate to two or more embodiments of the invention. In other words, the invention relates to a large number of embodiments, the different features thereof being able to be combined with one another in a non-limiting manner.

In the aspects of the invention described hereinabove, the connection means formed on the central mounting extends longitudinally at one longitudinal end of the central mounting. By way of example, it is the finger provided in the end of the central mounting. On the terminal cap side, the connection means are formed in the volume delimited by the dihedron and therefore does not protrude longitudinally beyond the cap. Such an organization offers an apparent advantage during the assembly procedure. Specifically, all that is required is for the central mounting to be secured, then the terminal cap or caps lowered onto the means of connection in order to achieve assembly. It is thus easier to generate a downward force to effect attachment, rather than pulling on a component. Moreover, such a mode of assembly allows the mounting and the end piece to be joined together before they are assembled on the central mounting.

DESCRIPTION OF THE FIGURES

The invention will be understood more clearly and further details, features and advantages of the invention will appear from reading the following description provided by way of non-limiting example and with reference to the accompanying drawings, in which:

FIG. 6 is a view in cross section of the wiper of FIG. 1, FIG. 7 is a schematic view in larger scale of the means for fixing the mounting of the wiper of FIG. 1, FIGS. 8a to 8c show schematically variants of a part of a wiper according to the invention, FIGS. 48 and 49 are schematic partial views of a streamlined flat wiper and an adapter for connecting said wiper to a rod-shaped drive arm in an exploded perspective view in FIG. 48 and in a non-exploded perspective view in FIG. 49, FIG. 50 is a schematic perspective view of the adapter and the rod-shaped arm of FIGS. 48 and 49, FIG. 51 is a schematic perspective view of the adapter of FIGS. 48 and 49, FIG. 94 is a schematic perspective view of a free end of a wiper according to the invention, FIGS. 95a and 95b are schematic perspective views of an end piece of the wiper of FIG. 94, FIGS. 96 to 98 are further schematic views of the free end of the wiper of FIG. 94, in longitudinal section in FIG. 98, FIGS. 99a and 99b are schematic perspective views of a free end of a wiper according to the invention and show the steps of dismantling a wiper blade from said wiper, FIG. 110 is a schematic perspective view of a wiper according to the invention, FIG. 111 is a schematic perspective view of an end of a wiper according to the invention, FIG. 112 is a schematic perspective view of means of heating a wiper according to the invention.

DETAILED DESCRIPTION

It should be mentioned that the figures describe the invention in a detailed manner in order to implement the invention, said figures naturally being able to serve to define the invention more clearly if required.

In the remainder of the description, the terms "longitudinal" or "lateral" refer to the orientation of the windscreen wiper according to the invention. The longitudinal direction corresponds to the principal axis of the wiper in which it extends, whilst the lateral orientations correspond to intersecting straight lines, i.e. lines which intersect the longitudinal direction, in particular perpendicular to the longitudinal axis of the wiper in its rotational plane. For the longitudinal directions, the terms "outside" or "inside" are understood relative to the fixing point of the wiper on a wiper carrier arm, the term "inside" corresponding to the part where the arm and a half-wiper extend. Finally, the directions referenced as "upper" or "lower" correspond to orientations perpendicular to the rotational plane of the windscreen wiper, the term "lower" containing the plane of the windscreen.

If relevant, the term "inside" or "internal" may refer to the inside of a part or to the inside/internal side of a part, compared to the outside of a part (which permits, for example, visible or external embodiments of the part to be qualified) or the outside/external side of the part.

Figure 1:
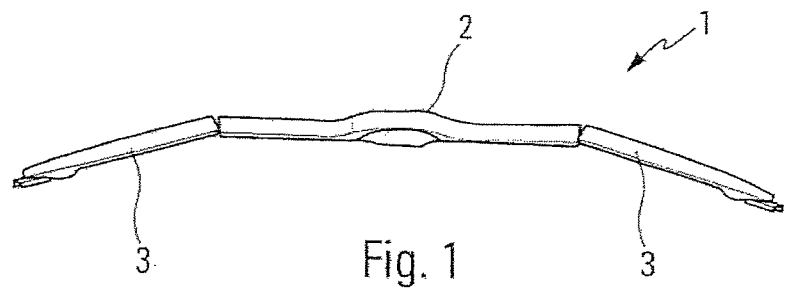
FIG. 1 is a schematic perspective view of a streamlined flat windscreen wiper according to the invention, in the unstressed free state.

FIG. 1 shows a streamlined flat wiper 1 according to the invention, i.e. a flat wiper provided with a streamlined portion, the streamlined flat wiper 1 in this case being in the unstressed free position in space.

The upper part of the wiper 1 is formed by the streamlined portion which comprises an aerodynamic shape which deflects upwardly the air which arrives on the windscreen. The streamlined portion thus forms an aerodynamic baffle. The deviation of the aforementioned air generates a bearing force of the wiper 1 on the windscreen which ensures, in association with a second bearing force generated by a pressure of the arm, a permanent contact on the windscreen and thus reliable wiping.

This streamlined portion has substantially the shape of a dihedron formed from two longitudinal walls which are joined in the upper part in the region of a top edge, the front wall having a hollow aerodynamic shape whilst the rear wall is substantially planar in the example shown. The inside of the dihedron is hollow so as to allow space to house therein the elements which form a wiping unit of a flat wiper, which will be disclosed below in detail.

The streamlined portion is produced in three parts which are articulated to one another. The central part, denoted hereinafter the central mounting 2, fulfils the functions of a connector of a non-streamlined flat wiper, i.e. the various elements which extend over the entire length of the wiper 1 are attached thereto. With the exception of its centre which has substantially parallel vertical walls to be able to house relative to one another an adapter, this central mounting 2 has the streamlined shape in the form of an aerodynamic baffle disclosed above. It thus comprises two longitudinal lateral walls 2a, 2b, the longitudinal upper edges thereof being connected to one another so that said walls substantially form a dihedron. Two parts in eccentric longitudinal positions, denoted hereinafter terminal caps 3, are attached to this central mounting. These two caps in turn have over their entire length the streamlined shape of an aerodynamic baffle. Each cap 3 thus comprises two longitudinal lateral walls 3a, 3b, the upper longitudinal edges thereof being connected together so that said walls substantially form a dihedron.

A first terminal cap 3 extends to the inside whilst the second terminal cap extends to the outside. The connection between the central mounting 2 and each of the terminal caps 3 is an articulation which pivots about a pin orientated in a lateral or transverse direction, such that the two terminal caps 3 are displaced in a plane perpendicular to the rotational plane of the wiper. The fracture thus created between the central mounting 2 and the terminal caps 3 prevents the outside and inside ends of the wiper from being applied against the windscreen with a pressure which is less than that exerted in the region of the central mounting, due to a greater distance from their bearing point relative to the drive arm of the wiper.

The central part of the central mounting 2 has a greater height than the remainder of the wiper, due to its function as a connector which permits the means for attaching the wiper to the drive arm to be housed therein and, in particular, an adapter.

Figure 2:
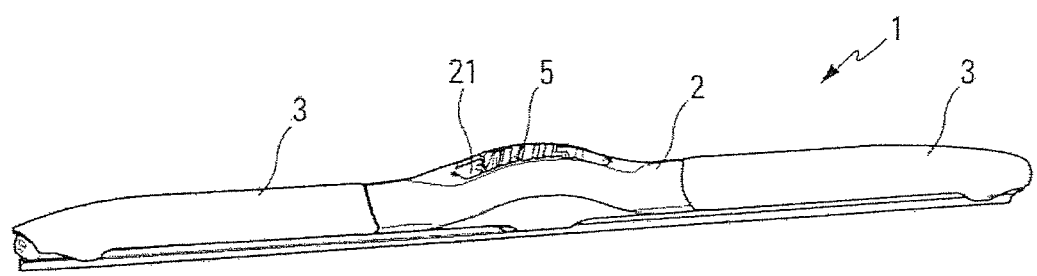
FIG. 2 is a schematic perspective view of the wiper of FIG. 1 when it bears against a window, in particular of a vehicle.

FIG. 2 shows the same wiper 1 in a position bearing against a window, shown here for reasons of simplification in the form of a planar surface. The articulations between the central mounting 2 and the two terminal caps 3 are closed, i.e. these caps are positioned in the axis of the central mounting, the upper surfaces of these three parts forming a continuous streamlined surface. An aperture 21 is cut out from the central part of the central mounting 2 through which passes the end of a drive arm and comprises a transverse pin on which the adapter is fixed (not shown) which ensures the attachment of the wiper to the arm.

Figure 3:
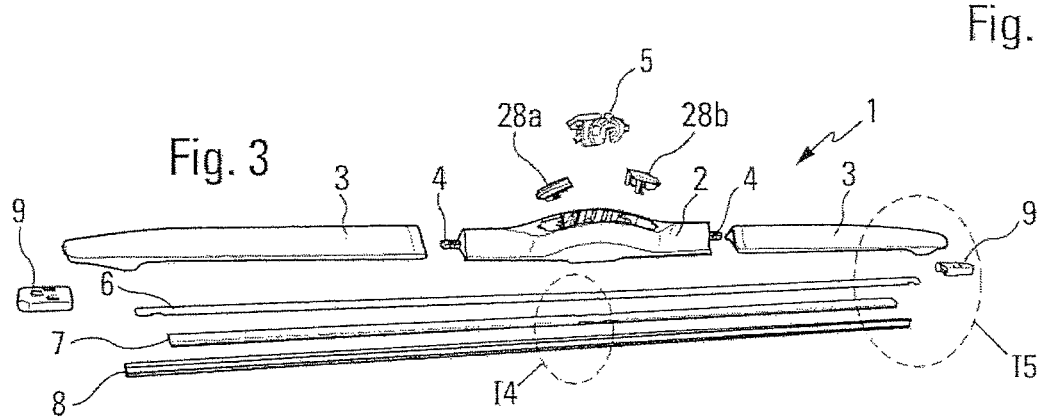
FIG. 3 is a schematic perspective exploded view of the wiper of FIG. 1, FIGS. 4 and 5 are views in larger scale of the details 14 and 15 of FIG. 3 respectively.

FIG. 3 shows the wiper 1 in an exploded view. The central mounting 2 comprises longitudinally, on both sides, two means for connecting or articulation which comprise fingers 4 which extend longitudinally from the body of the mounting. Said fingers 4 comprise an orifice, oriented laterally or transversely, designed to receive a pivot pin carried by the corresponding terminal cap 3. The cooperation of this pivot pin with the orifice of the finger 4 permits the rotation of the cap 3 relative to the central mounting 2 in a plane perpendicular to the rotational plane of the wiper 1.

Below these elements are shown respectively a stiffening member 6, a member for retaining or retention 7 and a wiper blade 8, the assembly of these three elements forming what will be called hereinafter a wiping unit. The stiffening member 6 has the purpose of serving as a structure to the wiper by providing it with a curved shape which corresponds to the average shape of the windscreen on which the wiper is displaced. Its longitudinal rigidity permits, as in a conventional flat wiper, sufficient pressure to be maintained at the two ends of the wiper, such that the wiping is carried out uniformly over the entire surface to be wiped.

The member for retaining 7 constitutes the carrier element, both of the stiffening member 6 and the wiper blade 8. It will be described in more detail, as well as its device for fixing to the central mounting 2, with reference to FIGS. 6 to 8.

The wiper blade 8 is a conventional blade made of elastomeric material, which is carried by the member for retaining 7 and which has the purpose of remaining in permanent contact with the windscreen.

FIG. 3 shows, moreover, two end pieces 9 which have the function of combining the three preceding elements at the end thereof and blocking said elements longitudinally. Each end piece 9 has, moreover, a longitudinal stop 94 against which a bearing face borne by the corresponding terminal cap 3 bears. This cooperation of the longitudinal stop and the bearing face of the cap prevent the three elements of the wiping unit from extending longitudinally when the cap pivots relative to the central mounting 2 and in this manner it forces them to bend so that they follow the curvature of the windscreen. The device $I_4$ for fixing these three elements is illustrated in detail in FIG. 4, whilst the device $I_5$ for the cooperation of the end of these elements with the end piece 9 is illustrated in FIG. 5.

Figures 4, 5:
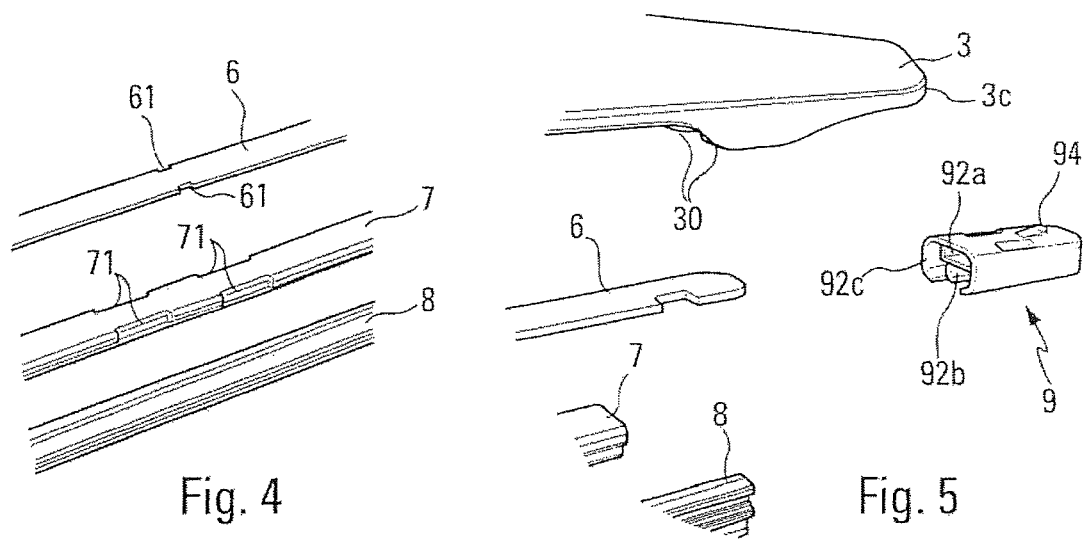

In FIG. 4 is seen firstly the stiffening member 6 which has the shape of a thin metal strip of parallelepipedal shape and which has a notch 61 in the centre of each of its longitudinal edges.

The member for retaining 7 is for instance in one piece and unitary, and it comprises, in turn, four cut-outs 71 which are positioned longitudinally side-by-side in the region of the centre thereof, and which are formed in pairs on the upper longitudinal edges of the member 7. They have the purpose of allowing hooks to pass, said hooks extending laterally in the lower part of the central mounting 2 in order to ensure, by means of the stiffening member 6, the fixing of the central mounting of the wiping unit, as will be explained in more detail with reference to FIGS. 7 and 23.

In FIG. 5, it may be seen that the longitudinal end of one of the terminal caps 3 and the end piece 9 are connected. One of the ends of the stiffening member 6, the member for retaining 7 and the wiper blade 8 are also seen. The end piece 9 externally has a substantially hollow parallelepipedal shape and it comprises internally two housings or cavities 92a, 92b (respectively upper and lower) oriented longitudinally and designed to receive the end of a part of the stiffening member 6 and, on the other hand, the wiper blade 8. A third housing 92c may also be provided for the introduction of the longitudinal end of the member for retaining 7. Each housing 92a, 92b comprises an open longitudinal end and a closed longitudinal end. The housings 92a, 92b are formed by walls inside the end piece 9 which reproduce, by extending it, the shape of the stiffening member 6 and the wiper blade 8. Thus a continuity is present in the retention of the stiffening member 6 and the wiper blade 8 when said stiffening member and wiper blade pass from the member for retaining 7 to the end piece 9. Vertical ribs (not visible in the figure) are also positioned longitudinally in the upper cavity 92a of the end piece 9, i.e. that which receives the stiffening member 6, to reduce the height of said cavity and to bear against the stiffening member once it has been inserted. Finally, the lateral walls of this cavity 92a are flexible so as to be able to be separated during the introduction of the stiffening member 6 whilst at the same time being resistant to this flexion in order to compress the stiffening member laterally and cause it to be clamped in the end piece. This permits the detachment of the end piece 9 to be prevented, once it is installed at the end of the wiper.

The terminal cap 3 comprises at its free end, visible in FIG. 5, two lateral flanges 30 which are substantially parallel and define relative to one another a space which is configured to receive the end piece 9. The longitudinal ends of these flanges 30, located on the side of the free end of the cap 3, are connected together by a transverse flange 3c which is designed to cooperate with the aforementioned stop 94 of the end piece 9, as will be disclosed in more detail below with reference to FIG. 24.

FIG. 6 illustrates the circulation of air in the vicinity of a wiper 1 according to the invention. The wiper 1 is shown in section along a plane transverse to its longitudinal direction in the region of the half-wiper located on the inside. The air arriving on the windscreen is diverted upwardly via the streamlined portion of the central mounting 2 (or that of the terminal cap 3) and passes between this streamlined portion and the arm 10 (since the section is formed on the inside).

It is observed here that the lower longitudinal edges of the longitudinal lateral walls 2a, 2b of the mounting 2 are not located in the same position vertically or in the vertical direction (the horizontal direction being substantially parallel to the windscreen and thus the vertical direction being substantially parallel to the windscreen), the lower edge of the wall 2a being located lower than that of the wall 2b. In other words, the lower edge of the wall 2a is located substantially in a first substantially horizontal longitudinal plane P6 which is spaced apart therefrom and in this case below a second substantially horizontal longitudinal plane P7 passing substantially through the lower edge of the wall 2b. This applies similarly to the lower edges of each of the terminal caps 3.

The wiping unit, i.e. the assembly of the three elements, stiffening member 6, member for retaining 7 and the wiper blade 8, appears below the streamlined portion of the central mounting 2 in the offset position relative to the top edge 2d of this streamlined portion, on the side of the front wall of the air baffle. This positioning corresponds more specifically to the centre of the lower ends of the walls of the streamlined portion since said walls are in the extension of the lateral faces of the central mounting in the region of its aperture 21, thus at its widest location. Also seen in this figure is the arrangement of the three elements of the wiping unit: the member for retaining 7, in cross section, has the shape of a closed parallelepipedal tube 72 from which extend downwardly two hooks 73 oriented toward one another, thus forming a parallelepipedal cavity which is open downwardly. The stiffening member 7 is slipped into the upper tube 72 which it fills, whilst maintaining the ability to slide longitudinally inside, whilst the wiper blade 8, most clearly visible in FIG. 8a, is carried by its upper part, or heel 81, which has a substantially rectangular shape, by the two hooks 73. The lower part 82 of the wiper blade 8 extends from the lower cavity of the member for retaining 7 in the direction of the windscreen and is terminated by a terminal part 83 which conventionally has the shape of an inverted fir tree.

FIG. 7 shows in perspective, in a view from below, the central mounting 2, with means for fixing the wiping unit, which serves as a connector. The parts of the lateral walls 2a, 2b located on both sides of the aperture 21 extend downwardly until they pass the space allocated to the adapter 5 and each comprise two hooks 23 at their lower end. Each hook 23 of one lateral wall 2a is substantially opposite a hook 23 of the other lateral wall 2b and extends toward said other hook. The means for fixing comprise, therefore, two pairs of lateral hooks, the hooks of one pair being longitudinally spaced apart from the hooks of the other pair. Each hook 23 defines a longitudinal notch 23a which is configured to receive the stiffening member 6 by longitudinal sliding. In the example shown, the transverse plane P passing through the pin 25 passes substantially between the two pairs of hooks 23 and equidistant therefrom.

The longitudinal extent of these hooks is slightly less than that of the cut-outs 71 which are formed in the member for retaining 7. As regards the lateral extent thereof, it is such that the spacing therebetween is greater than the depth of the cut-outs 71, such that these means may be inserted into the internal cavity of the central mounting by introducing them from the bottom. Finally, this spacing is less than the width of the member for retaining 7, such that said member for retaining is able to rest on the hooks 23 after the positioning of the wiping unit.

Thus it is seen how the wiping unit is mounted on the central mounting 2, which acts here as a connector: the member for retaining 7, possibly provided with its wiper blade 8 but without the stiffening member 6, is introduced from the bottom into the internal cavity of the central mounting 2, by passing the hooks 23 into the cut-outs 71 thereof. At least one substantially horizontal longitudinal plate forming a vertical stop (not shown in FIG. 7) generally extends above the hooks 23 to serve as a limit to the introduction of the member for retaining 7 in the internal cavity in the lower part of the central mounting 2. In this position, the upper tube 72 of the member for retaining 7 is aligned with the upper face of the hooks 23 which creates a continuous groove for the passage of the stiffening member 6. The operator therefore slides this stiffening member into the upper tube 72 from one of the longitudinal ends of the member for retaining, causes it to pass through the central mounting 2 by sliding it on the hooks 23 in the region of the cut-outs 71 of the member for retaining, then pushes it to the other end of the member for retaining. The wiping unit is then immobilized vertically by the member for retaining which rests on the hooks 23 and longitudinally by the overlapping of these same hooks 23 in the cut-outs 71 of the member for retaining 7.

FIG. 8 illustrates three variants of the member for retaining 7 in which the upper tube 72 consists of a parallelepiped, the rectangle thereof in cross section being either entirely closed (FIG. 8a) or open on its lower face (FIG. 8b), or open on its upper face (FIG. 8c). In the three cases, the tube remains sufficiently closed for the stiffening member 6 to be correctly retained in the tube 72. The three variants, however, preserve the same shape for the lower hooks 73 which serve for retaining the wiper blade 8.

Observed in these variants are small ribs 74 which extend longitudinally over the internal surface of the tube 72 to apply compression onto the stiffening member 6 and to retain it longitudinally once it has been forcibly introduced into this tube. Similarly, the heel 81 of the wiper blade 8 which is inserted by longitudinal sliding between the hooks 73 of the member for retaining 7 comprises longitudinal protuberances which rub against said hooks during the introduction of the blade so as to ensure a certain longitudinal and lateral retention of this blade.

Figure 9:
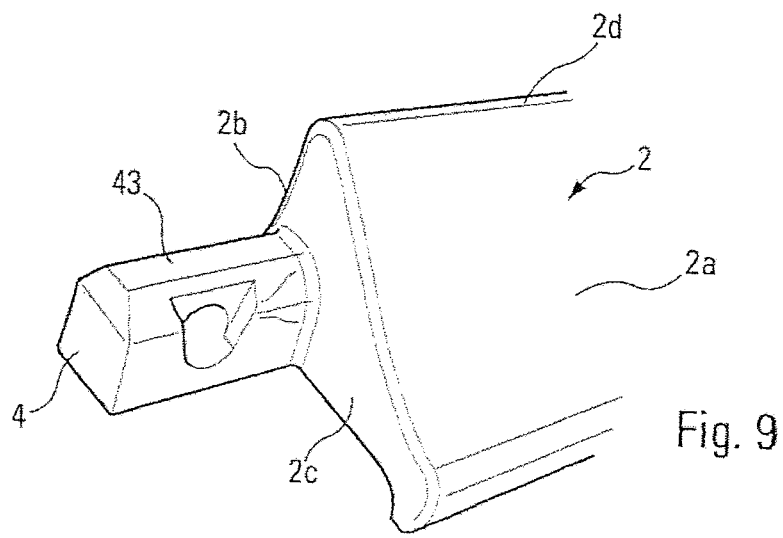
FIGS. 9, 11 and 12 are schematic perspective views of means for connecting a mounting to terminal caps of a wiper according to the invention.

FIG. 9 and thereafter disclose in more detail the articulation between the central mounting 2 and the terminal caps 3.

In FIG. 9 are seen the longitudinal walls 2a at the front and 2b at the rear, which form the dihedron of the aerodynamic baffle of the central mounting 2 by being joined together on a top edge 2d, this dihedron being terminated longitudinally by a transverse wall 2c which closes the dihedron. From this transverse wall 2c extends a finger 4. It will therefore be appreciated that the finger 4 protrudes from the transverse wall 2c towards the outside of the mounting. This finger 4 is of substantially parallelepipedal shape which is traversed by an orifice 41 designed to serve as a support to the pin 31 which permits the pivoting of the corresponding cap 3.

Figure 10:
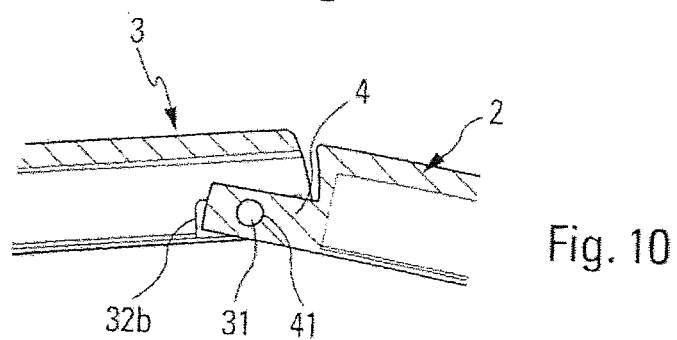
FIG. 10 is a view in longitudinal section of said means for connecting.

FIG. 10 shows in section said terminal cap 3 mounted on the central mounting 2 with a pivot pin of the cap 31 which extends from one of the lateral walls of the cap and traverses the orifice 41 of the finger 4.

Figure 11:
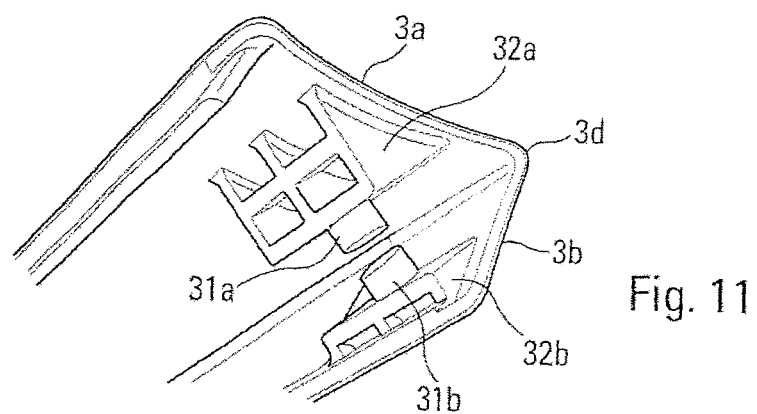

With reference to FIG. 11, the interior of the part of the cap 2 which cooperates with the central mounting 2 is seen. Inside the dihedron formed by the longitudinal walls 3a and 3b of the cap extend two reinforcements 32a and 32b which bear against said longitudinal walls and which extend to form two planar faces, both oriented in a vertical plane and facing one another. From these two planar faces extend two journals 31a and 31b which are aligned and together form the pin 31 on which the cap 3 rotates. The spacing left between the two journals 31a and 31b is sufficiently small and in any case less than the length of the orifice 41, so that said journals retain the finger 4 once mounted, and sufficiently wide for the finger to be able to be inserted therein by separating the two longitudinal walls 3a and 3b from one another due to the flexibility of the cap. The upper face 43 of the finger 4 may be chamfered to facilitate this insertion. The insertion takes place here in a direction substantially perpendicular to the longitudinal axis of the finger 4. The finger 4 comprises on its lateral faces two substantially vertical apertures 41a which extend substantially between the upper face 43 and the orifice 41. Said apertures 41a are designed for receiving and guiding the journals 31a, 31b during the mounting of the finger in the aforementioned direction.

It is also observed in FIG. 11 that the upper longitudinal edges of the walls 3a, 3b are connected together to form an upper longitudinal edge 3d of the cap.

Figure 12:
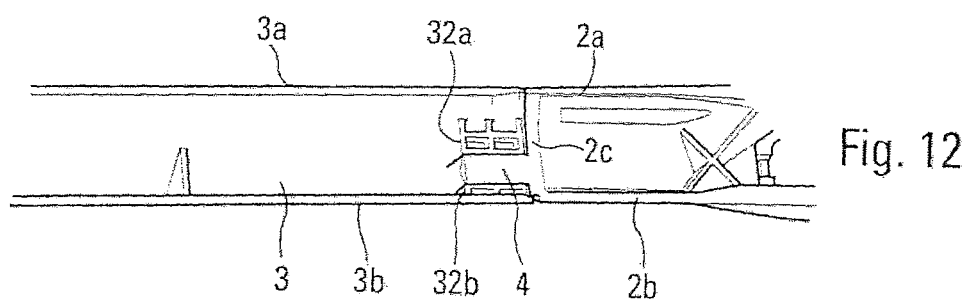

FIG. 12 shows, in a view from below, the central mounting 2 and a terminal cap 3 assembled, the finger 4 being positioned between the two reinforcements 32a and 32b and, in a manner which is not visible, the two journals 31a and 31b being inserted into the orifice 41 of this finger.

Alternatively, not shown, the finger 4 may carry two journals extending on both sides of its lateral faces and the reinforcements of the cap 3 comprise in this case holes into which said journals are inserted.

Figure 13:
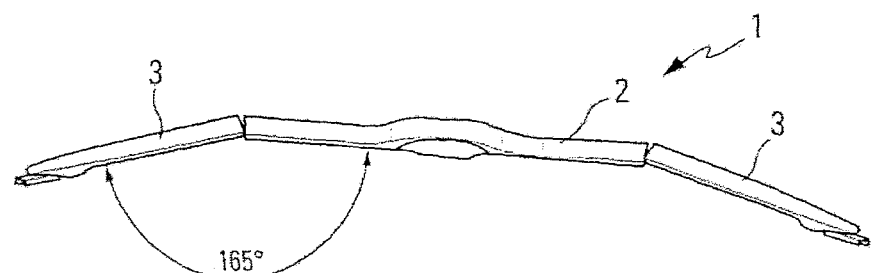
FIG. 13 is a schematic perspective view of a streamlined flat windscreen wiper according to the invention in the unstressed free state and shows terminal caps of this wiper in one of the extreme positions thereof.

With reference now to FIGS. 13 to 16, a device is seen which permits the angular amplitude of the articulation between the central mounting 2 and the terminal caps 3 to be limited. More specifically, an angle which is too great would be disadvantageous for correct wiping of the windscreen, in that the pressure of the wiper on the windscreen would not be uniformly distributed. The maximum acceptable angle for the fracture between the central mounting 2 and each of the terminal caps 3 is, as seen in FIG. 13, 165° for example. It is appropriate, therefore, to position stops on the two elements to prevent this value from being exceeded. The positioning of these stops, which is most advantageous to obtain this angular limitation, consists in positioning them as close as possible to the pin 31 for pivoting the cap 3.

Figure 14:
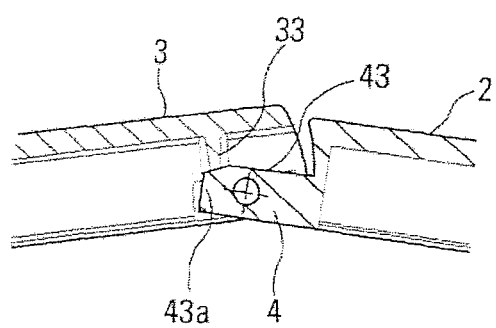
FIG. 14 is a view in longitudinal section of an embodiment of means for connecting a mounting to terminal caps of a wiper according to the invention.

FIG. 14 shows a first embodiment for positioning these stops, in which the cap 3 comprises in the internal space defined by its longitudinal walls 3a, 3b a protruding stop 33 which extends above the finger 4. This stop 33 is configured to cooperate with the finger 4 in order to define an extreme pivoting position of the cap 3 relative to the mounting 2. The stop is formed by a rib 33 which extends transversely between the internal faces of the longitudinal walls 3a, 3b of the cap 3. The lower free end of the rib 33 is chamfered so as to define a bearing face. For improved cooperation with this stop, the finger 4 comprises a chamfer at its free end 43a forming a stop, the plane of said chamfer being aligned with the lower plane of the rib 33 when said rib is in abutment against the finger 4, i.e. when the cap 3 is at its maximum angular extension.

Figure 15:
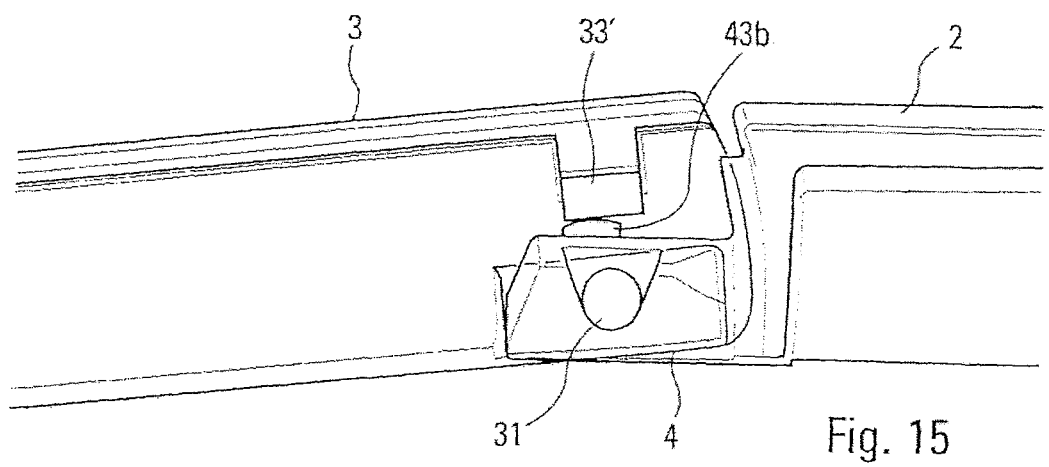
FIGS. 15 and 16 are schematic views in longitudinal section and in perspective, respectively, of a further embodiment of the means for connecting a mounting to terminal caps of a wiper according to the invention.
Figure 16:
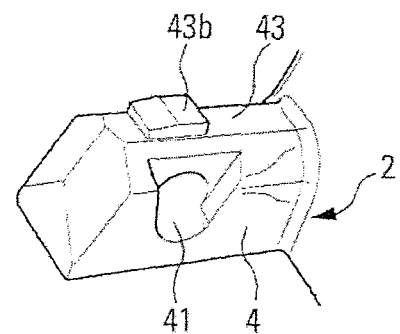

FIGS. 15 and 16 disclose respectively in section and in perspective a further embodiment for the positioning of these stops. The cap 3 comprises here a protruding stop 33' formed by a substantially longitudinal rib. This rib 33' is oriented from top to bottom and extends from the top edge of the terminal cap 3. It thus extends in this case from the area for connecting the upper longitudinal edges of the longitudinal walls 3a, 3b of the cap. The lower free end of the rib 33' is chamfered to define a bearing face. The finger 4 carries here an overthickness 43b on its upper face 43 which is brought opposite the rib 33'. This overthickness 43b of substantially parallelepipedal shape aligned with the longitudinal direction and with the direction of elongation of the finger comprises toward the outside, as above, a chamfered part, the plane thereof being aligned with the lower plane of the rib 33', when said rib is in abutment with the finger 4.

In the two cases shown in FIGS. 14 to 16, the rib 33, 33' forms a protruding stop. The free end 43a of the finger 4 carrying the chamfer forms a protruding stop and the overthickness 43b also forms a protruding stop. The mounting 2 and the caps 3 cooperate together, therefore, by means of the protruding stops.

Figure 17:
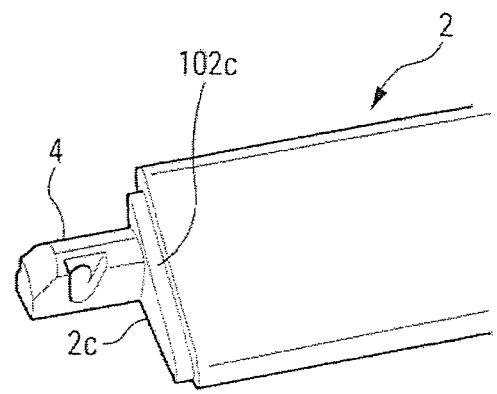
FIGS. 17 and 18 are schematic perspective views of parts of a mounting and a terminal cap of a wiper according to the invention.
Figure 18:
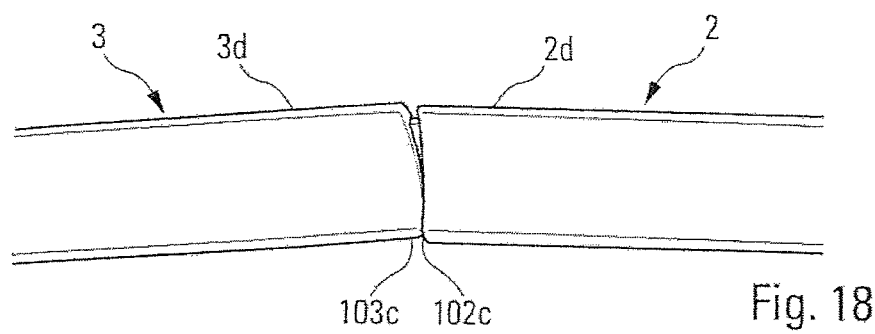

FIGS. 17 and 18 describe the manner in which the two ends of the central mounting 2 and the corresponding cap 3 cooperate. In FIG. 17 is seen the transverse wall 2c which closes the dihedron of the mounting 2 and from which the finger 4 extends. In this embodiment of a windscreen wiper, this wall 2c defines a peripheral edge 102c which reproduces the shape of the longitudinal walls 2a, 2b of the central mounting 2 by reducing it into a homothetic transformation having a ratio of slightly less than 1. This edge 102c is similar to a groove of the external periphery of the mounting 2. It extends longitudinally from the end of the longitudinal walls 2a, 2b over a relatively short length, ranging between 1 and 5 mm. The edge 102c extends over the entire transverse and vertical extent of the longitudinal walls 2a, 2b.

Similarly, the longitudinal end of the terminal cap 3 has a hollow shape and in turn defines a peripheral edge 103c which may receive the peripheral edge 102c of the central mounting 2. The edge 102c thus forms a male edge engaged in the edge 103c which is a female edge. The edge 103c reproduces the shape of the longitudinal walls 3a, 3b of the cap 3.

In this manner, and taking into account the selected length for the peripheral edge 102c, by engaging in the longitudinal end of the terminal cap 3, said peripheral edge is covered thereby, whether the articulation is in the position where the streamlined portions are aligned or in the maximum angular open position. This configuration provides an aerodynamic continuity to the streamlined portions of the central mounting 2 and the terminal caps 3, by preventing air circulating on the windscreen from escaping there between. As a result, it permits the aerodynamic efficiency of the wiper to be improved, by preventing the level of pressure which is applied thereto by the air from being reduced.

Figure 19:
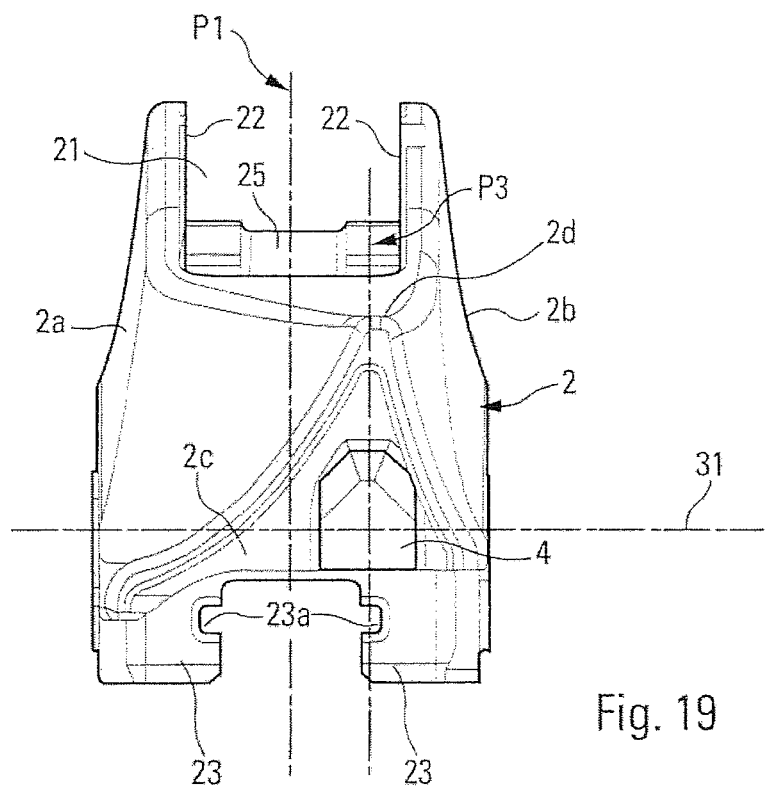
FIG. 19 is a perspective view of a mounting of a wiper according to the invention, viewed from the side.

FIG. 19 shows the central mounting 2 in a longitudinal direction. Upstream of the aperture 21 of the mounting, the dihedron which is formed by the longitudinal walls 2a and 2b and the top edge 2d where they are joined together is seen in this figure.

It is observed in FIG. 19 that the finger 4 has an axis of elongation extending in a longitudinal plane P3 which is substantially perpendicular to said corresponding pivot pin 31 and which passes substantially through the top edge 2d of the dihedron. It is also observed that the plane P3 is parallel to, and spaced apart from, the central longitudinal plane P1 of the aperture 21. This plane P1 passes through the centre of the means for fixing to hooks 23. It may be noted that the edge 2d extends substantially parallel to, and remotely from, the plane P1. It is located in the plane P3.

Also seen in FIG. 19 are the means for fixing the wiping unit. In particular, the hooks 23 for supporting the member for retaining 7 are seen, said hooks in this case forming part of a parallelepipedal assembly which extends longitudinally over the entire length of the hooks 23 and from which two notches 23a are hollowed out, positioned symmetrically on both sides of the lower edges of the dihedron formed by the lateral walls 2a and 2b. These notches 23a form a guide for the passage of the stiffening member 6 during the fixing of the member for retaining 7 on the central mounting 2. The upper wall of this parallelepiped in turn forms the longitudinal plate forming the vertical stop during the introduction of the member for retaining 7 in the internal cavity of the central mounting 2.

For reasons of optimizing the aerodynamic performance of the streamlined portions of the central mounting 2 or the terminal caps 3, the top edge 2d is offset laterally downstream (in relation to the direction of circulation of the flow of air) relative to the central plane P1 of the wiping unit or the centre of the central mounting 2. For reasons of improved mechanical strength, the finger 4 is positioned substantially below the dihedron formed by the longitudinal walls 2a and 2b, i.e. at a position where the density of the material for this dihedron is at its greatest.

Figure 20:
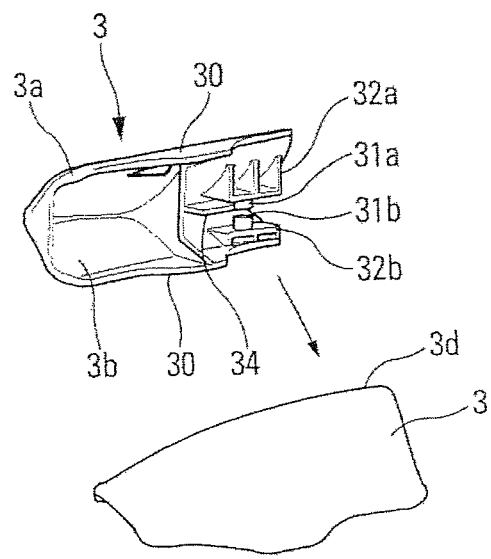
FIGS. 20 and 21 are schematic partial perspective views of a wiper according to the invention which is partially dismantled in FIG. 20, FIGS. 22 and 23 are schematic partial perspective views of a wiper according to the invention which is partially dismantled in FIG. 22, FIGS. 24 to 27 are schematic partial perspective views of an end part of a wiper according to the invention.
Figure 21:
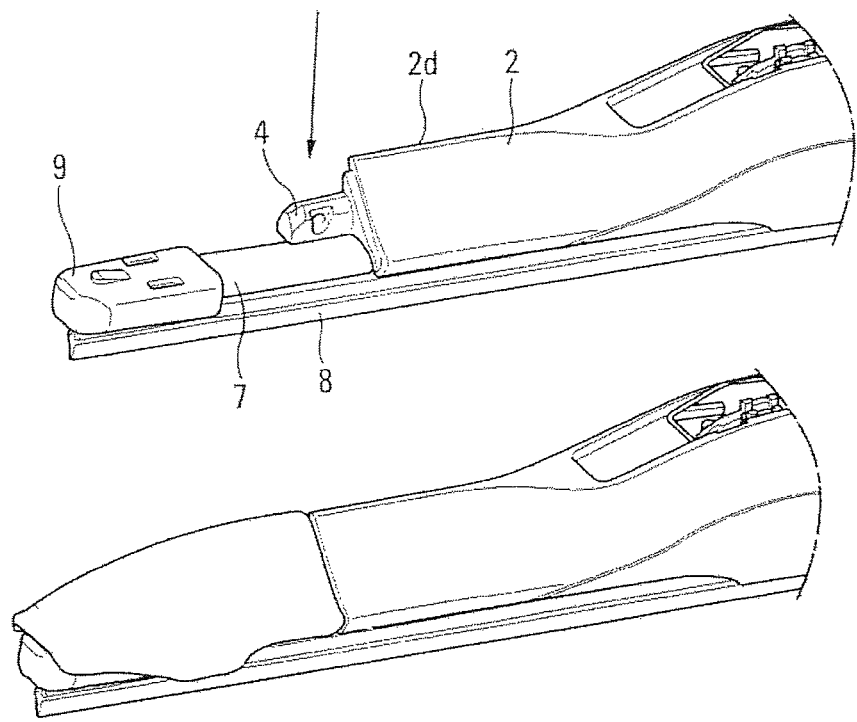

With reference to FIGS. 20 and 21, a particular embodiment is seen of a wiper adapted to windscreen wipers of small size. In this embodiment, the length of the terminal caps 3 is small relative to that of the central mounting 2. This type of windscreen wiper is adapted to windows of small dimensions, and as a result of small curvature, such as for example a rear window of a motor vehicle. As a result, it is not necessary to use an articulation which offsets the axis of the terminal caps 3 from that of the central mounting 2. However, for reasons of saving costs in terms of logistics, it is important for the manufacturer to reduce the number of parts. To achieve this, the invention specifies retaining a single model of central mounting 2 and, as a result, the same adapter 5 for a plurality of models. As a result, it becomes possible to propose a terminal cap 3 which comprises a device for blocking the rotation thereof relative to this central mounting, whilst conserving the same means for fixing to the central mounting 2.

Between the two reinforcements 32a and 32b of the lateral walls 3a and 3b and the journals 31a and 31b which usually serve as a pivot pin for the cap, a rib of the cap 34 which extends longitudinally on both sides of the pin formed by the two journals is seen in FIG. 20. It is positioned and extends vertically such that, in the position of the assembled cap, it is in contact with the upper face 43 of the finger 4 and forms a protruding stop preventing the rotation of the cap 3 about said finger 4.

FIG. 21 shows a short cap 3 mounted on the central mounting 2. Its inside end bears against the outside end of the central mounting and, not visible in the figure, the rib of the cap 34 blocks any rotation of the cap in either direction. However, it may be noted that the rib 34 is only able to extend on one side relative to the journals 31a and 31b by preventing the rotation of the cap in the closing direction, the blockage during opening being provided by the cooperation of the combined longitudinal ends of the cap 3 and the central mounting 2.

Figure 22:
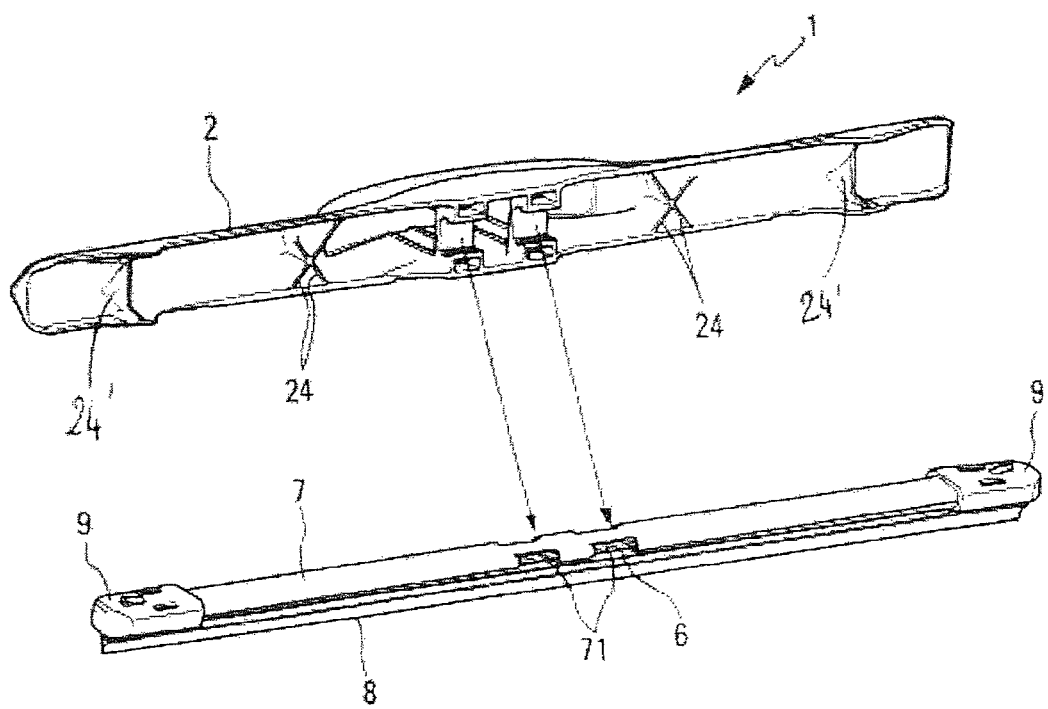
Figure 23:
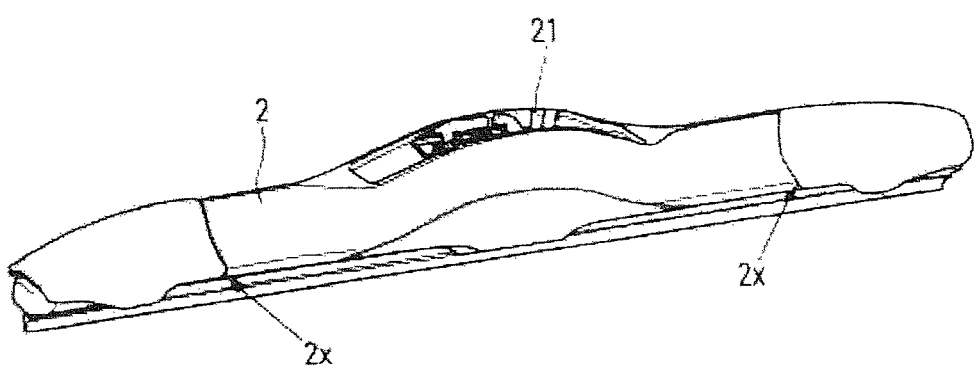

FIGS. 22 and 23 show, respectively in the disassembled version and in the assembled version, a variant of the streamlined portion of a wiper designed for a windscreen wiper of small size. In contrast to FIGS. 20 and 21, the streamlined portion of the two terminal caps 3 is produced here in one piece with that of the central mounting 2. The devices used for articulation such as the finger 4 or the journals 31a and 31b are therefore dispensed with. Thus the production of the caps is facilitated. Also, for reasons of uniformity of appearance of the range of the windscreen wiper products, grooves 2x are designed on the common cap, in the region where the articulations would be located between the central mounting 2 and the terminal caps 3.

FIG. 22 also shows the internal part of the central mounting 2, whether it is formed in one piece with the terminal caps 3 or not. Taking account of the elongation of this central mounting 2, it may be necessary to place reinforcing or stiffening ribs 24 or strip 24' inside the dihedron formed by the two longitudinal walls 2a and 2b. The invention specifies providing a crossbar 24 shape thereto, the common axis thereof being oriented vertically, i.e. it extends from the edge in the direction of the base of the dihedron or strip 24'. Due to the flaring of the dihedron toward the bottom, said reinforcing ribs 24 constitute ideal bearing points to ensure the ejection of the central mounting from the injection mould, said parts generally being made of polymer material and produced by a hot injection-moulding process.

According to the invention it is also possible to provide at feast one rib, preferably two, extending substantially transversely to the direction of extension of the central mounting 2.

The ribs 24 may thus comprise at least one mark of a bearing point for the ejection of the mounting 2 from a manufacturing mould. This mark is generally located on the lower free edge of the rib 24. At least one mark may be located in the joining area of the intersecting ribs visible in FIG. 22.

Figure 24:
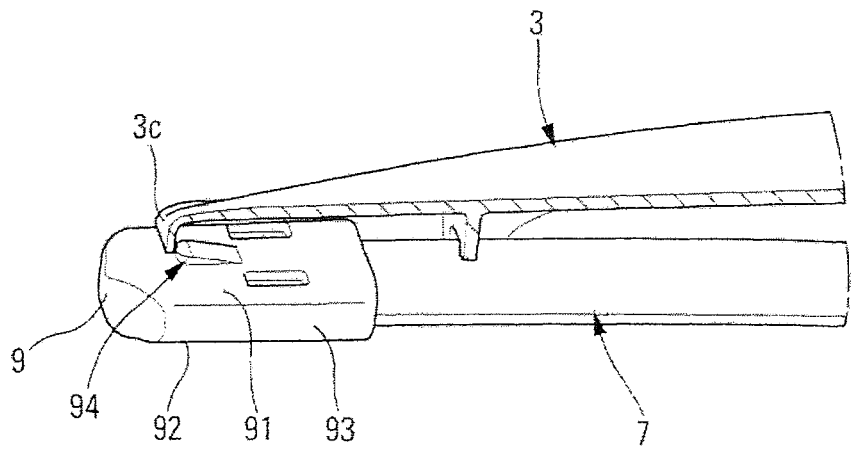

In FIG. 24 is illustrated the junction between the end piece 9 and a terminal cap 3, said terminal cap being shown in section along a central longitudinal plane. As indicated above, the end piece 9 has a substantially parallelepipedal shape, having an opening on its face which is oriented in the direction of the central mounting 2. It comprises, therefore, an upper face 91 and a lower face 92 which are connected by lateral faces 93, and a closed terminal face which is located on the side opposing the central mounting 2. As indicated with reference to FIG. 5, the inside of the end piece comprises two longitudinal internal housings 92a, 92b forming slides for the stiffening member 6 and for the wiper blade 8, respectively, in addition to a housing 92c for receiving part of the member 7.

On the upper face 91 of the end piece 9 is positioned a protruding stop 94 having a ramp shape which rises from this upper face, moving away toward the outside of the wiper. The stop face, which is oriented transversely, is directed in the direction of the outside of the wiper, i.e. in a direction which is substantially parallel to the axis of elongation of the end piece 9. This stop 94 has the purpose of cooperating with the transverse flange 3c carried by the terminal cap 3 which is associated with the end piece 9. This stop 94 has the purpose of limiting the curvature of the member for retaining 7 when the curvature of the windscreen increases and, by reducing the angle between the central mounting 2 and the terminal cap 3, of controlling the radius of curvature of the member for retaining 7. It thus forces said member for retaining, which remains more rectilinear, to maintain a significant bearing on the windscreen in the centre of the wiper which achieves a more regular wiping action during the rotation of the windscreen wiper.

As shown in the figure, the transverse flange 3c of the cap 3 which cooperates with the protruding stop 94 consists of the terminal wall of the terminal cap 3. In alternative versions, it consists of a rib extending transversely between the two lateral walls 3a, 3b of the terminal cap 3, upstream of the end face of the cap 3. This configuration makes it possible to obtain an alignment for the terminal faces, both of the cap and the end piece, which improves the aerodynamic performance of the wiper.

Figure 25:
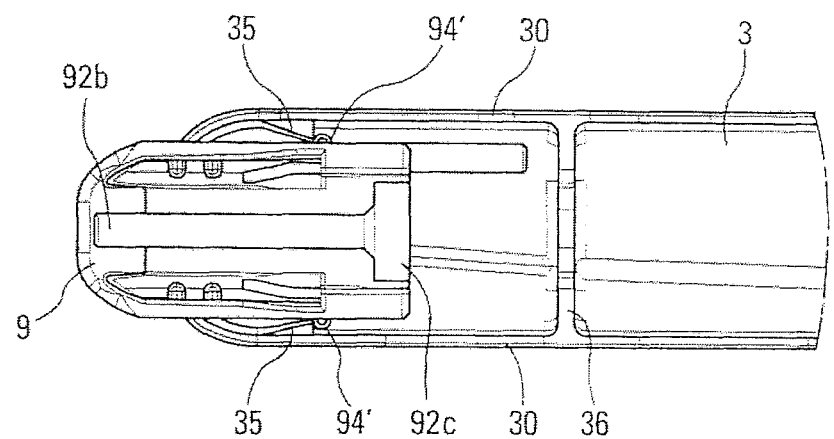
Figure 26:
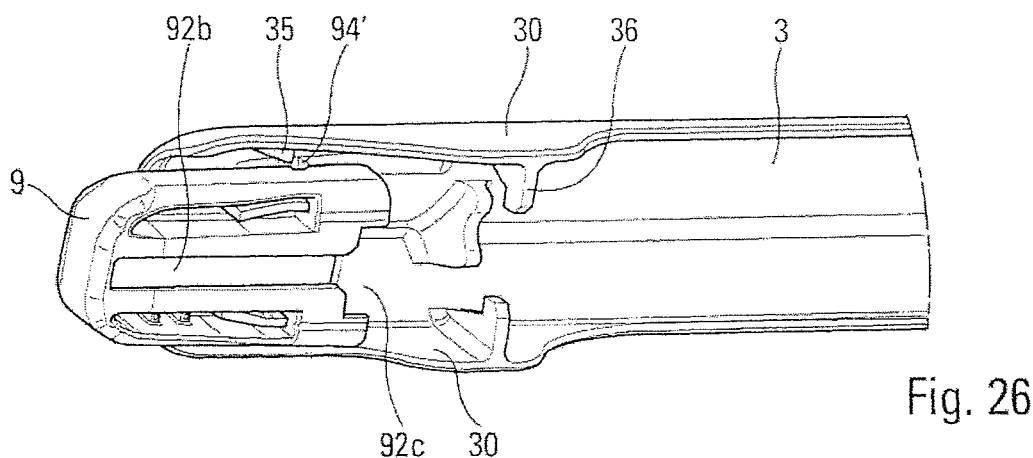

FIGS. 25 and 26 show a variant of the arrangement of the respective stops of the end piece 9 and of the terminal cap 3. One protruding stop 94' is positioned here on the internal side, on each lateral face 93 of the end piece, with a ramp shape and an orientation similar to the protruding stop 94 disclosed above: the ramp rises from the lateral face 93 in the external direction with a stop face oriented transversely relative to the longitudinal direction of the wiper. The terminal cap 3 comprises, in this case, second protruding stops 35 capable of cooperating with the protruding stops 94' of the end piece 9, in the region of its lateral flanges 30 which extend vertically at the lower end of the longitudinal walls 3a and 3b. The stops 35 protrude over the substantially parallel, internal faces of the lateral flanges 30. To this end, they have the shape of a ramp extending from the corresponding vertical wall but on this occasion in the internal direction. The stop faces thereof are in turn oriented transversely relative to the longitudinal direction of the wiper.

Figure 27:
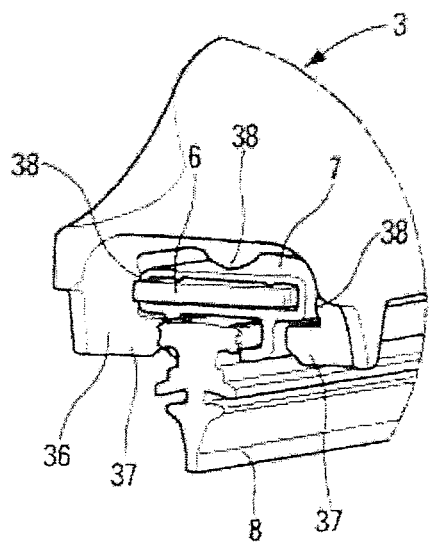
Figure 28:
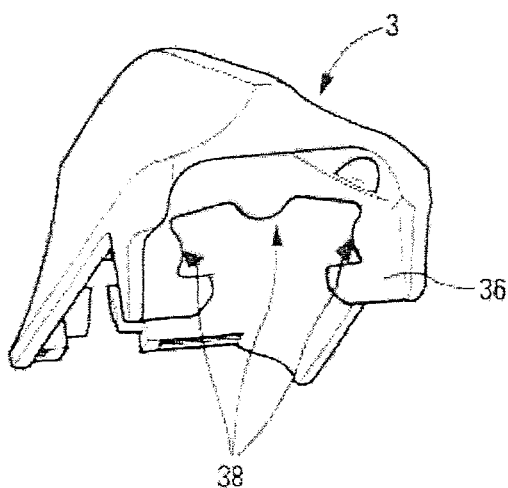
FIG. 28 is a perspective view of the end piece of the wiper of FIGS. 24 to 27.
Figure 29:
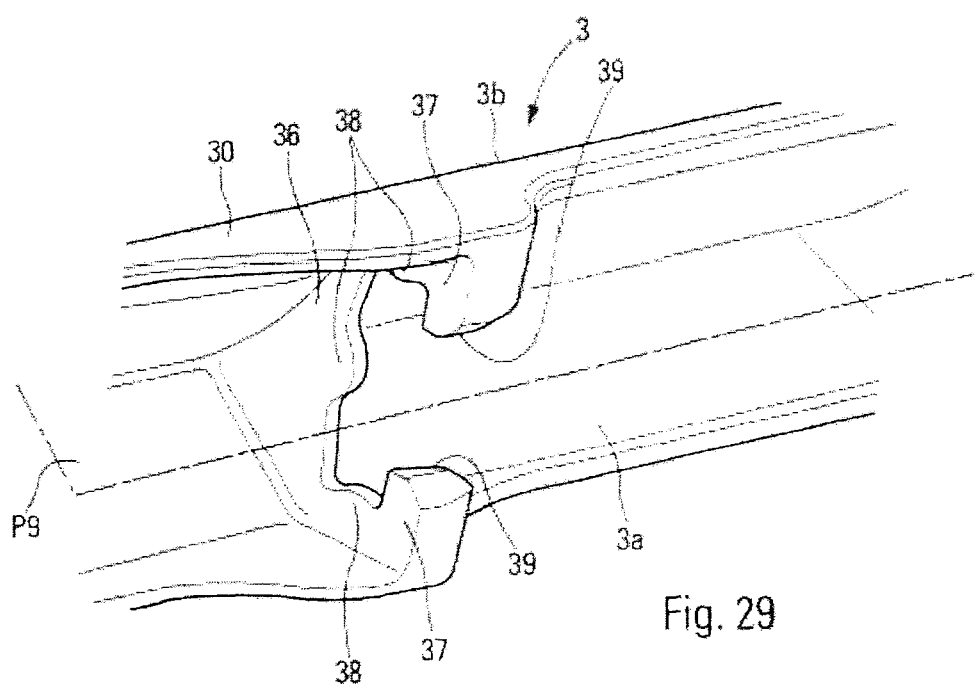
FIG. 29 is a partial perspective view of the terminal cap of the wiper of FIGS. 24 to 27, FIGS. 30a and 30b are schematic partial views of a central mounting of a wiper according to the invention, viewed from above, this part comprising an aperture for housing an adapter.

With reference to FIGS. 27 to 29, the end piece of a terminal cap 3 is seen, at a short distance from its outside end. A transverse guide wall 36 which bears against the entire height of the longitudinal walls extends transversely between the longitudinal walls 3a and 3b forming a dihedron. The wall 36 ensures the stiffening of the cap. It extends here between the lateral flanges 30 of the walls 3a, 3b.

This transverse wall 36 is cut out in a substantially rectangular shape to serve as means for guiding the wiping unit, i.e. essentially for the member for retaining 7 which contains the stiffening member 6 and which carries the wiper blade 8. The rectangular shape is open, moreover, toward the bottom to permit the passage of the wiper blade 8. As a result, at the bottom, the transverse wall 36 is in the form of two lateral guide hooks 37 extending from its vertical parts in two horizontal parts which are positioned opposite one another and which are separated by a space corresponding substantially to the thickness of the member for retaining 7 in this region. At the top, the transverse wall 36 is shown as a wall connecting the vertical parts of the two hooks 37. Said two hooks 37 form means of supporting the member for retaining 7, and the rectangular cut-out in the transverse wall 36 serves as means for guiding this member, for the sliding thereof in the cap 3 when the cap 3 is articulated relative to the central mounting 2.

FIG. 28 shows, in particular, the shape of the rectangular cut-out formed in the transverse guide wall 36. The three non-open sides of this rectangle comprise, substantially in the centre thereof, protuberances in the form of lugs 38 which protrude toward the inside of the rectangle. Said protuberances form bearing points approximately at regular intervals for the member for retaining 7 when it is introduced into said rectangular cut-out. Said bearing points at regular intervals serve to compensate for manufacturing tolerances and permit, due to their regular nature, improved guidance and easier sliding. The vertical part of each hook 37 comprises here, substantially in the centre thereof, a lug 38, the free end thereof being configured to cooperate with the member 7. The upper part of the wall 36 connecting the upper ends of the vertical parts of the hooks 37 also comprises, substantially in the centre thereof, a lug 38 for bearing at regular intervals against the member. The lugs 38 here have a generally rounded shape.

The guide hooks 37 for supporting the member for retaining 7, the longitudinal thickness thereof being greater than that of the transverse wall 36, are seen in FIG. 29. This overthickness is positioned on the side of the central mounting 2 and has the shape of a ramp 39 thickening from the lower edge of the longitudinal wall 3*a* or 3*b* of the terminal cap 3 to join the transverse wall 36 in the region of the upper edge of the hook. The ramps 39 comprise substantially coplanar inclined guide faces. The ramps permit the end of the member for retaining 7 to be guided when it is introduced into the transverse wall and to facilitate its passage through said wall when put in position.

Figure 30A:
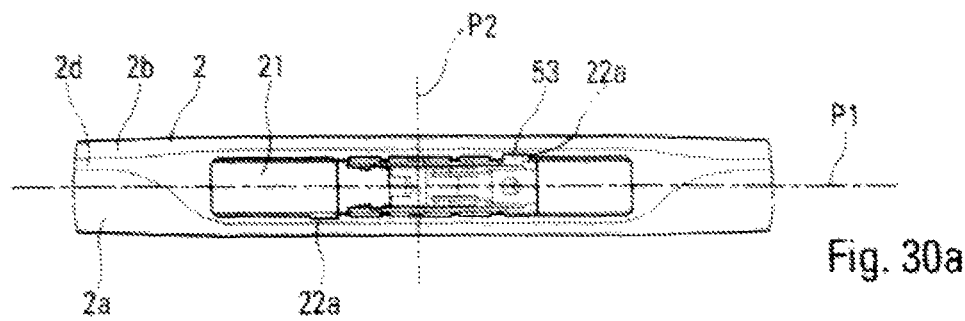
Figure 30B:
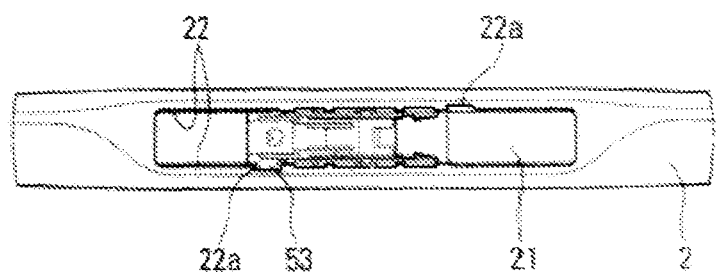

FIGS. 30*a* and 30*b* show the central mounting 2 in a view from above, with its aperture 21 in which the adapter 5 is positioned, designed to be mounted on the arm 10 extending respectively to the right or to the left of each of the figures. It may be seen that the size and shape of the aperture 21 are adapted to a positioning in either direction of the adapter 5. In other words, the aperture 21 is configured to permit the mounting of the adapter 5 and the clipping thereof on the pin 25 in a first position in which a first longitudinal end of the adapter is oriented toward a first longitudinal end of the aperture, and in a second position in which the first longitudinal end of the adapter is oriented toward a second longitudinal end opposing the aperture.

The opening of the aperture 21 located at its upper end is delimited by a peripheral edge of generally rectangular shape.

The length of the aperture 21 leaves sufficient space for the arm 10, which exceeds the adapter 5 in length, to be able to rotate without interfering with the side of the aperture which opposes the direction of extension of the arm.

Preferably, the aperture 21 has a dual symmetry, both longitudinal (relative to a central transverse plane P2), the adapter 5 generally also being subject to longitudinal symmetry, and transverse (relative to a central longitudinal plane P1) to facilitate the mounting of the wiper 1 on an arm 10 which rotates in either direction. This configuration of dual symmetry permits the same central mounting 2 to be used for the two wipers, such that the two wipers (left and right) for wiping the windscreen of a vehicle are displaced in a coordinated manner or they rotate in opposing directions.

Figure 31:
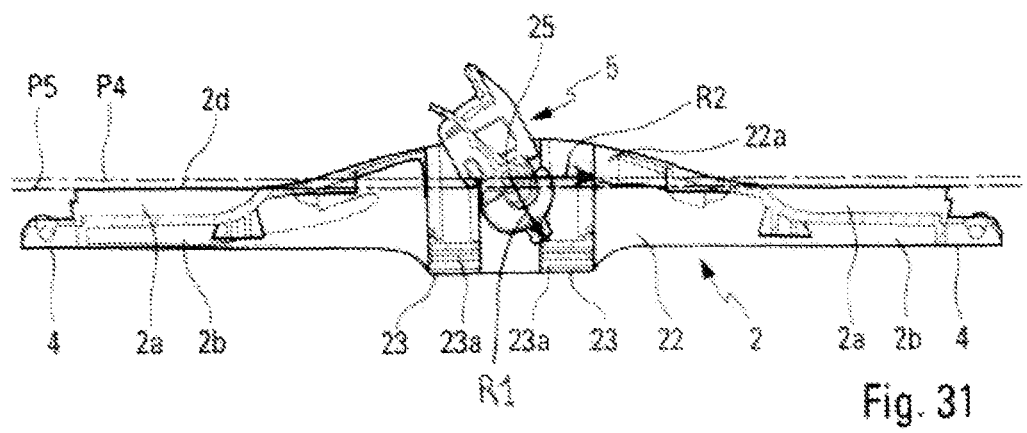
FIG. 31 is a schematic view in longitudinal section of the central mounting and of the adapter of FIGS. 30a and 30b.

FIG. 31 shows, in section along the central longitudinal plane P1, an adapter 5 installed in a central mounting 2. The aperture 21 of the central mounting 2 is traversed laterally by the transverse pivot pin 25 which connects the two parallel vertical faces 22 of the centre of the central mounting 2 and which serves as a support for the adapter 5.

The pivot pin 25 is solid with the central mounting 2. Said pivot pin 25 is formed as an integral part with the central mounting 2. The two lateral walls 2*a* and 2*b* of the central mounting 2 are connected by said pivot pin 25. In other words, the pivot pin 25 may be moulded as one with the mounting 2, from the same material and during the same injection-moulding step.

Figure 32:
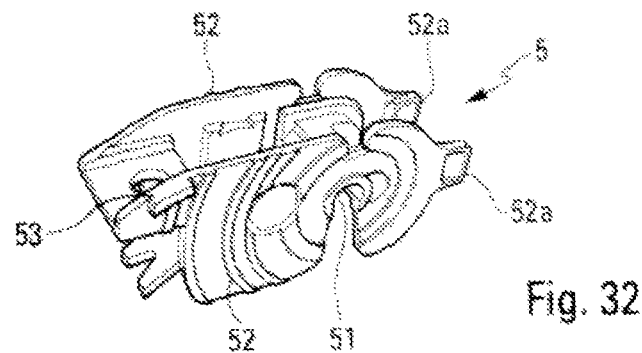
FIG. 32 is a schematic perspective view of the adapter of FIGS. 30a, 30b and 31.

The adapter comprises at its centre 5, as may be seen in FIG. 32, a cylindrical housing 51 to receive this transverse pin by resilient clipping. The adapter 5 substantially has an elongated parallelepipedal shape in the longitudinal direction with two lateral flanges 52 connected together by a central portion which defines the cylindrical housing 51. It also comprises, on each lateral flange 52, a longitudinal extension 52*a*, the object thereof being to serve as a stop for limiting the rotation of the adapter 5 in certain applications. However, to avoid rupture of one of the elements of the adapter when handled incorrectly in rotation, the invention proposes to raise the vertical position of the pin 25 on the parallel vertical faces 22 of the centre of the central mounting 2, such that it permits an angular rotation of the adapter in which the longitudinal extensions 52*a* do not interfere with the means for fixing the wiping unit, namely the hooks 23.

To achieve this, the radius R1 of the adapter 5 in the region of the longitudinal extensions 52*a* which is located in the range of 15 mm, and more generally between 10 and 20 mm, is shorter by approximately 1 mm than the radius R2 at which the most central point of the hooks 23 is located for fixing the member for retaining 7 (see FIG. 31). The radius R1 is the maximum radius of a first circumference centred on the pin 25 and passing substantially through the extensions 52*a* of the adapter 5, and the radius R2 is a maximum radius of a second circumference centred on the pin 25 and passing substantially through the upper ends of the hooks 23.

If the two longitudinal extensions 52*a* do not interfere with the hooks 23 and permit the adapter 5 to rotate without obstruction, it is nevertheless necessary to limit this rotation to avoid too great an angular deviation of the wiper, which could lead to the rupture of one of its elements. To achieve this, a lug 53 extends laterally from the upper edge of one of the lateral flanges 52 of the adapter 5, on the side opposing its other lateral flange, which enables it to come into abutment against a peripheral edge of the aperture 21, for example to limit the angular displacement of the adapter 5 about the pin 25. The internal faces 22 comprise notches 22*a* for receiving and displacing said lug 53.

Figure 33:
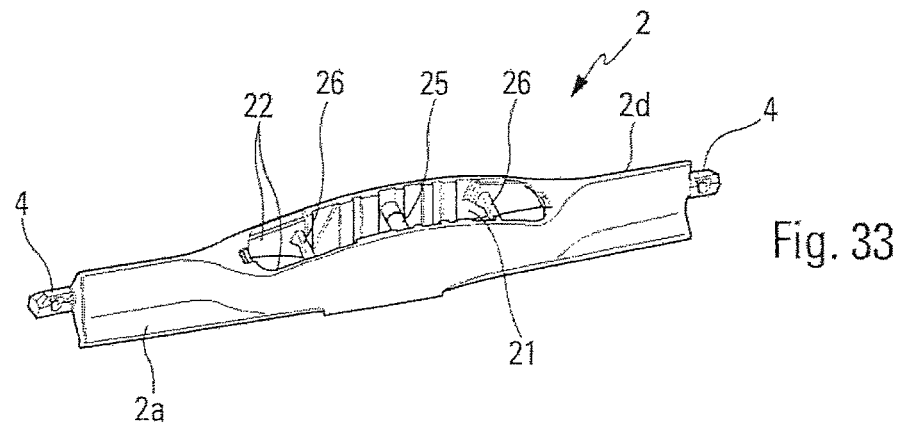
FIG. 33 is a schematic perspective view of a mounting of a wiper according to the invention.
Figure 34:
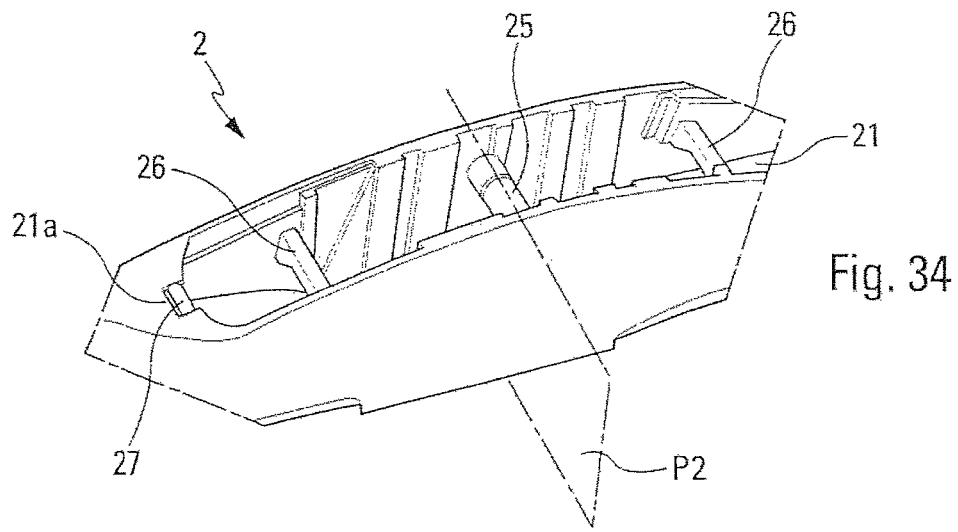
FIG. 34 is a view in larger scale of a part of the mounting of FIG. 33 and shows the removable means for connecting and stiffening, FIG. 35 corresponds to FIG. 34 and shows a step for preparation of the mounting in which one of the means for connecting and stiffening has been removed.
Figure 35:
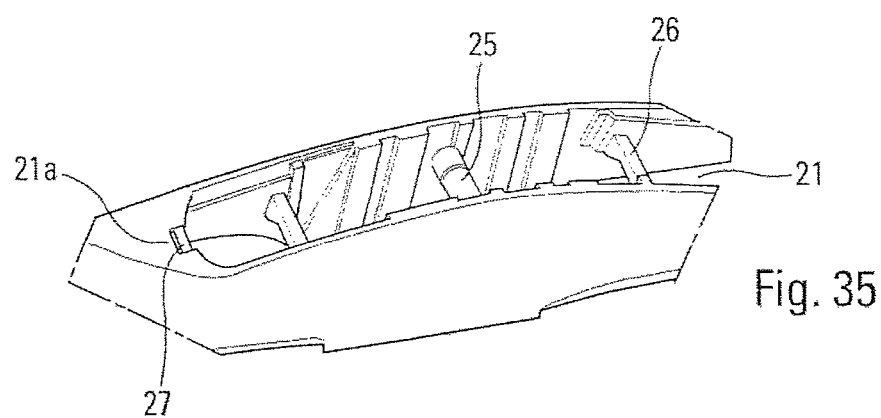

The interior of the aperture 21 of the central mounting 2 which extends longitudinally between the lateral walls 2*a*, 2*b* of this mounting is now seen with reference to FIGS. 33 to 35. On both sides of this central part extend the front 2*a* and rear 2*b* longitudinal parts, with reference to the direction of circulation of the air. As indicated above, the transverse pivot pin 25 connects the two parallel lateral walls 22 so as to support the adapter 5 which is fixed above by interlocking, engagement or resilient clipping.

Due to the relatively large elongation of the aperture 21, the portions of lateral walls 2a, 2b located in the region of the aperture may have a certain fragility when handled and the invention specifies adding means 26 for connecting and stiffening between the internal lateral faces 22 of the aperture 21, in this case in the form of crossmembers 26 which each have the shape of an elongated bar. As shown, said crossmembers 26 extend parallel to the pivot pin 25 by being positioned substantially at the same height as this pin, and substantially in the centre of the distance existing between the pin 25 and the longitudinal end of the aperture 21. Said crossmembers 26 are formed by material bridges connecting the two lateral faces 22. They are of the removable type in this case, i.e. they may be taken off. They may be broken or cut off or dismantled and they may, in particular, be unclipped. In this case, they have sections to be broken, namely a fragile area or weakened portion at each of their ends, so as to be able to be ruptured in the region of the faces 22, without leaving a protuberance which might interfere with the rotation of the adapter 5. More specifically, the presence of two crossmembers 26 on the same central mounting 2, which corresponds to a configuration immediately after manufacture, is not suitable to the use of such a central mounting, as one of said crossmembers would consequently limit the rotation of the adapter 5. During the mounting of a windscreen wiper it is appropriate to select in which direction this mounting will be installed on the arm of the wiper. Depending on this selection, one of the crossmembers 26 is fractured, which provides the required freedom of rotation to the arm and its adapter 5 in the central mounting. As visible in FIG. 35, the second crossmember is preserved as it does not interfere with this rotation. The invention thus provides a simplification in the production of the central mountings 2 and in the logistics thereof, since this is a single model which is adapted to all directions of rotation of a windscreen wiper, by means of the prior rupture of one of the two crossmembers 26. The presence of two crossmembers and then one crossmember 26 provides the required rigidity to the parallel lateral walls 22, firstly during transport for its conveyance to the mounting location and then during use on a windscreen. The two crossmembers 26 in this case are arranged symmetrically relative to the transverse plane P2 passing substantially through the centre of the aperture 21.

Moreover, the aperture 21 has at each of its longitudinal ends an essentially transverse cut-out 21a, which longitudinally extends the cut-out of the aperture 21. In this cut-out is positioned a pin 27 which is oriented transversely and which may be used as pivot pin or support pin to a closure cap as will be explained below with reference to FIGS. 36 to 43.

Figure 36:
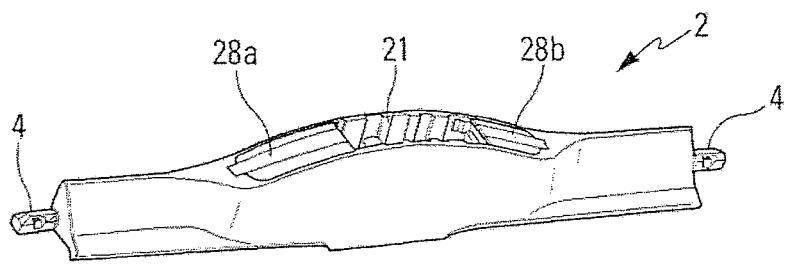
FIG. 36 is a schematic perspective view of a capped mounting of a wiper according to the invention.

A central mounting 2 in which the aperture 21 is partially sealed by two closure caps 28a and 28b is seen in FIG. 36. More specifically, whilst the aperture 21 has to be sufficiently long to be able to insert an adapter 5 therein and then the arm on which said adapter is fixed, its opening at the top proves to be disadvantageous after the positioning of these elements, both for aesthetic reasons and aerodynamic reasons, the hollow of the aperture being able to create turbulence in the air which circulates on the windscreen. The invention specifies, therefore, the installation of two closure caps 28a, 28b which cap the aperture 21 and which close the upper face of the central part of the central mounting 2 to form a capped central mounting. Taking account of the presence of the arm and the adapter 5 which are not symmetrical in a transverse plane, the two openings left open at the ends of the aperture 21 are not identical or symmetrical. Thus a front closure cap 28a is identified which is positioned toward the outside relative to the arm of the wiper and a rear closure cap 28b is identified which is positioned on the inside. Thus, a first capping 28a is configured to seal a longitudinal end piece of the aperture 21 and the second capping 28b is configured to seal an opposing longitudinal end piece of the aperture.

The positioning of these caps may be implemented in two different ways. As shown in the figures, the front cap 28a is mounted so as to be mobile in rotation about the pin 27 of the front cut-out 21a whilst the rear cap 28b is fixedly mounted on the pin 27 which traverses the rear cut-out 28b.

Figure 37:
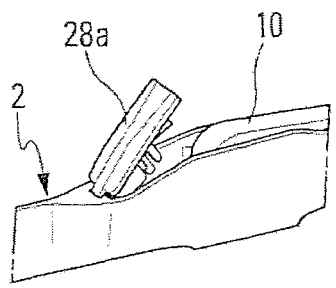
FIGS. 37 to 39, 41 and 42 are schematic partial views in perspective of the capped mounting of FIG. 36 and FIGS. 40 and 43 are schematic perspective views of cappings of said capped mounting.
Figure 38:
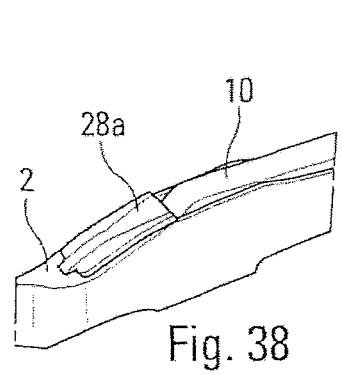

FIGS. 37 and 38 show, therefore, the capacity for rotation of the front cap 28a about its pin 27. In FIG. 37, the front cap is raised and permits the longitudinal space to appear, said longitudinal space being opened to permit the insertion of the arm 10 carrying the wiper into the aperture 21 and the passage thereof about the adapter 5. FIG. 38 shows the front cap closed and the continuity of the surfaces between the upper face of the central mounting 2, the front cap 28a and the arm 10 carrying the wiper. Finally, FIG. 39 shows, in a view from below, the front cap 28a in position in the aperture 21.

Figure 40:
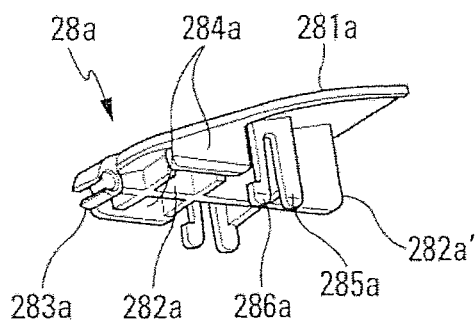

FIG. 40 shows in more detail the shape of the front cap 28a. It comprises an upper face 281a, the shape thereof (in this case not planar) being formed so as to extend the shape of the upper face of the central mounting 2 and to provide an aerodynamic continuity between said two elements. The lower face 282a is formed by stiffeners which intersect one another so as to provide rigidity to the part and which extend vertically until they come into contact with the upper face 281a. At the front, i.e. toward the outside of the wiper, the upper face 281a is terminated by a transverse cylinder 283a which is open over a limited amplitude sector. This cylinder has an inside diameter which has a value slightly greater than that of the pin 27, such that the pin 27 may serve as a rotational axis for the front cap; the opening sector of this cylinder is such that the pin 27 may pass into this sector by resilient clipping and then it is retained therein after clipping. Finally, two vertically oriented tabs 284a which extend from the upper face 281a are seen on the sides of the front cap. At the rear of these two tabs 284a, two second tabs 285a also extend vertically. Moreover, a hook 286a which also runs vertically extends in the region of each side of the capping between the tabs 284a, 285a. The hooks 286a are resiliently deformable and are designed to cooperate by resilient clipping with a complementary means of the mounting 2.

Figure 39:
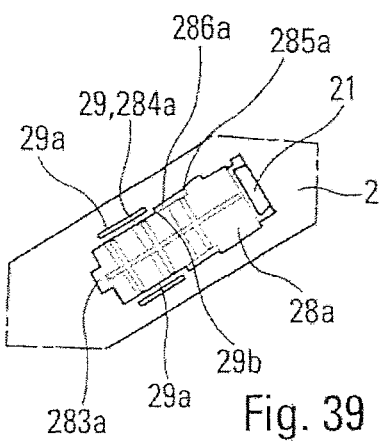

The two first tabs 284a which open into the aperture 21 and which are interlocked in guides or recesses 29 of the aperture 21 are seen in FIG. 39. These guides are formed, on the one hand, by the lateral faces 22 of the central part of the central mounting 2 and, on the other hand, by partitions 29a parallel to these faces, offset to the inside of the aperture 21, said parallel partitions 29a being attached by small transverse partitions 29b to the lateral faces 22 to close the recess forming a guide. The first tabs 284a serve to position the cap 28a in the aperture 21. The hooks 286a cooperate with the lower ends of the partitions 29b to ensure the locking of the cap in the mounted position thereof.

Moreover, the longitudinal end of one of the stiffeners of the cap 28a, opposing the cylinder 283a, forms a means 282a' for bearing and retaining the adapter 5 and/or the arm 10.

Figure 41:
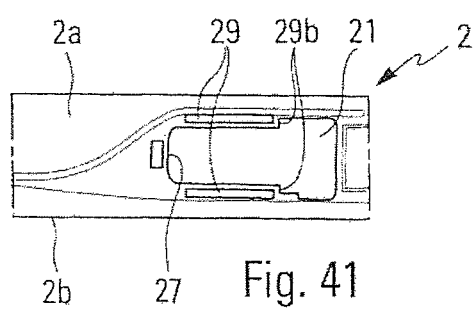
Figure 42:
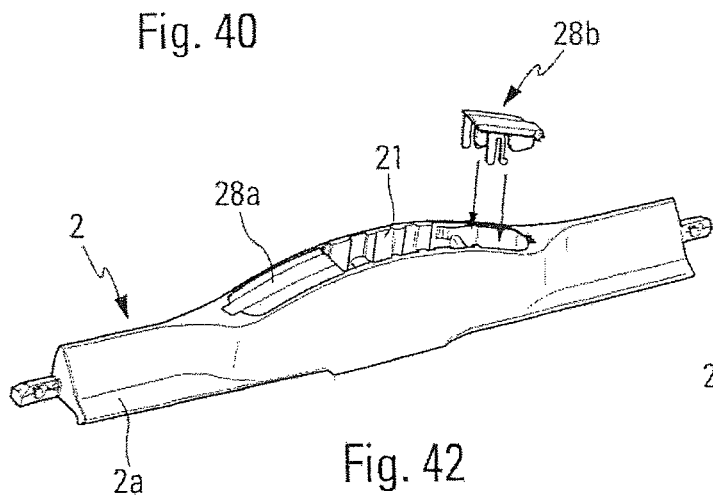
Figure 43:
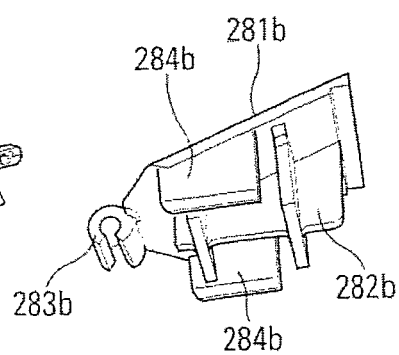

FIGS. 41 to 43 show the rear cap 28b and its positioning in the aperture 21. As they have the same function as the similar elements of the front cap, the elements of the rear cap are denoted by the same reference numerals, the letter a being replaced by a letter b; and they are not described further.

FIG. 42 shows the direction in which the positioning of this cap takes place. Whilst the front cap 28a was attached to a pin 27 and was mobile in rotation about said pin, the rear cap 28b is positioned by a vertical translation in order to be positioned therein by clipping in a fixed manner. As a result, as may be seen in FIG. 43, the cylinder 283b of the rear cap has an open sector, the opening thereof being oriented in the downward direction. The rotation about said pin 27 is prevented by the presence of the first tabs 284b, the side thereof opposing the cylinder 283b cooperating over its entire height with the small transverse wall and blocking any rotation. As a result, the presence of hooks is no longer required. Similarly, the end of the aperture 21, which is illustrated in FIG. 41, is simplified relative to that of FIG. 39, and only comprises one guide 29 for accommodating only the first plates.

Figure 44:
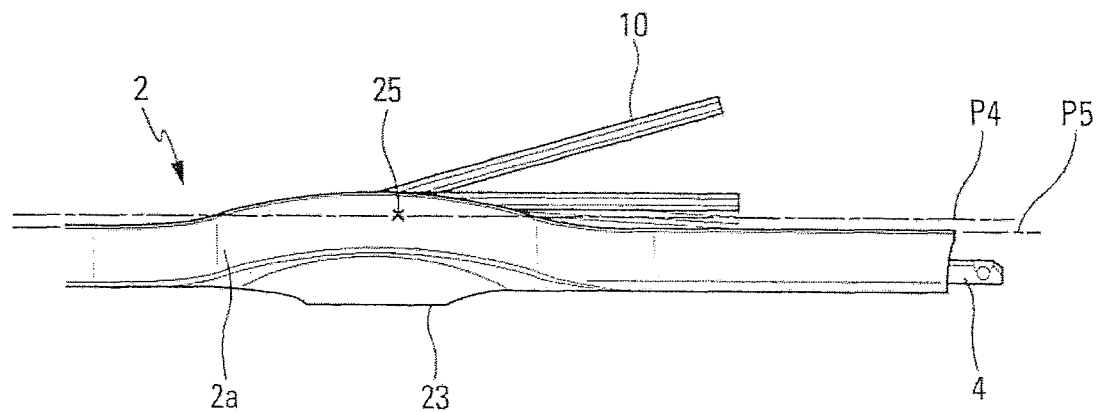
FIG. 44 is a schematic perspective view of a mounting of a wiper according to the invention, said wiper being connected to a drive arm.

A central mounting 2 connected to a drive arm 10 of the windscreen wiper is now seen with reference to FIG. 44. This arm has, in the known manner, an end bent back in a circular-arc shape or in a U-shape, in which the adapter 5 is positioned, said adapter serving to permit the mounting of the same model of wiper on a plurality of types of arm and thus to enable it to be mounted on various vehicles. The arm 10 and the adapter 5 rotate, as indicated above, about a pivot pin 25 which extends between the two parallel lateral faces 22 of the central mounting 2 and onto which the adapter is clipped. The arm 10 has to be able to rotate about the pivot pin in the direction of removal by a large angle to permit the mounting of the wiper on the arm, but it is also advantageous to provide it with a certain degree of freedom in rotation in the direction of approach toward the wiper so that said wiper is perfectly adapted to the curvature of the windscreen. To this end, the invention specifies raising the pivot pin 25 vertically, said pivot pin in this case being located in a longitudinal plane P4 above a longitudinal parallel plane P5 passing substantially through the upper ends of the longitudinal end parts of the mounting, i.e. through the upper edge 2d (see also FIG. 31). The planes P4 and P5 are in this case substantially horizontal.

As disclosed hereinafter, the upper longitudinal edges of the lateral walls 2a, 2b are separated from one another in the region of the aperture 21 so as to define the peripheral edges of this aperture. These peripheral edges each have a convex curved shape and have (C-shaped) upper ends located above the planes P4 and P5.

In this manner, the arm 10 may be moved toward the wiper and form with its longitudinal direction a negative angle (with reference to the clearance for mounting the wiper which is regarded as the positive direction of rotation). This angle is preferably in the range of 3 to 4 degrees and, in any case, ranges between 0 and 5 degrees.

Figure 45:
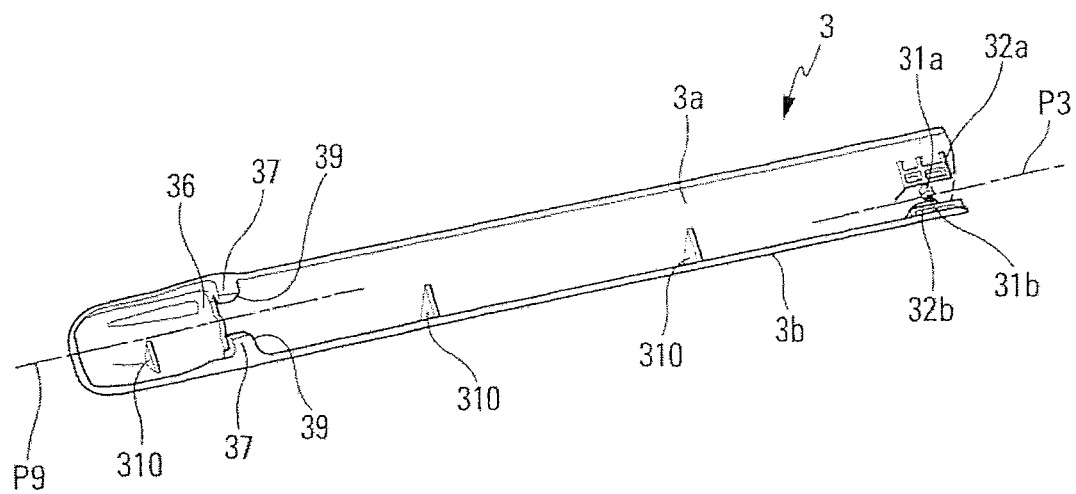
FIG. 45 is a schematic perspective view of a terminal cap of a wiper according to the invention, viewed from below.

FIG. 45 shows in a view from below a terminal cap 3 with, at one of its longitudinal ends, reinforcements 32a and 32b as explained with reference to FIG. 11, and at the other end a transverse guide wall 36 for the passage of the member for retaining 7. Taking into account the elongation of this part, which may be relatively large in the case of wipers of large dimensions, and as the length of the central mounting 2 is preferably the same for all of the wiper models, the invention specifies installing transverse stiffening ribs 310 at several locations of the terminal cap 3. These ribs 310 essentially have a triangular shape so as to be adapted to the dihedral shape formed by the two longitudinal walls 3a and 3b of the cap. They are positioned longitudinally in an equidistant manner, the majority being positioned between the reinforcements 32a and 32b and the guide wall 36, and an additional transverse rib being positioned beyond this transverse guide wall. Apart from their function of stiffening the terminal cap 3, said ribs 310 comprise a bearing point on their lower side which is configured to support the pressure which is exerted by the ejector of an injection-moulding machine when producing the cap. In one particular embodiment, not shown, the rib is a double rib formed by two intersecting ribs, the bearing point for the ejector thus being positioned at the junction of the two ribs.

In FIG. 45 it is also observed that the central longitudinal plane P1 of the means for articulation 31a, 31b of the cap, which is substantially vertical, is substantially parallel and spaced apart from a second central longitudinal plane P9 of said means for guiding 36, 37.

Figure 46:
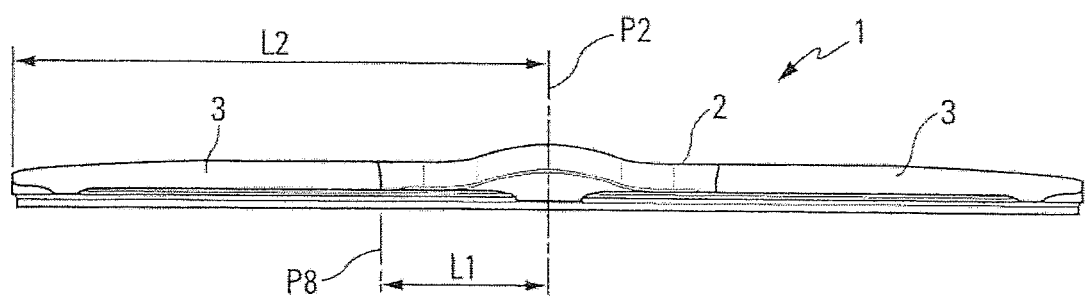
FIGS. 46 and 47 are schematic perspective views of two wipers according to the invention, respectively long and short, said two wipers comprising identical and interchangeable mountings.
Figure 47:
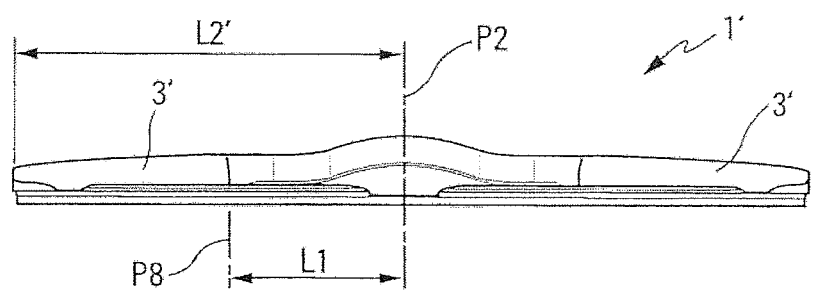

FIGS. 46 and 47 show two versions of a windscreen wiper with a central mounting 2 and with two terminal caps 3 which are attached to said central mounting. For reasons of simplicity of production and logistics, the invention specifies homogenizing the central mountings 2 which are the most complex parts, and only to vary the length of the terminal caps 3 to adjust the wiper 1 to the length which is appropriate for a specific application. Whichever wiper is to be provided to a given vehicle, the central mounting 2 is identical and thus interchangeable. Taking account of the average lengths observed on windscreen wipers of vehicles in use, the length selected for the central mounting is typically between 15 and 30 cm.

Moreover, it is appropriate to respect the relative dimensions between the central mounting 2 and the terminal caps 3, so that the angle formed by these caps with the central mounting remains within relatively small values. Otherwise, the wiping carried out by the central mounting 2 and/or that carried out by the terminal caps 3 will not be of good quality as the contact is not made over the entire length of the relevant element or, if it takes place, the pressure on the windscreen will not be uniform. To avoid this drawback, the invention specifies maintaining a ratio between the length of the central mounting and the total length of the wiper within certain limits. After examining the results of various wiping tests, the invention specifies a value of between 20 and 70% for the ratio between the half-length L1 of the central mounting 2 (i.e. the distance between the transverse plane P2 passing through the transverse pivot pin 25 and a further transverse plane P8 passing through the pivot pin 31 of the terminal caps) and the half-length L2, L2' of the wiper (i.e. the distance between the first plane passing through the transverse pivot pin 25 and the longitudinal end of the terminal cap 3). Preferably, this ratio is between 25 and 65% and, for example, between 27 and 59%.

The invention further proposes a method for mounting streamlined portions for streamlined flat windscreen wipers, in particular for a vehicle, comprising a step of mounting a short streamlined portion 1' and a step of mounting a long streamlined portion 1. The step of mounting a short streamlined portion 1' comprises the assembly of a first central mounting part 2 with a first terminal cap part 3' for the short streamlined portion, and the step of mounting a long streamlined portion 1 comprises the assembly of said first central mounting part 2 with a second terminal cap part 3 for a long streamlined portion 3.

FIGS. 48 to 54 disclose an embodiment of the invention which is suitable for mounting on a windscreen wiper, called the rod-shaped arm, which does not have a terminal U-shape but the shape of a substantially rectilinear rod.

FIGS. 48 and 49 show respectively in the assembled position and in the exploded position a central mounting 2 which is identical to that of the preceding embodiment, in which an adapter 5' is inserted which is slightly modified relative to the previous adapter, so as to adapt to the mounting to a rod-shaped arm 10'.

Figure 52:
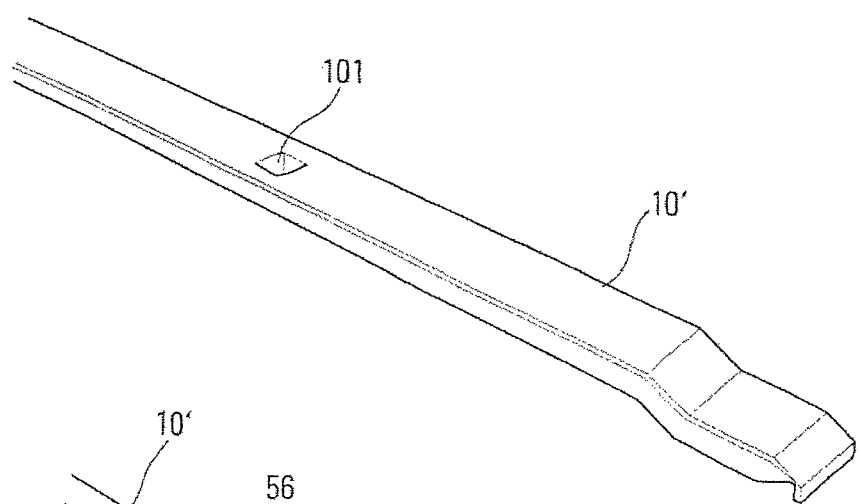
FIG. 52 is a schematic perspective view of the rod-shaped arm of FIGS. 48 and 49, FIGS. 53 and 54 are schematic views in perspective and in longitudinal section of the adapter and of the rod-shaped arm of FIGS. 48 and 49, FIGS. 55 to 57 are partial schematic views of a streamlined flat wiper and a member for the offset connection to an adapter for connecting the wiper to a drive arm, in a perspective view in FIGS. 55 and 56 and in an exploded perspective view in FIG. 57, FIGS. 58 and 59 are schematic perspective views of the connection member of FIGS. 55 to 57.

FIG. 50 shows the cooperation between the modified adapter 5' and the rod-shaped arm 10' whilst FIGS. 51 and 52 show respectively the modified adapter 5' and the rod-shaped arm 10'.

The modified adapter 5' has, as disclosed above, substantially an elongated parallelepipedal shape in the longitudinal direction with two lateral flanges 52 connected together by a central portion which defines a cylindrical housing 51 for the resilient clipping of the transverse pivot pin 25 which passes through the aperture 21 of the central mounting 2. It also comprises on each lateral flange 52 a longitudinal extension 52a, the object thereof being to serve as a stop to limit the rotation of the adapter in certain applications and a lug 53 which comes into abutment against one of the parallel lateral faces 22 of the centre of the central mounting 2 when the adapter is in a maximum rotational position.

The modified adapter 5' comprises, moreover, a transverse plate 54 which connects the lateral flanges 52 at their upper region, thus forming a cover for the adapter and defining a longitudinal housing in which the distal end of the rod-shaped arm 10' is inserted. Said longitudinal housing in this case is open at its two longitudinal ends. The upper transverse plate 54 is extended toward the inside, with reference to the rotation of the arm, by a longitudinal tab 55 of planar and elongated shape which comprises in the vicinity of its end opposing the plate 54 a retaining finger 56 which extends vertically downward, so as to be able to cooperate with a notch 101 formed in the arm 10'. The lower part of the transverse plate 54 and of the longitudinal tab 55 are such that they form a space in which the rod-shaped arm 10' may slide and be housed. Taking account of its elongation, the longitudinal tab has a certain degree of flexibility and it is attached to the plate 54 by a resilient connection which naturally drives it downwardly, which tends to maintain its contact with the rod-shaped arm over its entire length. The tab 55 extends substantially in a plane P10 passing through an upper end of the adapter.

The longitudinal housing of the adapter 5' which receives a free end of the rod-shaped arm 10' is located in the upper part of the adapter, notably above the cylindrical housing 51. This longitudinal housing is delimited at least by the plate 54, the longitudinal tab 55 extending from this plate 54. Such an arrangement of the longitudinal tab 55 makes it possible to prevent interference, which means to say physical contact, between the central mounting 2 and the rod-shaped arm 10'. The rod-shaped arm 10' becomes inserted in the upper part of the adapter 5' without the risk of touching the central mounting 2, notably a terminal part of the baffle-shape thereof, or a terminal part of a baffle that this central mounting 2 carries.

Regarding the rod-shaped arm 10', visible in FIG. 52, without this being imperative, it has a lowered portion on its terminal part so as to form a second planar part which is located at a lower height than the first part. This shape has the purpose of making it closer geometrically to the adapter used. It comprises a notch 101 which is remote from its end, such that the retaining finger 56 carried by the longitudinal tab 55 is longitudinally at the same level when the rod-shaped arm is inserted into the adapter.

Figure 53:
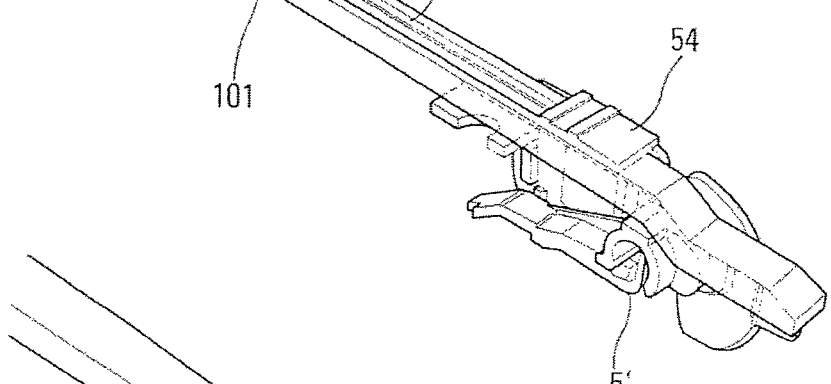
Figure 54:
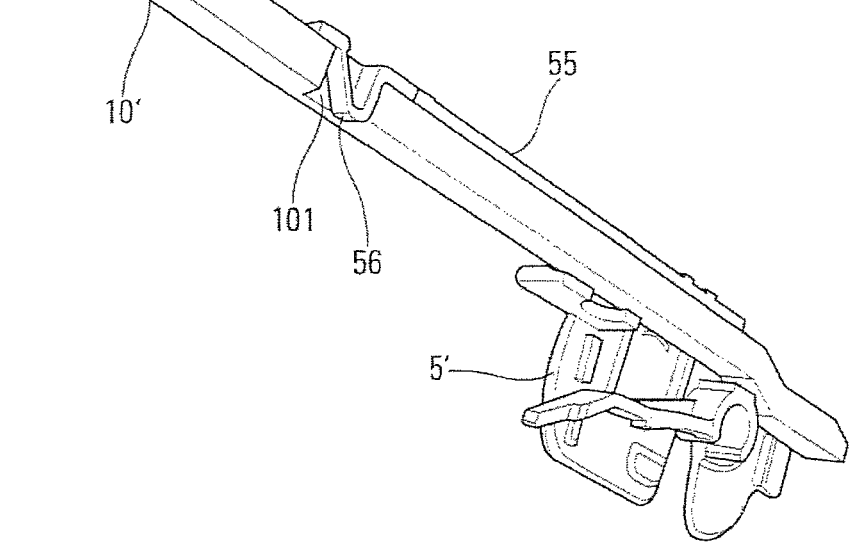

FIGS. 53 and 54 show the rod-shaped arm 10' in its housing below the longitudinal tab 55 and the transverse plate 54, respectively in a view from above and from below and in longitudinal section. The retaining finger 56 is inserted into the notch 101 of the rod-shaped arm, which ensures the fixing of the rod-shaped arm 10' and the adapter 5', this configuration being reversible due to the longitudinal flexibility of the tab 55.

A further embodiment will be disclosed now with reference to FIGS. 55 to 60, in the configuration of the mounting on a conventional arm, with a terminal U-shape part. This embodiment may also be implemented on a rod-shaped arm, in that the adapter put in place is adapted to this type of arm, as in the previous embodiment. In this embodiment, the wiper is offset laterally relative to the arm 10 and held in position by a connection member which is configured to this end. In contrast, the central mounting 2 and the adapter 5 or 5' are identical to those of the embodiments described above.

Figure 55:
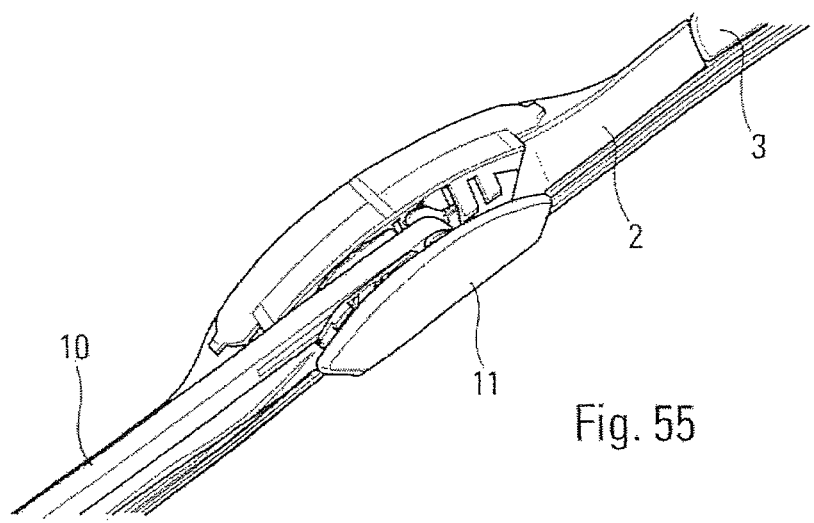
Figure 56:
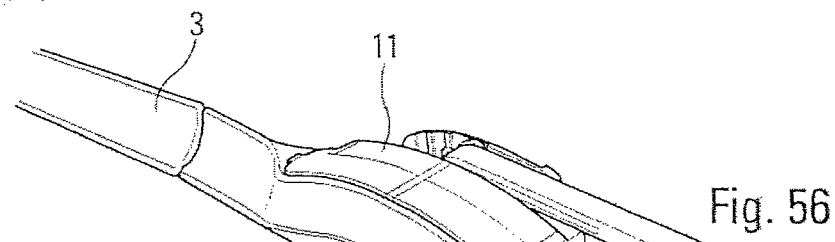
Figure 57:
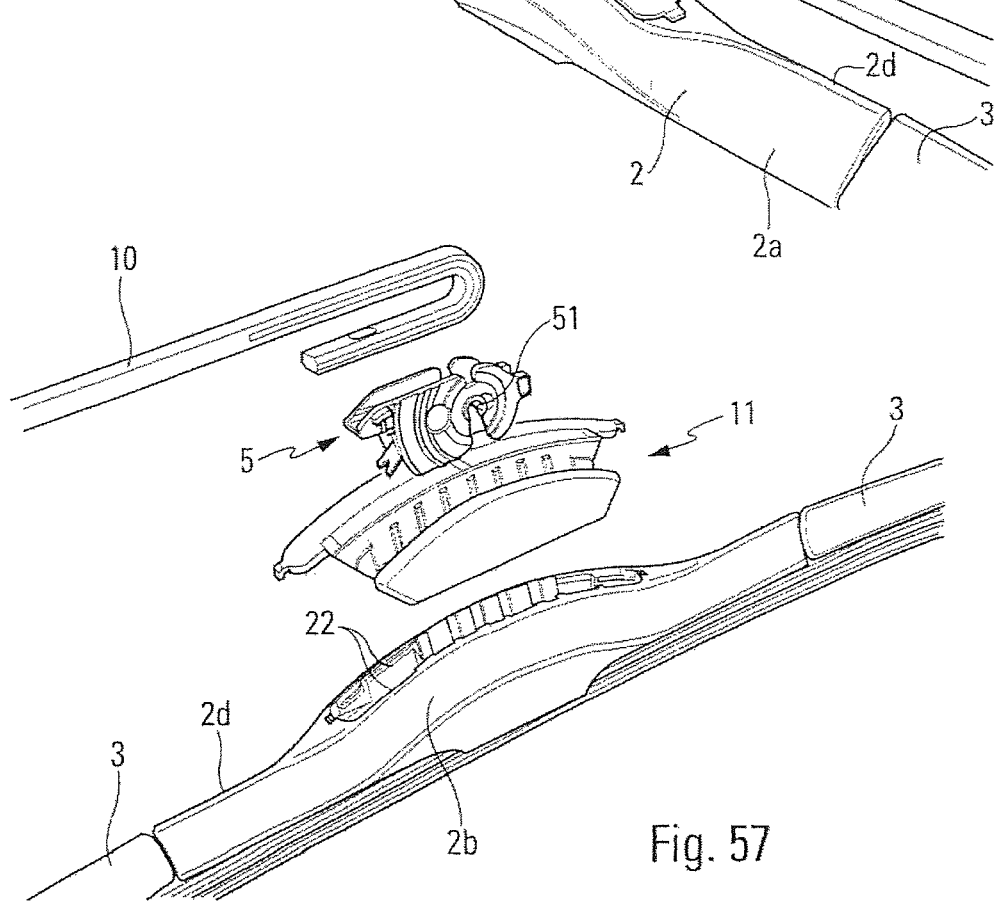

FIGS. 55 and 56 show, respectively in a view from the front and a view from the rear, a windscreen wiper mounted on a U-shaped arm in the assembled position, whilst FIG. 57 shows this wiper in the disassembled position.

The arm 10 has a conventional shape terminated by a U-shape in which the adapter 5 described above is inserted, as appears in FIG. 60. The adapter 5 comprises, in particular, a cylindrical housing 51 in which a pivot pin may be clipped in the manner of that extending between the two parallel lateral faces 22 of a central mounting 2. Between the adapter 5 and the central mounting 2 extends an intermediate part or connection member 11 which receives the adapter 5 by clipping onto a second pivot pin 25' and which is in turn clipped onto the transverse pin 25 of the central mounting. In this configuration, the connection member 11 is fixed relative to the wiper and the rotation of the arm and the adapter 5 is carried out about the second pivot pin 25'.

Figure 58:
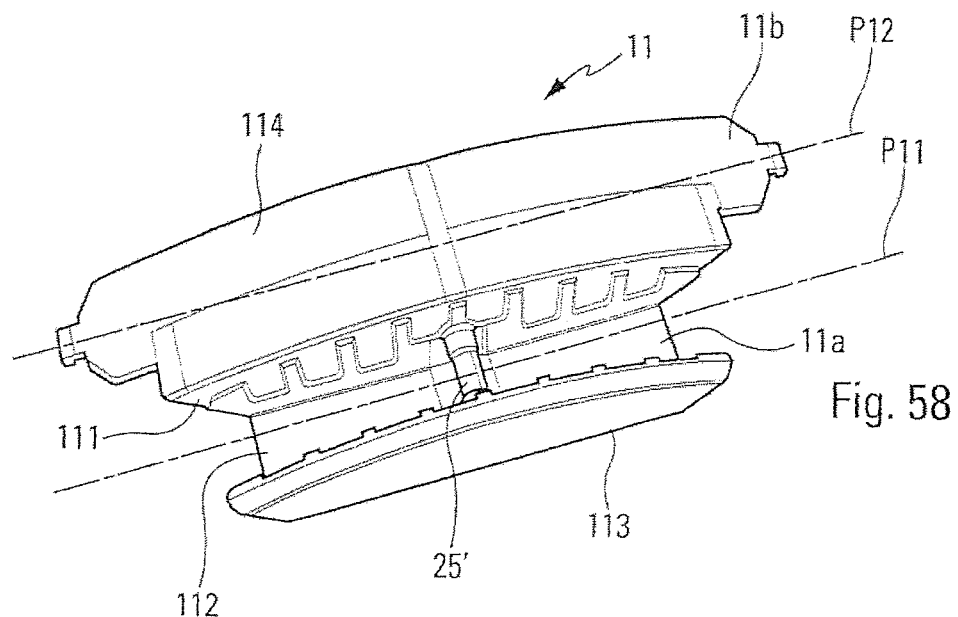
Figure 59:
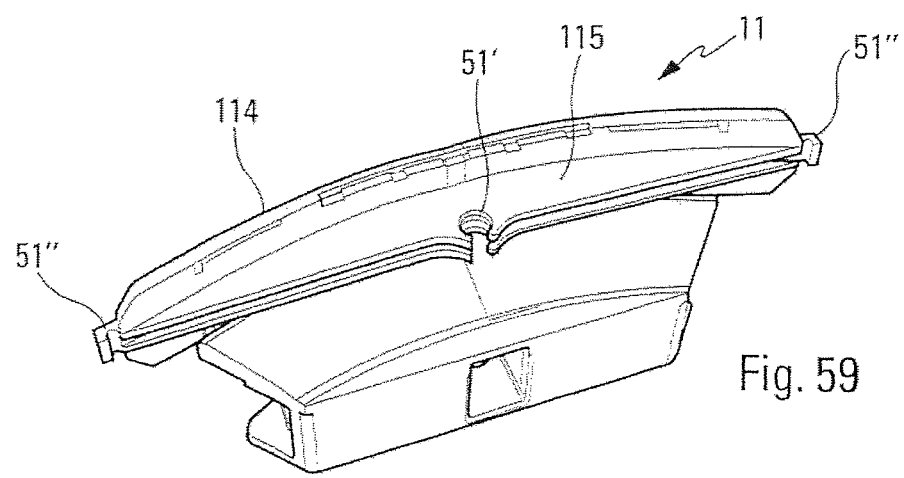
Figure 60:
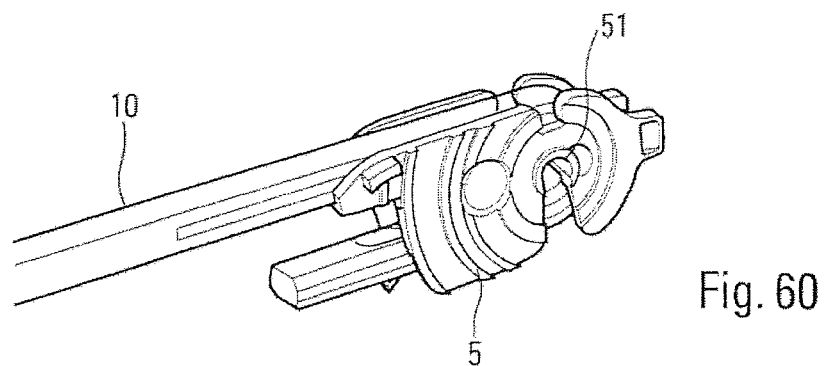
FIG. 60 is a schematic perspective view of the adapter and of the arm of FIGS. 55 to 57.
Figure 61:
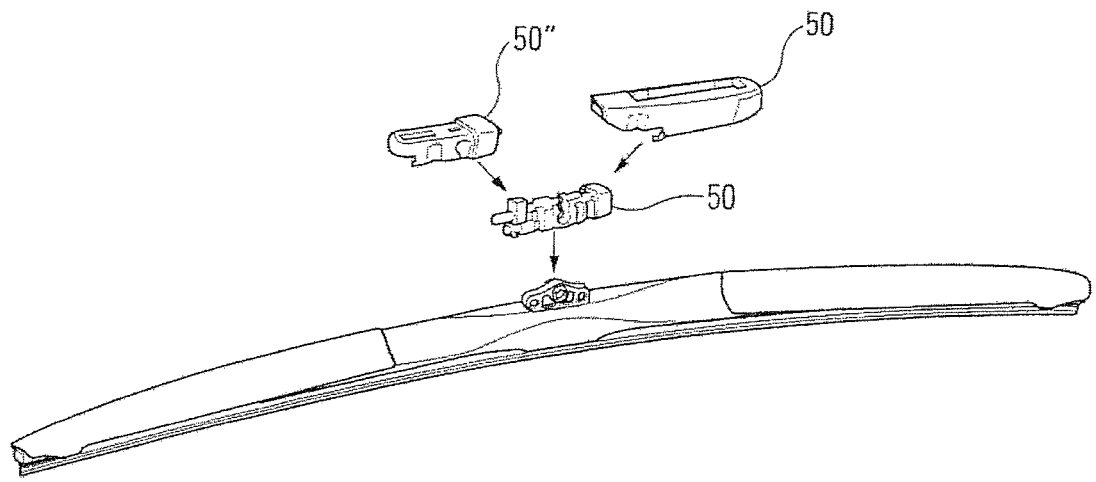
FIG. 61 is a schematic view of a streamlined flat wiper and adapters for connecting said wiper to a drive arm, in a partially exploded perspective view.

The connection member 11 is described in more detail with reference to FIGS. 58 and 59. This member has the shape of two elements extending longitudinally and which are placed symmetrically relative to one another relative to a longitudinal direction. They are attached to one another by means of a planar central wall 111 oriented longitudinally, one being positioned at the top of this central wall, the other being positioned at the bottom. The first element 11a appears open at the top whilst the second element 11b appears closed when viewed from the top, since it opens downwardly.

The second element 11b forms means for connecting the member 11 to the mounting, i.e. it cooperates with the mounting for the purpose of fixing the member to the wiper. In the example shown, the second element comprises means for fixing which are configured to cooperate by interlocking or resilient clipping with at least one pin of the mounting 2, as will be described hereinafter.

A first central transverse plane P11 of the first element 11a passing through the pin 25' is parallel to and spaced apart from a second central plane P12 parallel to the plane P11 and passing through the second element 11b.

The first element has a U-shape in the transverse direction, being formed by three planar surfaces which are perpendicular to one another and which extend in a longitudinal direction. From the central wall 111 extends a bottom wall 112, the width thereof being approximately equal, by a lower value, to that of the aperture 21 of the central mounting 2. A third wall 113 which substantially reproduces the shape of the central wall 111, by being mirror symmetrical relative to the central plane of the bottom wall, also extends upwardly from this bottom wall. Moreover, the second pivot pin 25' is seen in the figure, said pivot pin extending transversely between the first and third walls 111 and 113 and ensuring the function of the support of the adapter 5 which the pivot pin 25 provided in the first or preceding embodiments. Finally, the three walls of the first element 11a extend longitudinally and vertically so as to reproduce substantially the shape of the aperture 21 of the central mounting 2, so that the adapter 5 may be attached there, as it was in the aperture of the central mounting.

The second element 11b in turn has the function of fixing the connection member 11 to the central mounting 2, whilst ensuring a closure of the aperture 21 of this central mounting to improve the aerodynamics of the assembly. To achieve this, said second element comprises a top wall forming a capping 114 which extends from the upper edge of the central wall 111, in the direction opposing the first element 11a. This capping 114 extends the upper surface of the central mounting 2 and ensures a continuity which is both attractive and aerodynamic. This capping 114 carries a rib 115 which extends longitudinally into the centre thereof, over its entire length and which extends in the downward direction until it reaches a height corresponding to that of the transverse pivot pin 25. A cylindrical housing 51' is cut out from the centre of the length of this rib 115 which has the purpose of receiving the pivot pin 25 of the central mounting 2 by clipping and holding in place the connection member 11 in the aperture 21 of the central mounting 2.

At each of its longitudinal ends, the capping 114 comprises a further cylindrical housing 51" which has the purpose of receiving a pin 27 of the central mounting 2 by interlocking or resilient clipping.

In a variant, not shown, the connection member 11 could be formed from a single part with the central mounting 2.

With reference to FIGS. 61 to 65, a further embodiment of the invention will now be described. This embodiment has the purpose of adapting a streamlined flat wiper to an already existing adapter, which is adapted to a flat wiper. The invention consists in modifying the central mounting relative to those described above and inserting a second connection member between this modified central mounting and the existing adapter, as may be seen in FIG. 61.

Figure 62:
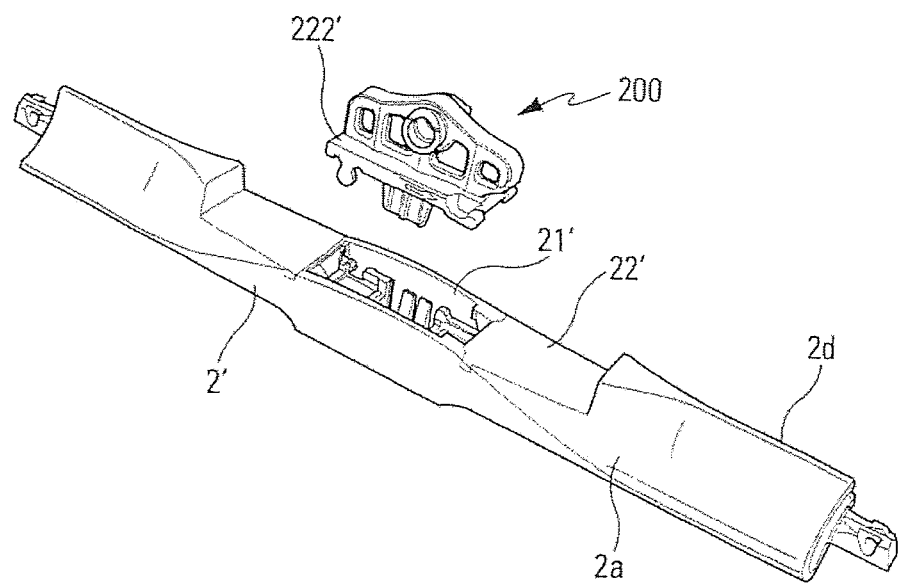
FIG. 62 is a partial schematic view of a streamlined flat wiper and an adapter for connecting said wiper to a drive arm, in an exploded perspective view.

A central mounting 2' which is similar to that of the preceding embodiments, except that it does not comprise a transverse pivot pin, is seen with reference to FIG. 62. The parallel lateral walls 2a, 2b are leveled off here to leave space for the existing adapters 50, 50' 50"; the upper part of the central part of the central mounting 2' thus forms a horizontal plane 22' in which the aperture 21' is cut out. The external contour in the lower part of the second connection member 200 reproduces the shape of the aperture 21', such that after the positioning of this second connection member, the aperture is completely sealed. Moreover, this member 200 comprises in the lower part a capping 222' which defines a horizontal plane and which is positioned in the extension of the horizontal plane 22'.

Figure 63:
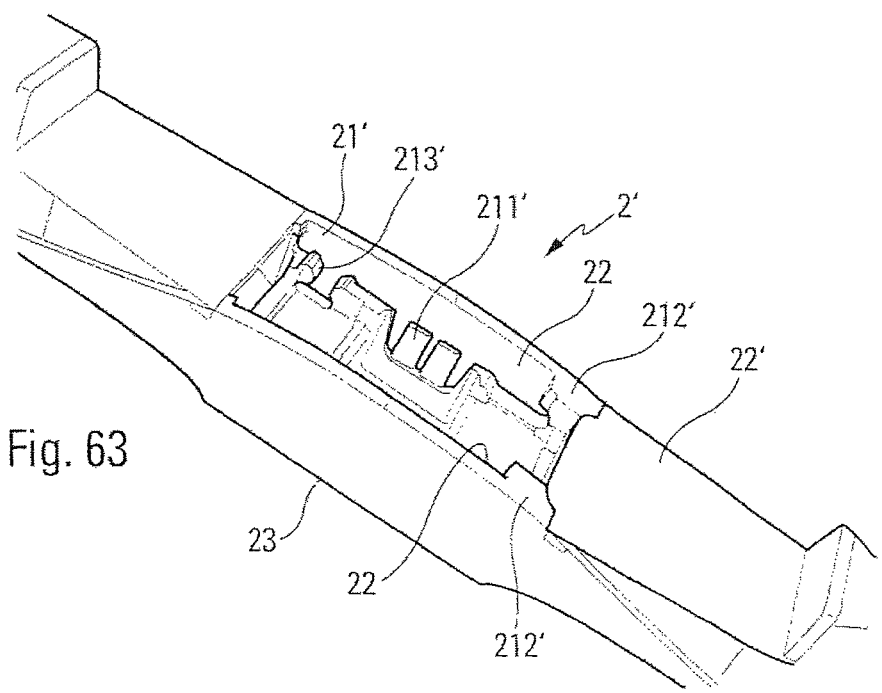
FIG. 63 is a schematic partial perspective view of a central mounting of the streamlined flat wiper of FIG. 62, FIGS. 64 and 65 are schematic perspective views of the adapter of FIG. 62, FIGS. 66 to 68 are schematic perspective views of the means for connecting to a streamlined portion according to the invention.

FIG. 63 shows the central part of the central mounting 2' with its horizontal plane 22', the aperture 21' being hollowed out therefrom. This aperture 21' of rectangular shape, without said shape being imperative, does not take the form of an undercut in the vertical direction. It is pushed into the central mounting 2' forming a cavity, as in the case of the central mountings of the previous embodiments, until it reaches the upper face of the longitudinal plate which extends above the hooks 23 supporting the member for retaining 7. Inside this cavity, the parallel lateral faces 22 comprise vertical ribs 211' which together serve for guiding corresponding ribs 211 positioned on the second connection member 200.

Means for hooking the second connection member 200 are located at the longitudinal ends of the aperture 21'. To achieve this, two female interlocking stops 212' are located on one side, said female interlocking stops protruding to the inside of the aperture from each of the lateral faces 22 to form a retainer in the vertical direction for male means 212 positioned on the second connection member 200. Said male means 212 have the shape of longitudinal extensions which are positioned laterally so as to be located opposite female interlocking stops 212' and which may be housed below said stops. These female stops 212' and these male means 212 have cylindrical shapes, with laterally oriented generatrices, so that they permit a rotation of the second connection member 200 in a vertical plane for its positioning on the aperture 21'.

At the other end of the aperture 21' are located two female clipping means 213' which protrude into the inside of the aperture from each of the lateral faces 22. These female clipping means 213' have, in negative shape, a cylindrical shape with a circular base, which is open upwardly and the upper edges thereof being able to be separated from one another in a resilient manner. At the same time, the second connection member 200 comprises, at the end opposing its interlocking means, two male clipping means 213, the shape thereof being mirror symmetrical to the female clipping means 213' of the aperture 21'. The introduction of the second connection member 200 in the aperture 21' is carried out, therefore, in the following manner: the operator positions the second connection member 200 in the aperture 21' by positioning it at an angle and passing the male interlocking means 212 below the female interlocking means 212', then the operator rotates the second connection member 200 which drives it substantially horizontally and which moves the male clipping means 213 opposite the female clipping means 213' and simultaneously the ribs 211 of the second connection member 200 between those 211' of the aperture 21'. Then a vertical pressure fits the male clipping means 213 into the female clipping means 213' which ensures the fixing of the two parts.

Figure 64:
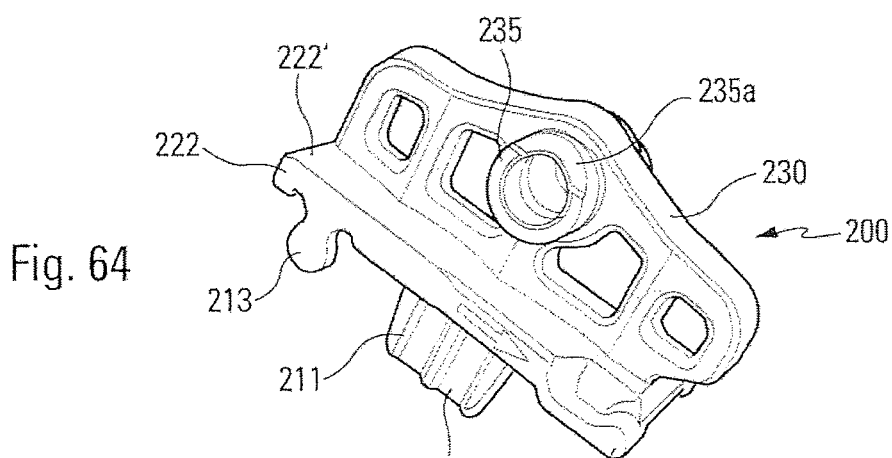
Figure 65:
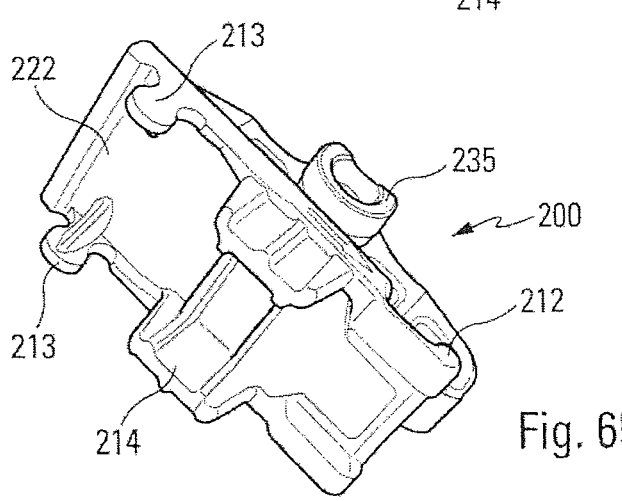

Visible with reference to FIGS. 64 and 65 is the second connection member 200 which essentially comprises a central plate 222, the upper face thereof 222' forming the desired continuity for the capping with the horizontal plane 22' of the central mounting. Lateral means for guiding 214 extend downwardly from this central plate at the centre, said means for guiding bearing the guide ribs 211 and at the longitudinal ends, on the one hand, the male interlocking means 212 and, on the other hand, the male clipping means 213. A structure 230 for supporting an adapter extends upwardly from the central plate. This structure has substantially the shape of a parallelepiped, extending longitudinally in the centre of the plate over the entire length thereof. It bears on its upper part two aligned transverse journals 235 which form a pin, having the same features as the transverse pivot pin 25 of the apertures 21 of the central mountings of the preceding embodiments and which may, therefore, be integrated in the cylindrical housing 51 of the existing adapters 50, 50', 50". Preferably said journals 235 comprise a chamfered face 235a on their upper part, in order to facilitate their introduction into said cylindrical housing.

Now reference will be made to FIGS. 66 to 68 which show a variant of the means for connecting, between a central mounting 2 and a terminal cap 3.

Figure 66:
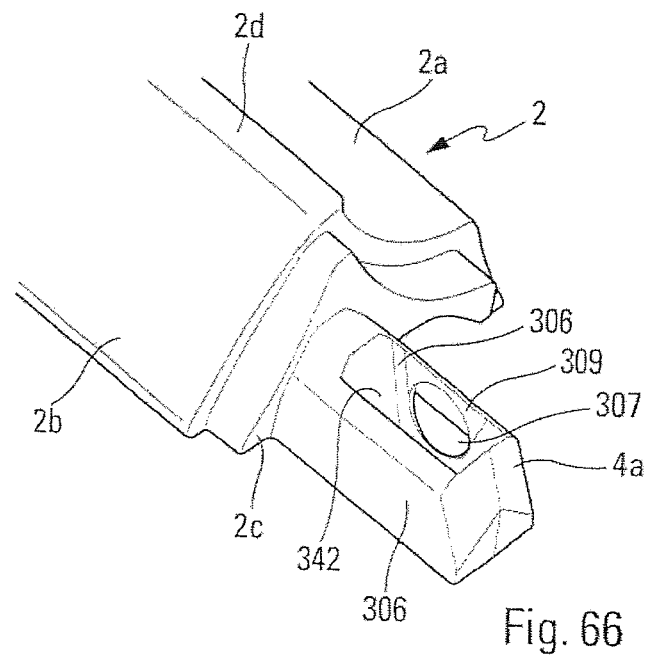

In FIG. 66, longitudinal walls are seen at the front 2a and at the rear 2b, said walls forming the dihedron of the aerodynamic baffle of the central mounting 2 by being joined at a top edge 2d, said dihedron being terminated longitudinally by a transverse wall 2c which closes the dihedron. From this transverse wall 2c extends a finger 4a of substantially parallelepiped shape, which is traversed vertically by a recess 342 designed to receive a finger 4b of a terminal cap 3.

The recess 342 has a generally parallelepipedal shape. It extends between two substantially parallel lateral walls 306 of the finger 4a. These walls 306 comprise opposing internal lateral faces, each comprising a substantially cylindrical blind hole 307 for receiving a pin 308 of the finger 4b. An upper part 309 of each wall 306 extending between the blind hole 307 and the upper longitudinal edge of the finger 4a may be chamfered internally to facilitate the insertion of the finger 4b and its pins 308 in the recess 342.

The finger 4a has a substantially longitudinal and vertical plane of symmetry.

Figure 67:
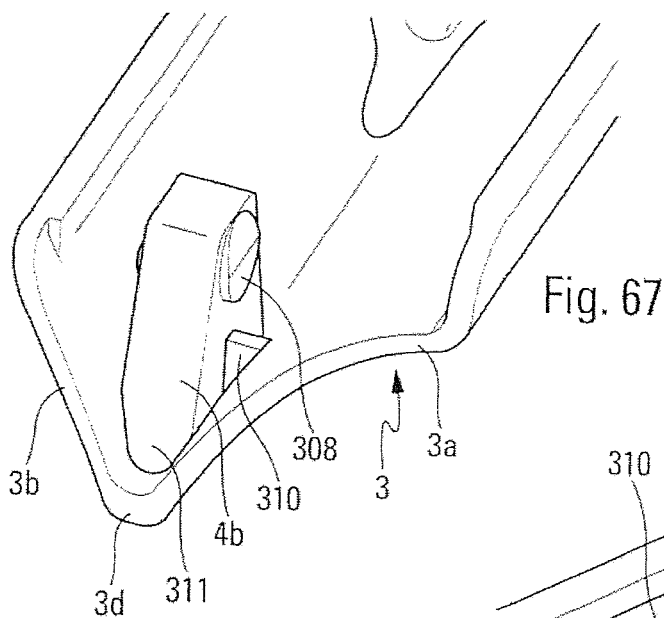

FIG. 67 shows the finger 4b of a terminal cap 3, said finger having in this case a generally substantially trapezoidal shape. The large base 311 of the finger 4b is connected to the joining area between the walls 3a, 3b. The small base of the finger defines the free end of the finger. It thus extends toward the bottom from the inside of the top edge 3d of the cap 3. It has a flattened shape and substantially extends in a substantially vertical longitudinal plane. It comprises two external lateral faces on which the pins 308 protrude. The pins 308 are located in the vicinity of the free end of the finger 4b. Each pin 308 has a generally cylindrical shape and comprises an upper non-half-portion which is chamfered and a lower half-portion which is bevelled or chamfered so as to facilitate the insertion thereof in the recess 342 of the finger 4a.

The finger 4b has a substantially longitudinal and vertical plane of symmetry.

The lateral faces of the pin 308 are connected on the internal faces opposite the walls 3a, 3b by a reinforcing rib 310 which extends substantially transversely. A first portion of rib 310 extends between a lateral face of the finger 4b and the wall 3a and a second portion of rib (not visible) extends between the other lateral face of the finger 4b and the wall 3b.

Figure 68:
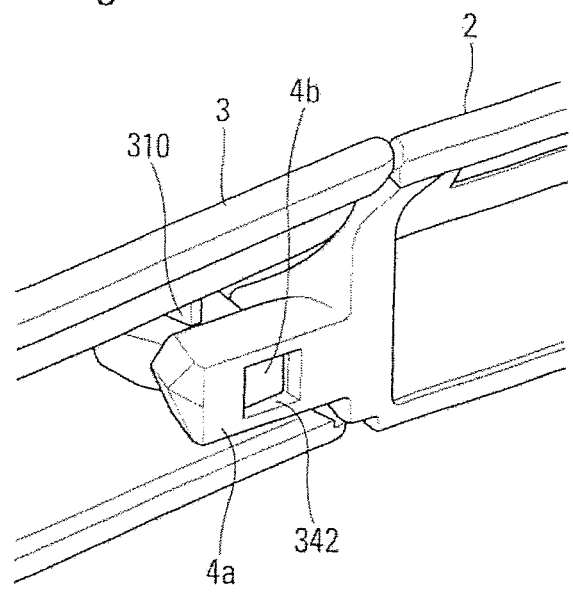

FIG. 68 shows the cooperation of the finger 4a of FIG. 66 with the finger 4b of FIG. 67. The finger 4b is engaged in the recess 342 of the finger 4a until interlocked by resilient clipping of the pins 308 in the blind holes 307 of the finger 4a. The engagement is facilitated by the bevelled portions of the pins 308 and the chamfered parts 309 of the finger 4a which may cooperate together by sliding.

In the mounted position shown in FIG. 68, the fingers 4a, 4b are substantially perpendicular. They are capable of rotating relative to one another by the cooperation of the external cylindrical surfaces of the pins 308 with the internal cylindrical surfaces of the holes 307.

The non-bevelled portions of the pins 308 cooperate with the blind holes 307 to prevent inadvertent release of the fingers and thus of the terminal cap 3 of the mounting.

Advantageously, the streamlined portion is configured so that the force required for detaching the finger 4a of the central mounting of the finger 4b of the terminal cap, by releasing them from one another, is greater than the resistance to rupture of at least one part of the streamlined portion, as is disclosed in more detail hereinafter with reference to the variant of FIGS. 69 to 78.

Figure 69:
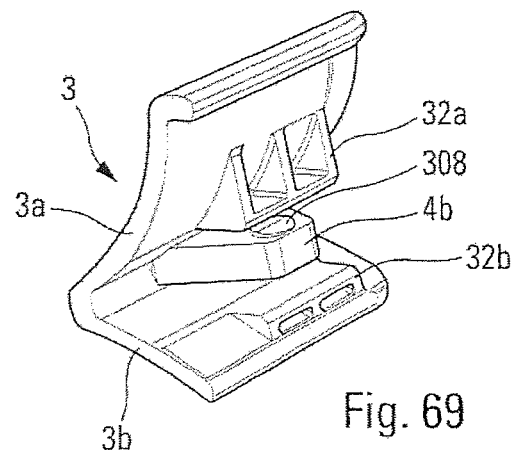
FIGS. 69 to 78 are schematic perspective views of the means for connecting a streamlined portion according to the invention, FIG. 73 being a sectional view along the line A-A of FIG. 72, FIG. 75 being a sectional view along the line B-B of FIG. 74, FIG. 77 being a sectional view along the line C-C of FIG. 76 and FIG. 78 being a sectional view along the line D-D of FIG. 71, FIGS. 79 to 81d are schematic perspective views of a free end of a streamlined portion or terminal cap of a streamlined portion according to the invention, FIG. 80 being a sectional view along the line E-E of FIG. 79, FIGS. 81a to 81d being sectional views along the lines F1-F1, F2-F2, F3-F3 and F4-F4 of FIG. 79, FIGS. 82 and 83 are schematic perspective views of a streamlined portion or central mounting according to the invention, the view of FIG. 83 also being in cross section.

Visible with reference to FIG. 69, is an end part of a terminal cap 3 which differs from that described with reference to FIG. 67 essentially in that the finger 4b extends in this case between two reinforcements 32a, 32b of the type of those shown in FIGS. 11 and 12. The reinforcements 32a, 32b comprise intersecting walls, some of which are substantially longitudinal and parallel to the finger 4b. The reinforcements 32a, 32b are separated from one another in the transverse direction by a sufficient distance in order to be able to insert therebetween the finger 4a, as visible in FIG. 71. The reinforcements may contribute to the pivotable guidance of the finger 4a.

Moreover, as visible more clearly in FIGS. 71 to 74, the walls 3a, 3b of the terminal cap comprise thinned parts 312, i.e. parts having a reduced thickness relative to the remainder of the walls. Each wall 3a, 3b comprises in this case a thinned part 312 which has a generally longitudinal shape and is located in the joining area between the wall 3a, 3b and the top edge 3d. The thinned parts 312 are joined and located in the vicinity of the end of the terminal cap 3 bearing the finger 4b.

The thinned parts 312 are in this case formed by a recess or a raised portion of material on the lateral internal faces opposite the walls 3a, 3b.

The thinned parts 312 permit the areas of the cap in which they are located to be weakened. They therefore define weakened areas in which a rupture of the cap is designed to be initiated when an attempt is made at detaching the cap from the central mounting.

It is in this sense that the streamlined portion, i.e. at least one terminal cap and/or the central mounting, is configured so that the force required to disengage said means for connecting of said complementary means, by disuniting each other, is greater than the breaking strength of at least the thinned part 312 constituting the cap of the streamlined.

The streamlined portion is thereby equipped with means arranged so that the cap and/or the central mounting break before separation of the finger 4b of the cap relative to the finger 4a of the central mounting.

The finger 4b of the terminal cap, and/or the finger 4a of the central mounting is from the thinned part of the streamlined portion.

In the example illustrated in FIGS. 72-75, the thinned part 312 is provided on the terminal cap 3, in the portion of the dihedron of the cap from which the finger is born 4b. In particular, 3d formed at the meeting edge of the front wall 3a with the bottom wall 3b, defining the cap 3 thinned relatively to the rest of the cover.

Figure 70:
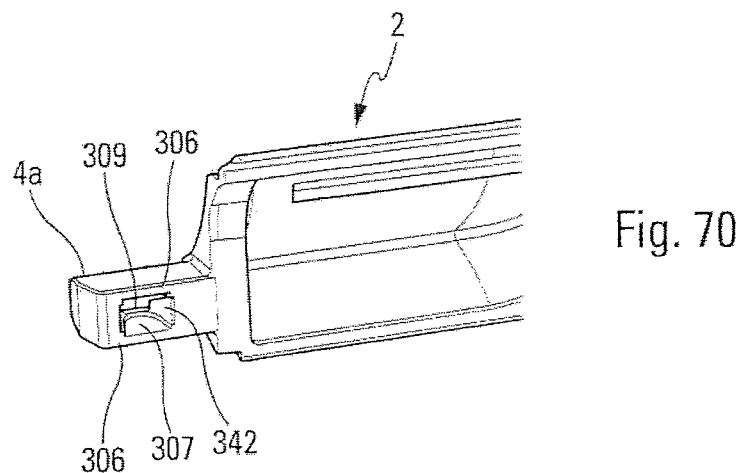

Visible with reference to FIG. 70 is an end part of the central mounting 2 which differs from that described with reference to FIG. 66, in particular, in that the blind holes 307 in this case each have a generally trapezoidal shape. The small base of each blind hole 307 defines the upper end of the hole and has a generally concave curved shape. This small base is separated from the upper longitudinal edge of the corresponding wall by a chamfered part 309 of the aforementioned type. The large base of the hole 307 opens in this case on the lower longitudinal edge of the corresponding wall 306.

Figure 71:
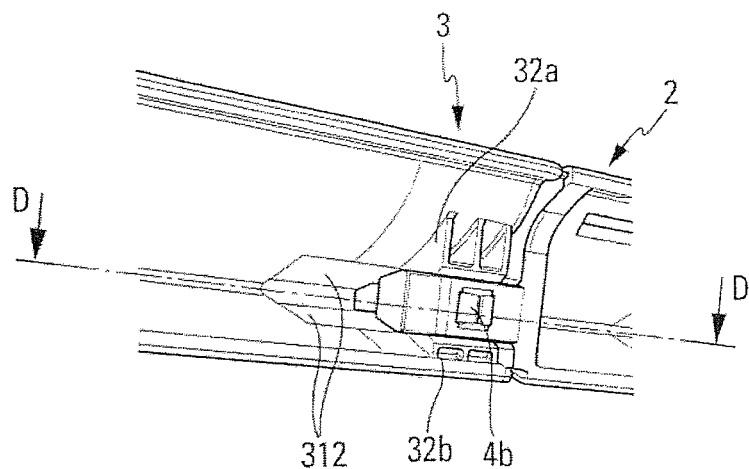
Figure 72:
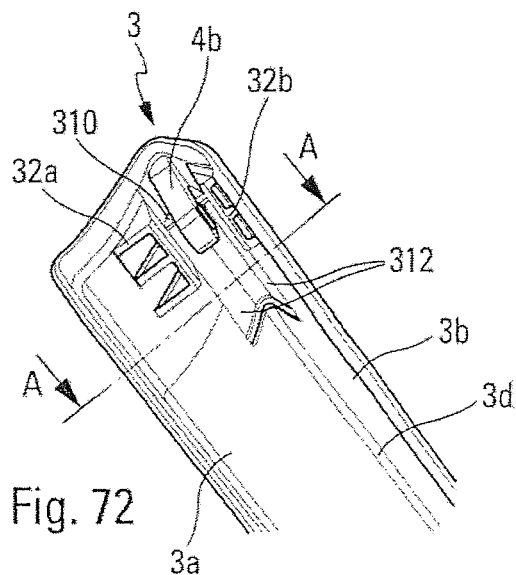
Figure 73:
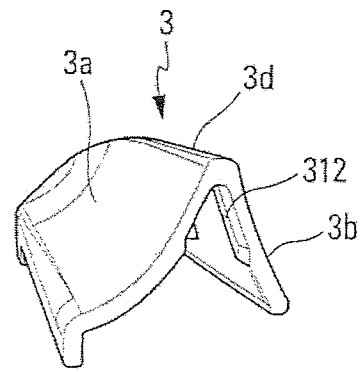
Figure 74:
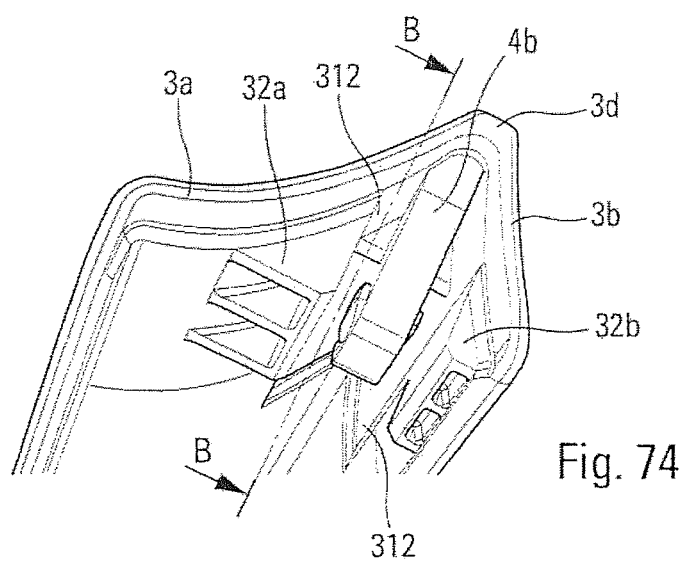
Figure 75:
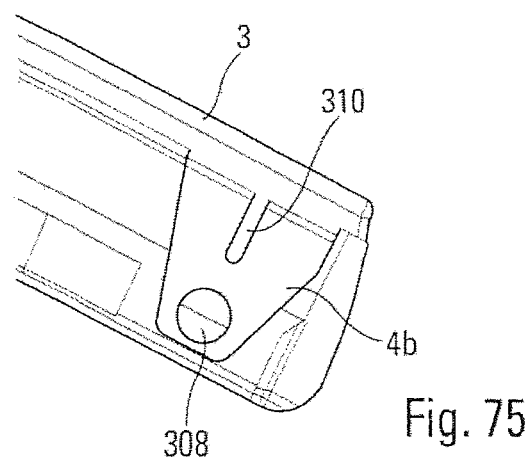

FIG. 71 shows the cooperation of the finger 4a of FIG. 69 with the finger 4b of FIG. 70.

Figure 76:
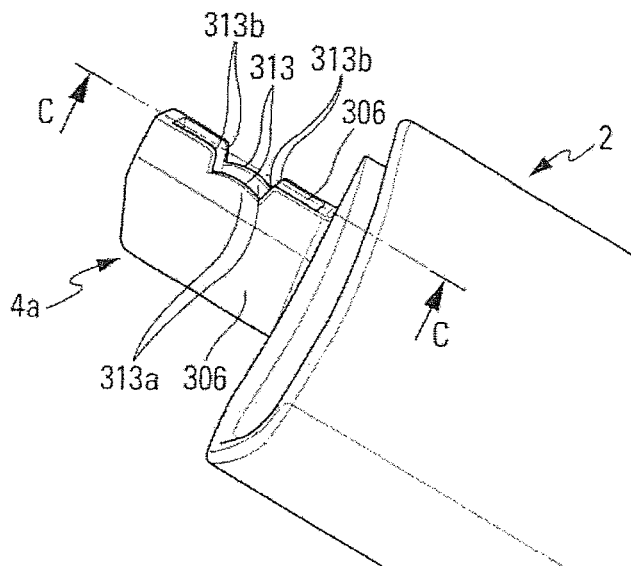
Figure 77:
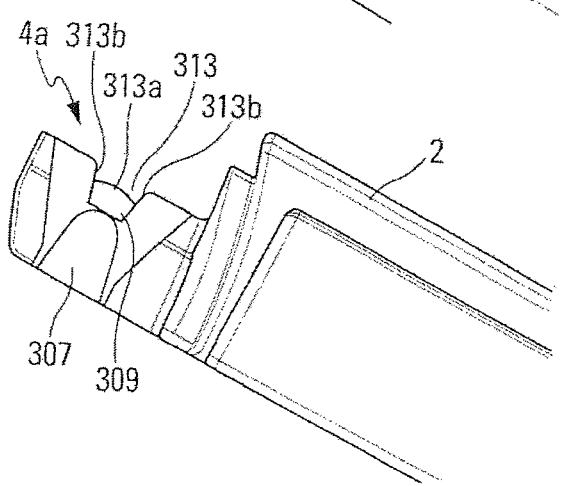
Figure 78:
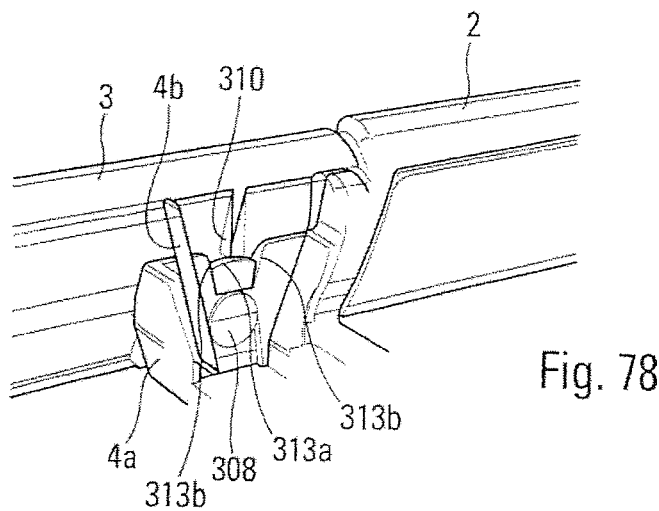

A further difference relative to the finger 4a of the terminal cap 3 is visible in FIGS. 76 to 78.

The lateral walls 306 of the finger 4a each comprise a notch 313 in the region of their upper longitudinal edges. Each notch 313 is delimited by three surfaces: a central guide surface 313a which is of substantially convex curved shape and two lateral stop surfaces 313b which are substantially planar.

The guide surface 313a extends about the pivot pin defined by the cylindrical surface of the blind hole 307. It has in this case an angular extent which is similar to that of this cylindrical surface, which here ranges between 20 and 50° approximately.

The guide surface 313a extends about the cylindrical surface of the blind hole and is thus located radially outside said cylindrical surface, relative to said pin.

The stop surfaces 313b have a substantially radial orientation relative to this pin and form together an angle corresponding to the aforementioned angular extent. They are each connected to the longitudinal upper edge of the corresponding wall 306 by a convex curved portion.

It may be noted in FIG. 77, in particular, that the aforementioned upper chamfered portions 309 of the walls 306 are located on the opposing portions of the internal faces of the walls 306, extending between the blind holes 307 and the notches 313.

The guide surfaces 313a and the stop surfaces 313b of the walls 306 are designed to cooperate respectively with the lower free edges of the portions of the reinforcing rib 310, as visible in FIG. 78. The lower end of the rib 310 has a convex rounded shape (see FIGS. 75 and 78) which is configured to slide over the guide surface 313a in order to contribute to the pivoting guidance of the terminal cap 3 relative to the central mounting 2. Moreover, to the extent that it is permitted by the other elements of the wiper, the lower end of the rib 310 is capable of coming into abutment with the stop surfaces 313b in order to define the end of travel positions for the pivoting of the cap relative to the central mounting.

Although the above description has been made relative to the central mounting 2 and a terminal cap 3, it naturally applies to the connection between the central mounting and the other terminal cap.

Reference is now made to FIGS. 79 to 81d which show a further embodiment of the invention, according to which the streamlined flat wiper according to the invention is provided with a principal baffle and a secondary baffle. More specifically, each streamlined portion comprises a principal baffle and a secondary streamlined portion at each of its free ends.

The principal baffle is of the type described above with reference to FIG. 1, in particular, and extends substantially over the entire longitudinal dimension of each terminal cap 3.

To produce this baffle, the front wall 3a of the cap 3 may, for example, define a front surface 314a having a cross section of substantially concave curved shape, as is visible in the drawings.

This surface 314a extends between the top edge 3d of the cap and the lower longitudinal edge 3e of the front wall 3a.

According to the invention, each terminal cap 3 comprises a secondary baffle at its free end, which here extends substantially between a free longitudinal end of the principal baffle and the front edge 3e. In the example shown, the secondary baffle defines a concave curved surface 315a at the free end of the cap 3. This surface is substantially merged with the surface 314a of the principal baffle, in the region of the free end of the cap. The surface 315a extends substantially between a terminal edge 3f of the cap which has a substantially transverse orientation, a longitudinal end part of the top edge 3d connected to the upper end of the terminal edge 3f and a longitudinal end part of the front edge 3e connected to the lower end of the terminal edge 3f. The surface 315a comprises a hollow in the vicinity of the edge 3f. This edge 3f comprises a rectilinear central portion and two curved end portions, respectively for connecting to the edge 3d and to the longitudinal edge 3e.

Figures 79, 80:
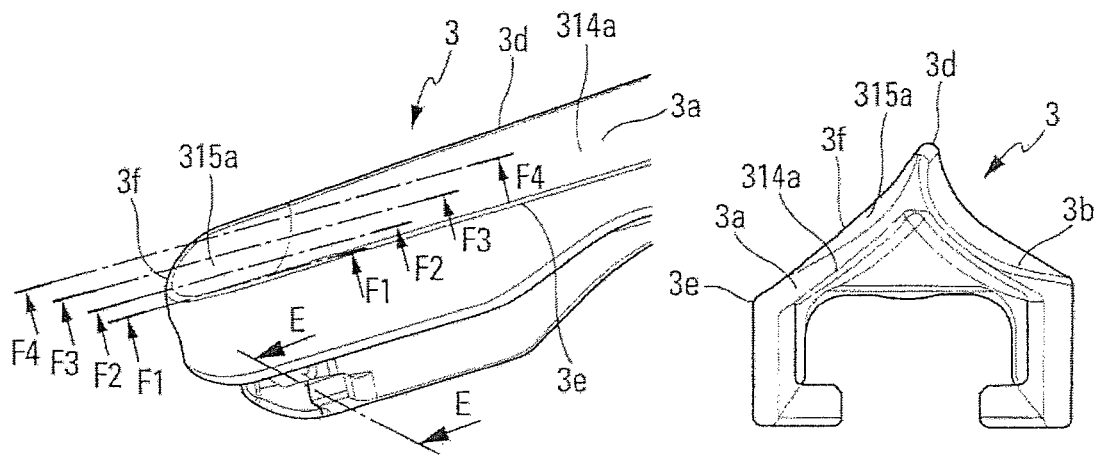
Figures 81A, 81B:
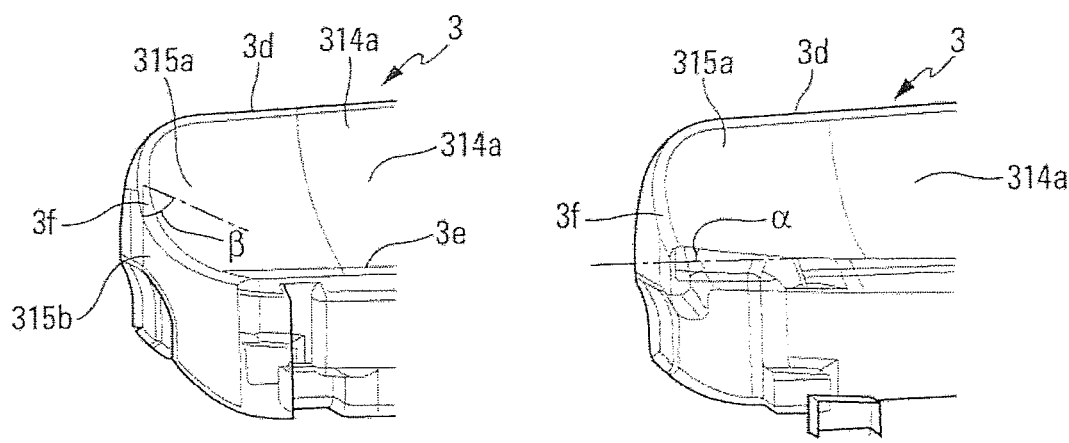
Figures 81C, 81D:
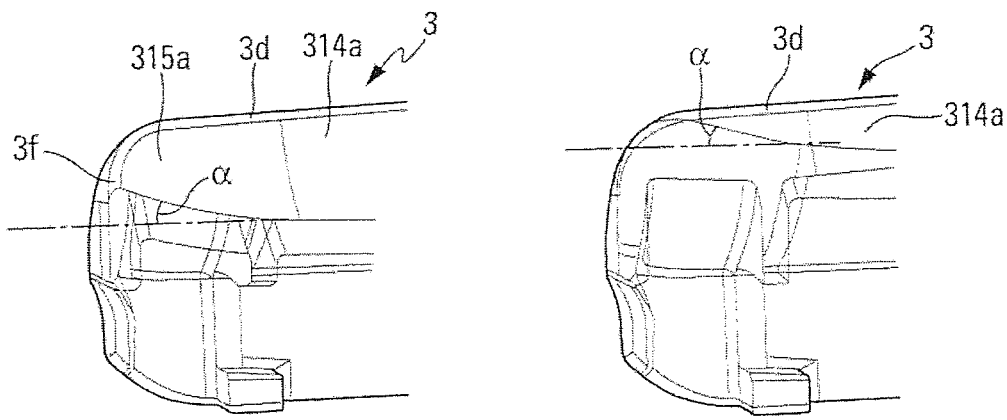

FIG. 80 enables it to be seen that the terminal edge 3f is located higher than the bottom of the hollowed portion of the surfaces 314a, 315a which permits the upward deflection of the airflow which flows during operation on the wall 3a of the cap, along the wiper.

Visible in FIGS. 81a to 81d is the evolution of the angle α formed between the intersection of the surface 315a with the substantially vertical longitudinal planes (which are the cutting planes in these figures) and a substantially horizontal longitudinal plane. The angle α is substantially zero in the vicinity of the front edge 3e and is substantially at a maximum substantially mid-distance between the front edge 3e and the top edge 3d. It varies, for example, between 0 and 30° approximately.

It is also seen in these figures that the edge 3f is at the intersection of the face 315a and a transverse face 315b of the end of the cap 3, said faces 315a, 315b forming with one another an angle β of less than 90°.

Figure 82:
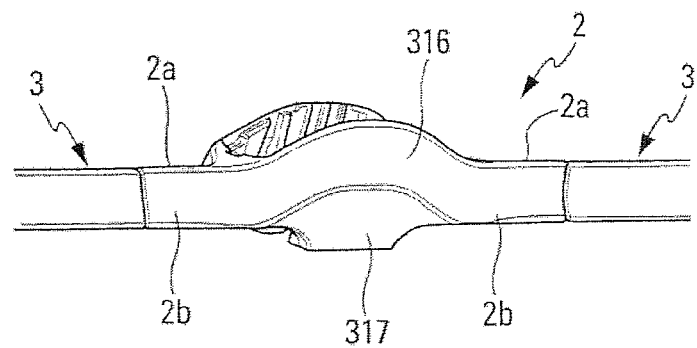
Figure 83:
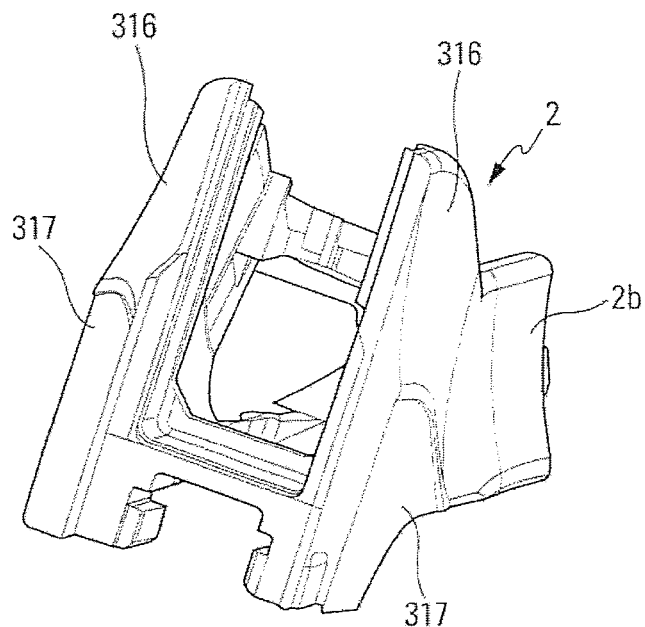

FIGS. 82 and 83 show a further embodiment of the invention relating to the surface states of the external faces of the streamlined portion according to the invention.

The example shown in the drawings applies to the central mounting 2 of the streamlined portion but could also apply to the terminal caps.

The central mounting 2 comprises substantially in its centre two lower lateral faces 317 and two upper lateral faces 316.

The upper lateral faces 316 extend between the lateral walls 2a and 2b of the mounting defining the aforementioned dihedron and thus ensure a continuity between the external faces of the walls 2a, 2b and, in particular, the front lateral wall 2a ensuring the deflection of the air during operation.

As seen in the drawings, the faces 316 have a generally rounded shape, each face 316 extending above and around a face 317.

The faces 317 are substantially parallel, whilst the faces 316 converge upwardly.

According to the invention, the faces 316, on the one hand, and the faces 317, on the other hand, have different surface states and, in particular, different degrees of roughness. It will be understood by different surface finish, that the composition of the material used is the same, only the surface is concerned and has different roughness, for example rougher to the touch of a surface finish compared to the another.

Preferably, the faces 316 have a greater degree of roughness than that of the faces 317, said faces thus being smoother. For example, the lower faces 317 have a surface state of the VDI15 type and the upper faces 316 have a surface state of the VDI30 type.

The greater smoothness of the faces 317 may be desired to reveal a mark by stamping or engraving, or to bond any means thereto, such as for example an aging patch.

To obtain these differences in surface states, it is conceivable, for example, to modify the surface state of the internal moulding faces of a mould in the case where the central mounting is produced by injection-moulding. The texturing of certain internal faces of the mould, such as for example those defining the faces 316 and the external faces of the walls 2a, 2b of the mounting, will permit a mounting having rougher faces 316 to be obtained, for example.

Figure 84:
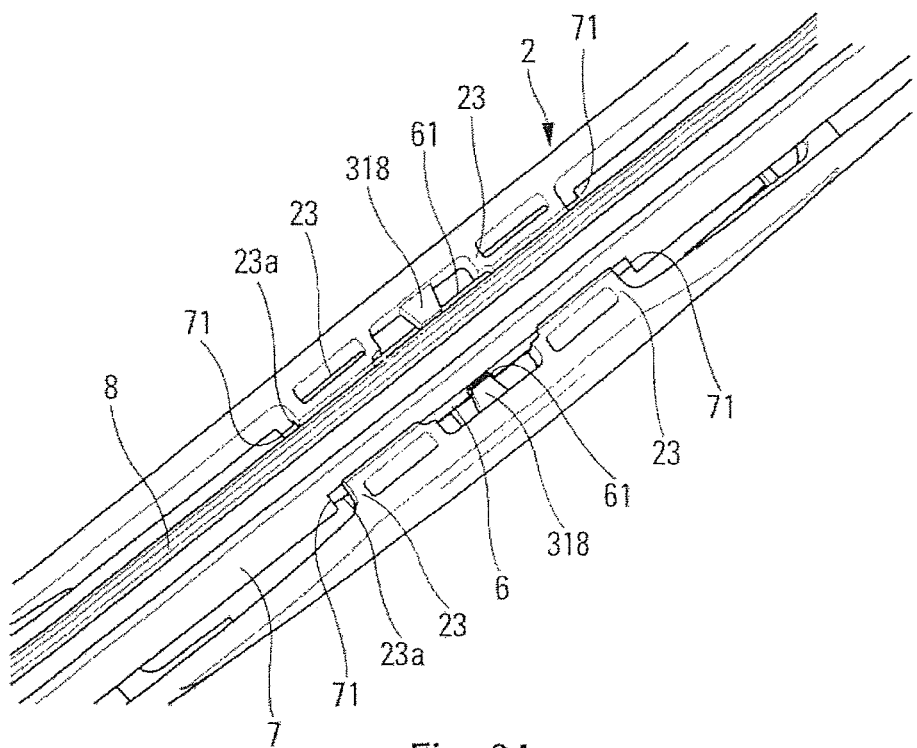
FIGS. 84 and 85 are schematic perspective views of a streamlined portion or central mounting according to the invention, the view of FIG. 85 showing a part in larger scale of the view of FIG. 84.
Figure 85:
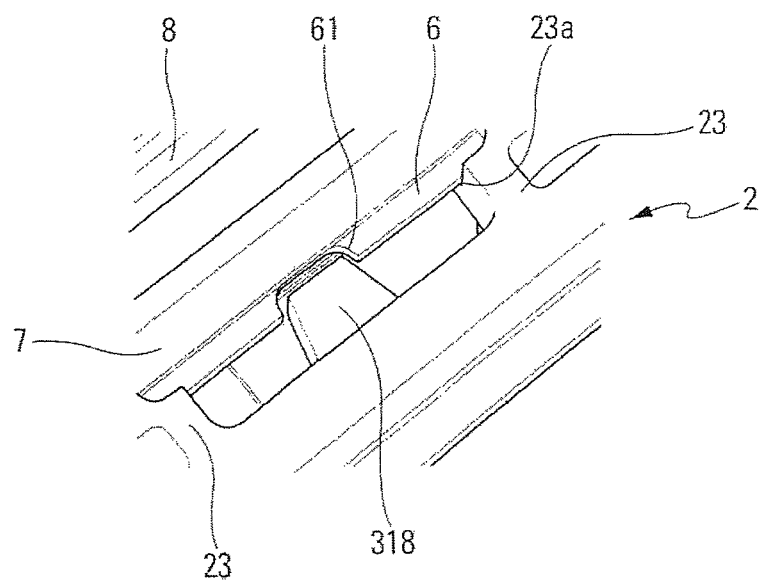

FIGS. 84 and 85 illustrate a further embodiment of the invention in which the streamlined portion and, more particularly, the central mounting 2 comprise means for locking which are configured to cooperate with the stiffening member 6 in order to immobilize it in the longitudinal direction relative to the mounting.

In the embodiment shown, the stiffening member 6, the member 7 and the blade 8 are as defined above with reference to FIG. 4, in particular, and the central mounting 2 is as defined above relative to FIG. 7, in particular.

The central mounting 2 further comprises at its lower end means for locking, designed to be engaged and to cooperate with the aforementioned notches 61 of the stiffening member. The means for locking comprise in this case two elements 318 protruding over the internal lateral faces opposite the lateral walls of the mounting. Said elements 318 extend substantially toward one another and are substantially identical. They are substantially planar. They are coplanar in a substantially horizontal longitudinal plane which passes substantially through the notches 23a of the hooks 23 of the mounting in which the stiffening member 6 is inserted by sliding. They each have a generally trapezoidal shape, the large base thereof being connected to the lateral wall of the mounting and the large base thereof defining the free end of the element and being designed to be engaged in one of the notches 61.

Each notch 61 is generally C-shaped or U-shaped, the lateral edges thereof being able to cooperate by abutment with the free end of the corresponding element 318 to limit the longitudinal displacements of the stiffening member relative to the mounting 2.

Figure 86:
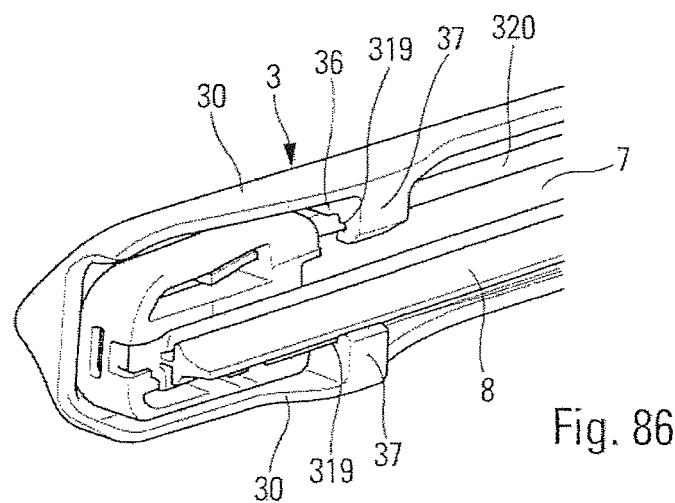
FIG. 86 is a schematic perspective view of an end of a wiper according to the invention.
Figure 87:
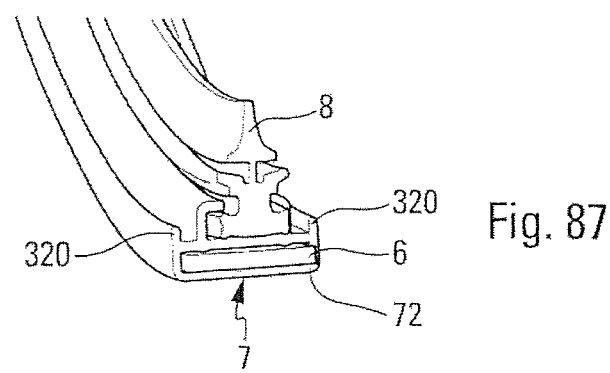
FIG. 87 is a schematic perspective view of a member of the wiper of FIG. 86, FIGS. 88a and 88b are schematic perspective views of a free end of a wiper according to the invention.

Reference is now made to FIGS. 86 and 87, which illustrate a further embodiment of the invention in which the streamlined portion comprises means for slidable guiding which are configured to cooperate with the member 7.

This embodiment of the invention may be considered as a variant of the embodiment described above in relation to FIGS. 27 to 29, in particular.

The above description relative to FIGS. 27 to 29 therefore applies to FIGS. 86 and 87 to the extent that it does not contradict what follows.

Whatever the embodiment considered, the member for retaining 7 is a support member which extends longitudinally along the streamlined flat wiper blade over at least a half-length thereof. In such a case, the streamlined flat wiper blade comprises at least two members for retaining 7. Alternatively, the member for retaining 7 may extend over the entire length of the wiper blade and thus formed a support of spline and of a single blade, made unitary or one-piece.

The terminal cap 3 comprises two lateral guide hooks 37 extending from its vertical parts along two horizontal parts positioned opposite one another and which are separated by a space corresponding substantially to the thickness of the member for retaining 7 in this region. These two hooks 37 form means for supporting the member for retaining 7 and the rectangular cut-out in the transverse wall 36 serves as a means for guiding for this member for the sliding thereof in the cap 3 when the cap 3 is articulated relative to the central mounting 2. The hooks 37 are located on lateral flanges 30 of the cap, described above.

The horizontal parts of the hooks 37 comprise in this case longitudinal grooves 319 which are open at the top and configured to receive longitudinal ribs 320 of the member 7.

The above description relative to FIG. 8a applies to FIG. 87.

The lateral longitudinal walls of the upper tube 72 of the member 7 extend in this case downwardly to form the aforementioned ribs 320 which thus extend downwardly from the tube. They are substantially parallel and extend over the entire longitudinal dimension of the member 7. They are substantially parallel to the upper vertical parts of the hooks 73 of the member 7.

As visible in FIG. 86, each rib 320 of the member 7 is housed in a groove 319 of a hook 37 of the cap and may slide in the longitudinal direction in this groove. The ribs 320 may further cooperate with the lateral walls of the grooves 319 to prevent the transverse displacements of the member 7 relative to the streamlined portion.

Figures 88A, 88B:
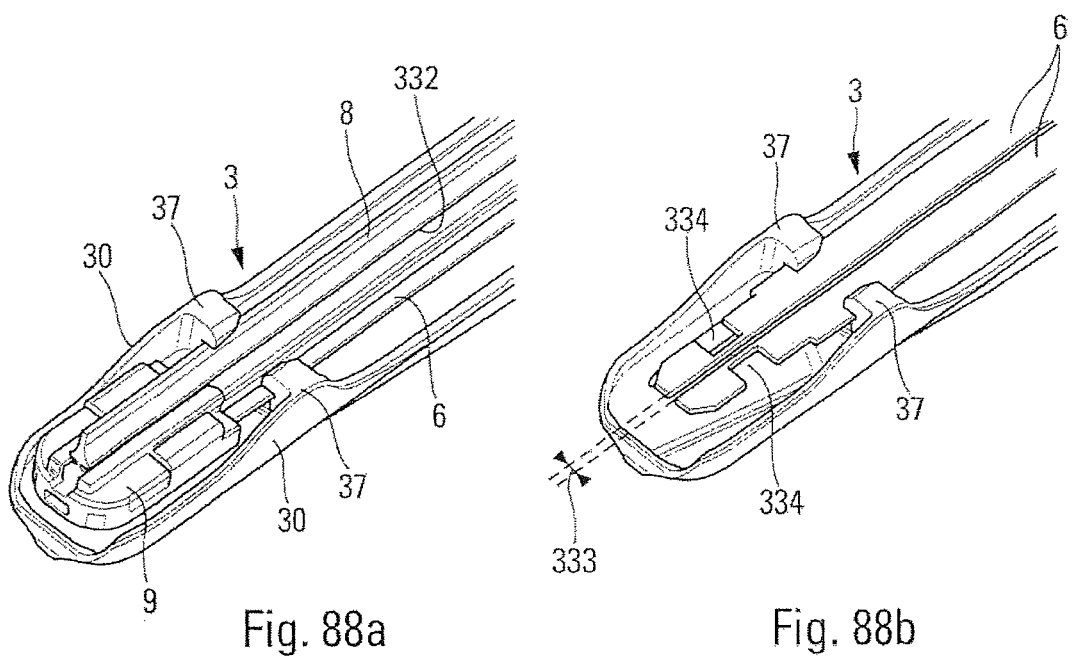

FIGS. 88a and 88b show a variant of the means of the streamlined portion for the slidable guiding of the flat wiper.

The flat wiper in this case does not have a member 7 for retaining the blade 8 and the stiffening member 6. The wiper in this case comprises two stiffening members 6 which are coplanar and extend parallel and to the side of one another (FIG. 88b).

The stiffening members 6 are separated from one another by a slight transverse clearance 333. The blade 8 comprises two longitudinal grooves 332 which are coplanar on their sides and which are designed to receive internal longitudinal end parts of the stiffening members. Although this is not visible, the grooves 332 define relative to one another a longitudinal strip of material of the blade 8 which is designed to be housed, in the mounted position, in the region of the aforementioned clearance 333 and to be clamped between the stiffening members 6.

The stiffening members are held in position and slidably guided due to the hooks 37. Each stiffening member 6 has its longitudinal end part which opposes the aforementioned clearance 333 and which is in abutment with and may slide on the vertical and horizontal parts of the corresponding hook 37.

The hooks 37 and, in particular, their vertical parts, hold in position the stiffening members 6 and the blade 8, preventing the stiffening members from being separated from one another. The horizontal parts of the hooks extend below the stiffening members and their vertical parts extend to the side of the stiffening members. The blade 8 may be configured to act transversely upon the stiffening members 6 so that they bear against the hooks 37. The hooks 37 may also comprise means, such as lugs 38, for bearing at regular intervals against the stiffening members.

The streamlined portion 3 is similar to those disclosed above. The end piece 9 will be described in more detail with reference to FIGS. 95a and 95b and may differ from the end piece of these figures essentially by the fact that it is configured to receive two stiffening members instead of one.

This end piece 9 comprises means for locking the stiffening members such as resiliently deformable tabs designed to cooperate by resilient clipping with the notches 334 of the ends of the stiffening members 6.

Reference is now made to FIGS. 89 to 93 which illustrate a further embodiment of the invention in which the streamlined portion comprises means for slidable guiding which are configured to cooperate with each end piece 9.

In this variant, each terminal cap 3 comprises means for guiding which are similar to those described above, in particular in relation to FIGS. 27 to 29, but which are in this case configured to cooperate with the corresponding end piece 9.

Figure 89:
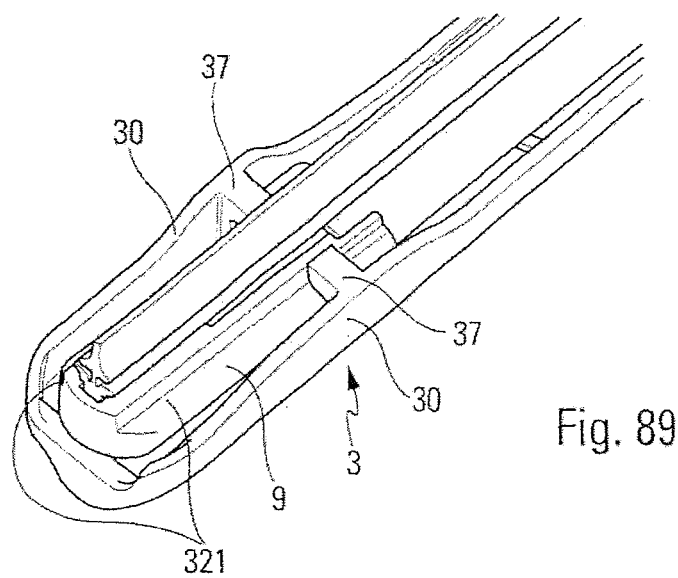
FIGS. 89 to 93 are schematic perspective views of a free end of a wiper according to the invention, FIGS. 92 and 93 also being views in partial longitudinal section.
Figure 93:
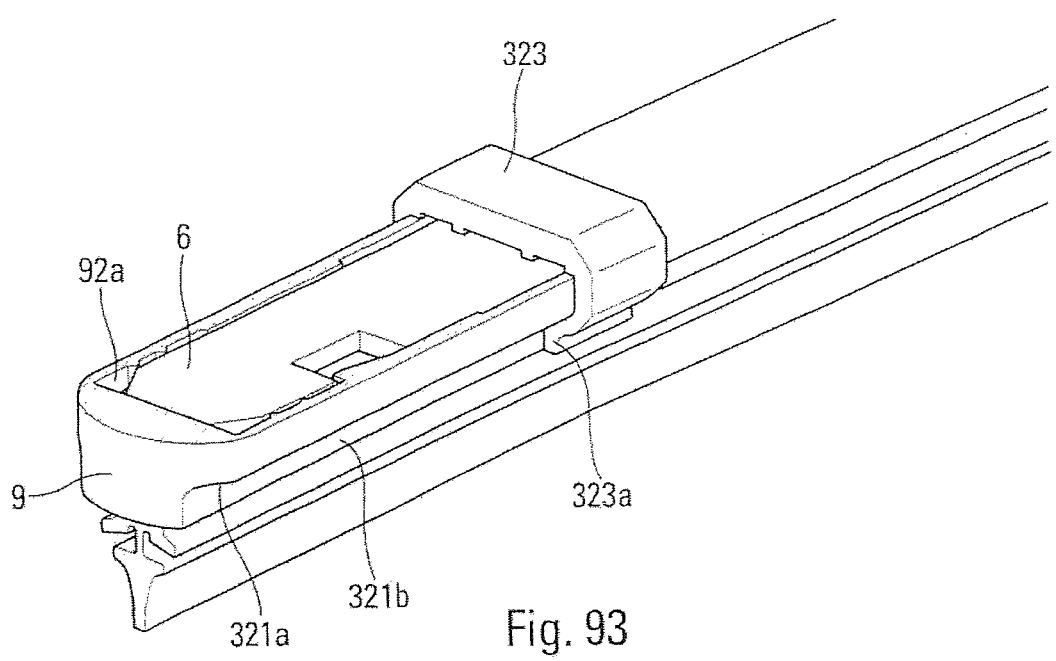

The above description relative to FIGS. 27 to 29 applies, therefore, to FIGS. 89 and 93 in that it does not contradict what follows.

The means for guiding formed by the hooks 37 are in this case located closer to the free end of the terminal cap 3 so as to be able to cooperate with the end piece 9.

Figure 90:
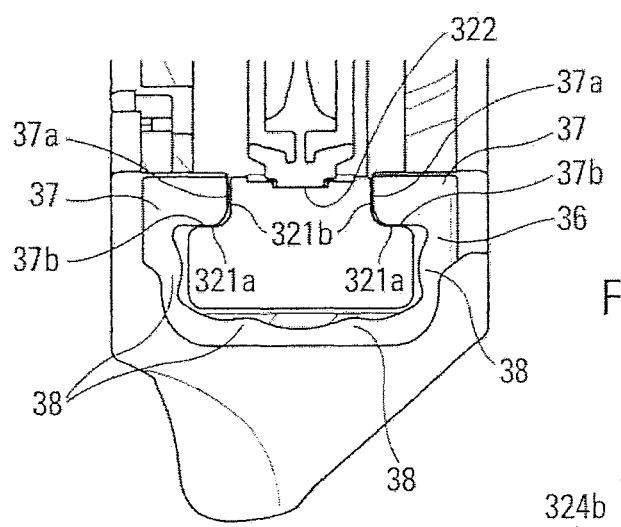

The horizontal parts of the hooks 37 each comprise a first vertical guide edge 37a and a second horizontal guide edge 37b oriented upwardly (FIG. 90).

Said edges 37a, 37b are designed to cooperate with lateral longitudinal tracks 321 of the end piece.

The following description relative to FIG. 5, in particular, applies to the end piece of FIGS. 89 to 93 in that it does not contradict what follows.

The end piece 9 comprises a means for guiding and for longitudinal displacement which cooperates with the streamlined portion, and in particular with the means for guiding of the cap 3 detailed above. These may be the hooks 37.

Figure 91:
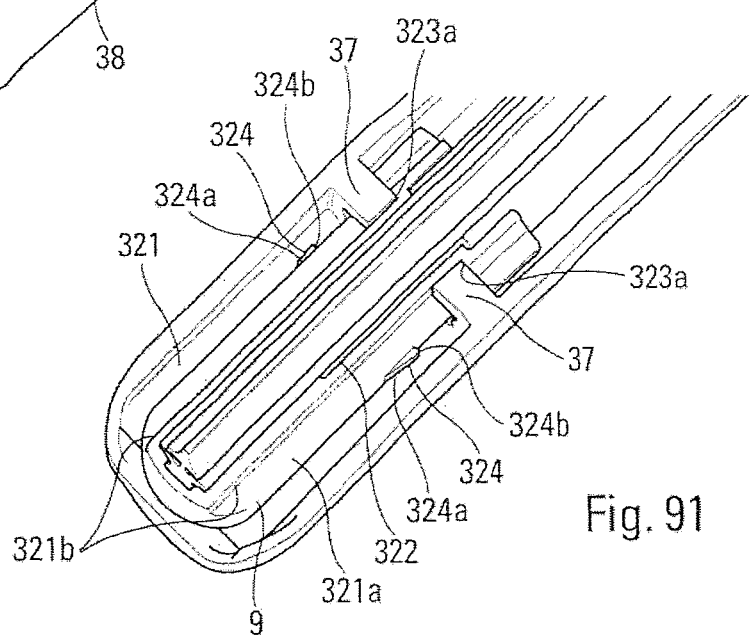
Figure 92:
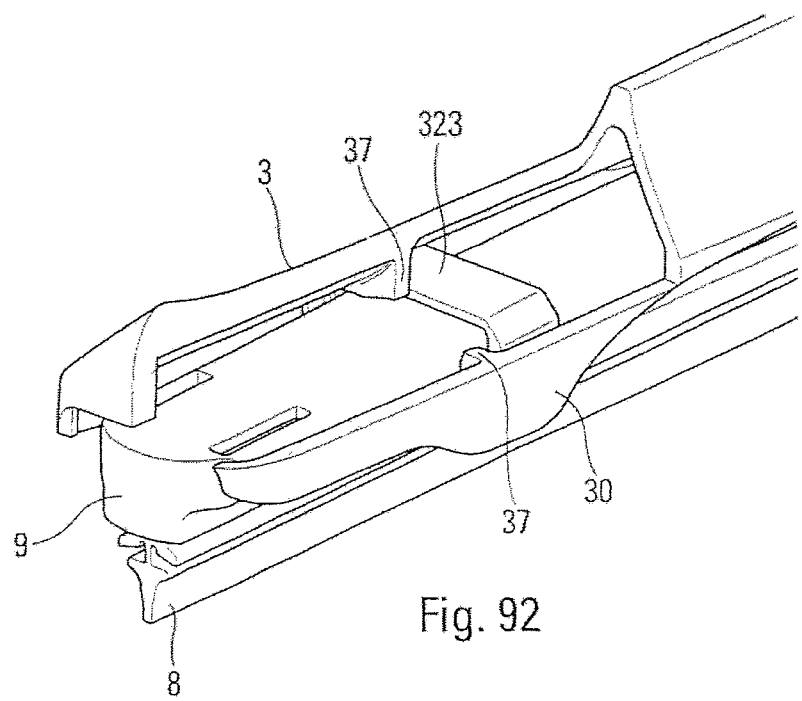

It should be noted that means 321, 321a, 321b for guiding and for longitudinal displacement may be formed on the external face which delimits the end piece 9. By way of example, FIG. 91 shows two shoulders which extend longitudinally along the end piece 9 and in which the hooks 37 are able to slide.

Alternatively, these guide and slide means may be provided on an inner wall delimiting the end piece 9. This wall is therefore internal, if it is within a perimeter defined by the outer wall of the end piece 9.

The end piece comprises on its lower face a longitudinal groove 322 for sliding one end of the heel of the blade 8, said groove opening into the housing 92b of the end piece.

The tracks 321 of the end piece extend on both sides of the groove and each define a first substantially horizontal longitudinal surface 321a and a second substantially vertical longitudinal surface 321b. Each surface 321a is connected by its lower longitudinal edge to the upper longitudinal edge of the corresponding surface 321b.

Each track 321 is connected at a free end, located on the side of the openings of the housings 92b, 92c, to a substantially radial stop surface 323a. The stop surfaces are in this case located on an oversized end part 323 of the end piece 9, which is designed to cooperate by abutment with the hooks 37 of the terminal cap.

As visible in FIG. 91, the end piece 9 also comprises on its sides resilient clipping means 324 which are configured to cooperate with the terminal cap 3 and, more particularly, with the hooks 37 of the cap.

The resilient clipping means 324 are in this case two in number and respectively protrude over two external lateral faces of the end piece 9. They each comprise a ramp 324a having an inclined wall which is configured to cooperate by sliding with the hook 37 and, in particular, its vertical part, and a stop face 324b which is configured to cooperate with the hook after the clipping has taken place.

The clipping means 324 are in this case substantially coplanar and located substantially in the centre of the end piece 9. The end piece in this case comprises a substantially vertical central longitudinal plane of symmetry.

We understand here, that the cooperation between the end piece 9 and the streamlined portion 2, 3, implements a terminal cap 3 which extends longitudinally from the end piece 9 by covering thereof until the central mounting 2.

Reference is now made to FIGS. 94 to 98 which illustrate a further embodiment of the invention in which each end piece 9 is in this case housed in a cage defined by the means of the streamlined portion and, more particularly, of the corresponding terminal cap.

The invention may for example be recognizable by the fact that the streamlined portion, and in particular the cap 3, has an elongated shape and extends, for example between a longitudinal end of the streamlined flat wiper 1 and a central mounting 2. At one of its longitudinal ends, the cover includes a housing for mounting and a longitudinal displacement of the end piece 9 of said wiper. Such housing is a receiving area bounded in part by the longitudinal side walls 3a and 3b of the cap 3. When installed in housing, the end piece 9 is covered by a part of the cap 3, these two assembled elements form an assembly.

According to a particular embodiment of the invention, the streamlined portion comprises two terminal caps 3, and a central mounting 2 which is localised between the two terminal caps and which comprises means 23 for attachment to a stiffening vertebra 6 of the wiper or to a member 7 for retaining of the vertebra. In such a case, each terminal cap 3 comprises a housing at its free longitudinal end, as described above.

Figure 97:
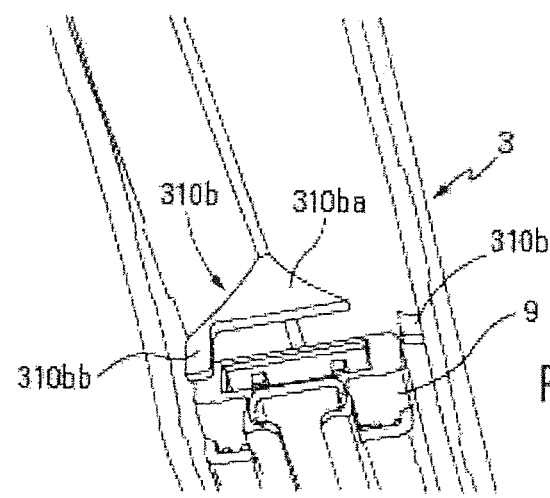

The above description relative to FIGS. 27 to 29 and to FIGS. 89 to 93 applies to FIGS. 94 and 97 in that it does not contradict what follows.

The means for guiding comprising the hooks 37 form the first means of the cage 310c for retaining the end piece 9. The hooks 37 in this case are moved closer to the free end of the terminal cap 3. The hooks 37 extend in this case perpendicular to a first traverse wall or rib 36 in the vicinity of that disclosed with reference to FIGS. 27 to 29. This wall or rib 36 has a height or dimension in the vertical direction referenced H1 which has a maximum value in the region of the lug 38.

The cage 310c for retaining the end piece 9 is for example delimited by the cap 3. Longitudinally, this cage 310c is closed by first and second longitudinal locking means of the end piece 9.

Each of these locking means may be formed by a reinforcing rib formed in the dihedron delimited by the front and the bottom walls of the cap. Such a reinforcing rib extends transversely to the walls 3a and 3b, and consists to a one piece with these walls during the molding operation of the cap 3.

Figure 96:
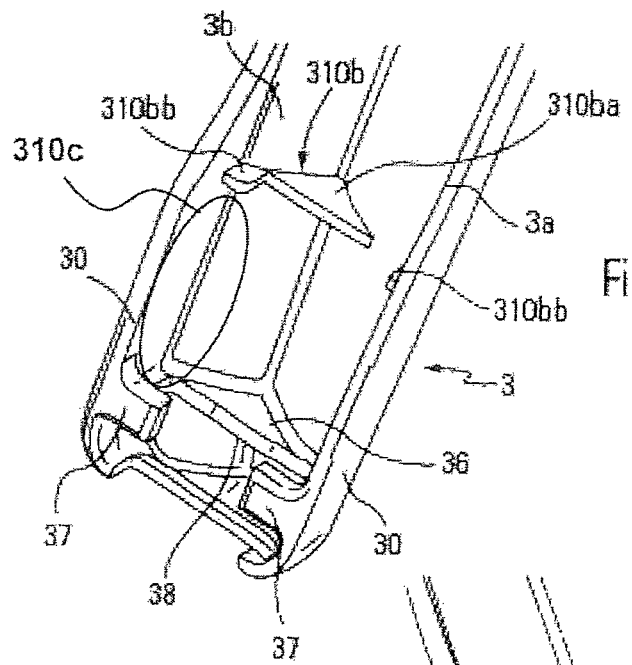
Figure 98:
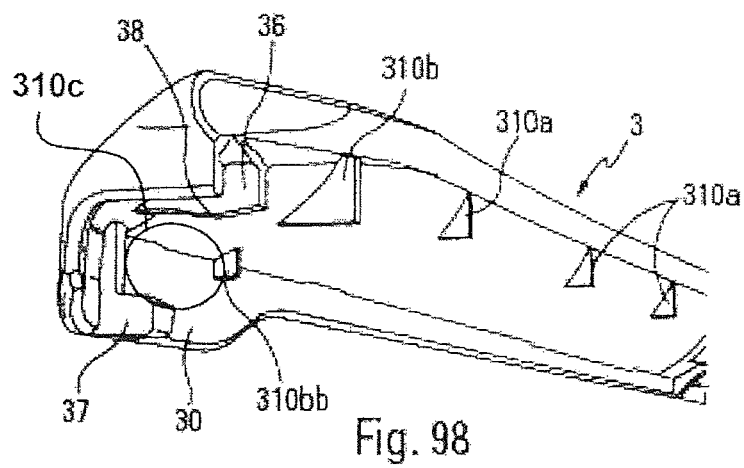

According to another embodiment, a first transverse rib 310b includes a medial portion 310ba extending between the longitudinal lateral walls 3a, 3b of the cap 3. Advantageously, the first rib 310b continues with at least a lateral portion 310bb. In FIGS. 96-98, there are provided two lateral portions 310bb, respectively from the inner faces of the longitudinal lateral walls 3a, 3b which delimit the cap 3. According to an aspect of the invention, at least a portion of said lateral portions comprises 310bb a stop surface configured to cooperate with said end piece 9. This is an embodiment of second stop means against which the end piece 9 comes to lean.

The first and second locking means 37, 310b, 310bb may take a hook shape, such as those described above in connection with the reference 37. Preferably, they comprise at least one pair of lateral hooks 37 in "L" shape and configured to extend from each side of said end piece, for example facing each other and being oriented towards one another. These hooks 37 also form an embodiment of the first stop means against which the end piece is typing to limit its longitudinal displacement relative to the cap 3.

According to an embodiment, each hook 37 comprises a substantially vertical part at the end of which there is a substantially horizontal portion. Thus the hook forms an L.

These horizontal portions extend toward one another. It is advantageous for the abutment function is exclusively performed by the one or more horizontal portions, but the invention also covers the case where the end piece comes to lean simultaneously on the one or more vertical and horizontal portions. It should be noted that each hook 37 can be attached to each other by a bridge, also called second transverse rib 36 connecting the longitudinal lateral walls 3a, 3b. Advantageously, this second rib 36 has a lower edge on which there are formed some means 38 of limited support on said end piece.

The limited support terms means that the support is not achieved on a large transverse distance of the cap 3, but instead on a discrete portion between the end piece 9 and the means of limited support 38.

As visible in FIG. 98, the cap 3 comprises in this case a longitudinal row of a plurality of reinforcing ribs 310a, 310b which are similar to those disclosed above with reference to FIG. 45, in particular.

The cap 3 comprises in this case ribs of different heights, the ribs 310a having a height H2 which is lower than the height H1 of the rib 310b which in turn has a height which is close to that of the aforementioned rib or wall 36.

As visible in FIG. 96, the rib 310b of greater height which is the rib closer to the wall 36 comprises a central portion 310ba which connects the internal lateral faces of the walls 3a, 3b of the cap and lateral portions 310bb which are at least partially located on the aforementioned internal faces of the walls 3a, 3b.

The height of these ribs is measured along a line perpendicular to an edge or free edge of the respective rib, passing through the top 3c formed by the junction of the longitudinal lateral walls 3a, 3b.

As visible in FIG. 97, one of the lateral portions 310bb of the rib 310b, in this case that connected to the wall 3b of the cap, extends substantially opposite the end piece 9 and forms an additional means defining said cage 310c.

The end piece 9 may come into abutment on the transverse face of the portion 310bb oriented on the side of the free end of the cap and on the horizontal parts of the hooks 37 (see FIG. 94).

The above description relative to FIG. 5 and to FIGS. 89 to 93, in particular, applies to the end piece of FIGS. 94 to 98 in that it does not contradict that which follows.

The end piece 9 comprises the housing 92a which is configured to receive an end of the stiffening member 6, and the housing 92b is configured to receive an end of the blade 8 and a lower groove opening into the housing 92b.

As visible in FIG. 95a, the housing 92a does not open onto the side of the lower face of the end piece (onto which the slot 322 opens). The housing 92a is thus closed on the side of the lower face of the end piece 9.

The housing 92a is open on the side of the upper face of the end piece. The end piece 9 comprises on this upper face two openings 325 which are elongated and parallel and which communicate with the housing 92a.

A protruding tab 326 for locking the stiffening member 6 is located in each opening 325. Each tab is resiliently deformable and is configured to cooperate by resilient clipping with a terminal notch of the stiffening member 6, visible in FIG. 6.

The end piece 9 further comprises in each opening 325, protruding elements 327 for centring and guiding the stiffening member 6.

The openings 325 extend in this case on both sides of a strip of material 328 which defines said upper face of the end piece 9 and which comprises at least one protruding element 329 for guiding the end piece. This element 329 is configured to cooperate by sliding with the lug 38 of the wall 36.

The stop surface 323a of the end piece 9 disclosed above is configured to cooperate with the hooks 37, as visible in FIG. 94 and it is the free end of the end piece, the housings 92a, 92b opening in the region thereof, which is designed to cooperate with the aforementioned lateral portion 310bb of the rib 310b.

It is conceivable to produce the end piece 9 of FIGS. 94 to 95b, or any other end piece disclosed in the present application, in a resilient material so that it is resiliently deformable. This feature may be desired so that the end piece may be mounted on the stiffening member 6, in particular by resilient deformation.

With reference to FIG. 94, it is thus conceivable to provide a longitudinal groove 370, shown by dashed lines, in the transverse wall of the end piece which separates the housings 92a, 92b. The groove 370 would open into said housings and would permit a separation of the longitudinal end parts of the end piece, extending on both sides of the groove, by resilient deformation.

In this case, after the mounting of the end piece 9, said end piece would be locked in the mounted position by means of the terminal cap 3 and, in particular, its hooks 37 which would prevent a deformation and inadvertent separation of the end piece during use.

Reference is now made to FIGS. 99a to 100b which show variants in which the wiper is provided with means facilitating the dismantling of the blade 8 for the purpose of the replacement thereof in the case of wear, for example.

The above description relative, in particular, to the terminal caps 3, the end pieces 9, the member 7 and the blade 8 apply to these variants.

Figure 99A:
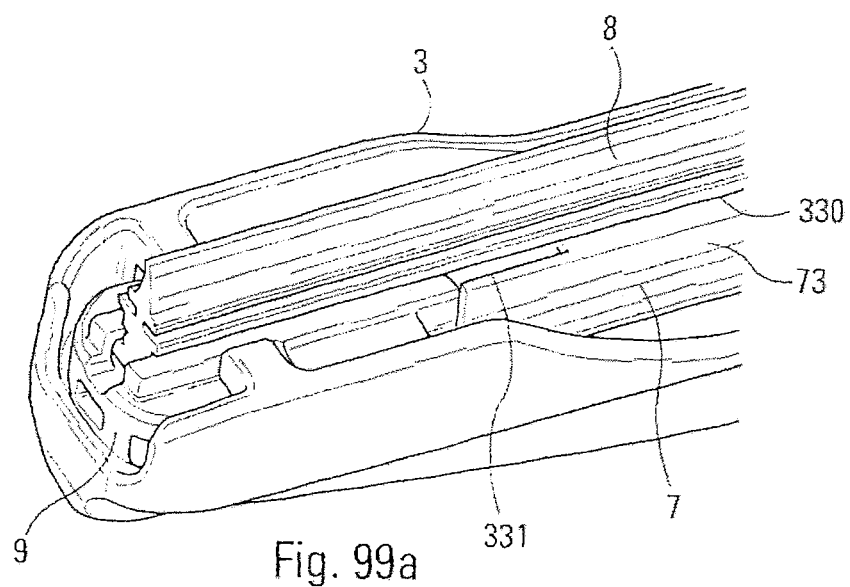
Figure 99B:
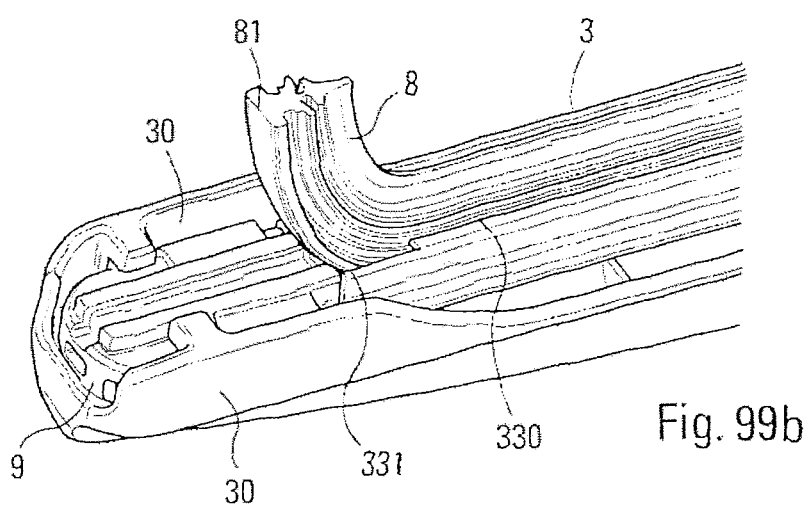

In the variant shown in FIGS. 99a and 99b, it is seen that the substantially horizontal parts opposite the lower hooks 73 of the member 7 delimit relative to one another a groove 330 in which a part of the blade 8 may slide and is mounted.

According to the invention, the member 7 comprises an opening 331 which is connected to the groove 330 and which permits the passage of the heel 81 of the blade 8. In the example shown, the opening 331 is located at one longitudinal end of the member 7 and returns to an oversized portion in the transverse direction of the groove 330. The member 7 may comprise an opening 331 at each of its longitudinal ends, although this is not necessary. The opening 331 has a generally rectangular shape. The opening 331 and the groove 330 are substantially coplanar. The opening 331 in this case has a width or transverse dimension which is greater than that of the heel 81.

Figure 100A:
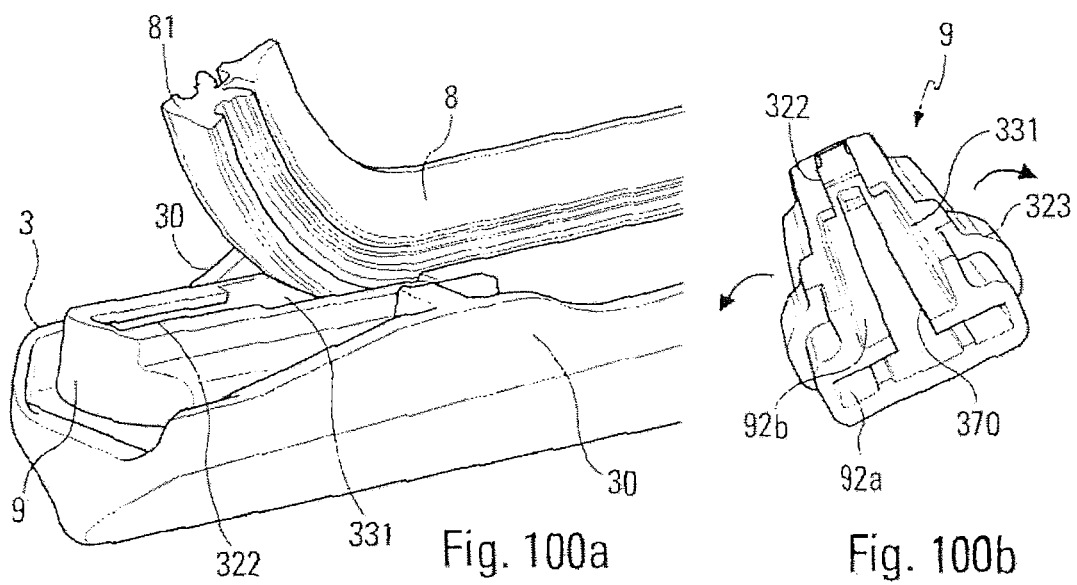
FIG. 100a is a schematic perspective view of a free end of a wiper according to the invention, and shows a step of dismantling a wiper blade from said wiper.
Figure 100B:
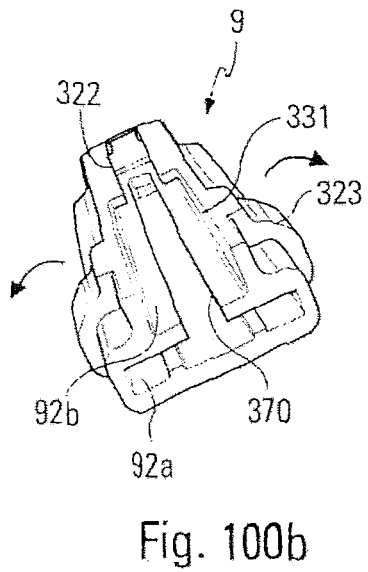
FIG. 100b is a schematic perspective view of the end piece visible in FIG. 100a, FIGS. 101 to 103 are schematic perspective views of means for connecting a streamlined portion according to the invention.

In the other variant shown in FIGS. 100a and 100b, it is the end piece 9 which comprises an opening 331 which is connected to the groove 321 and which permits the passage of the heel 81 of the blade 8. In the example shown, the opening 331 is located at one longitudinal end of the end piece 9 and returns to an oversized portion in the transverse direction of the groove 221. The opening 331 in this case has a width or transverse dimension which is greater than that of the heel 81.

As seen in FIG. 100b and disclosed hereinafter with relation to FIG. 94, the transverse wall for separating the housings 92a, 92b of the end piece is slotted. This wall comprises a longitudinal groove 370 which is substantially aligned in the vertical direction with the aforementioned groove 322 and which is configured to permit a resilient deformation of the end piece according to the arrows, by separation of the longitudinal end parts of the end piece 9, extending on both sides of the groove 370.

As visible in FIGS. 99b and 100a a method for dismantling the wiper blade 8 of a wiper according to the invention may comprise the steps consisting in:

a) sliding one longitudinal end of the heel 81 of the blade 8 in the housing 92a of the end piece 9 or in that defined by the hooks 73 of the member 7, until it is located in the region of the opening 331, at least one part of the blade thus being compressed in the longitudinal direction, b) removing this end of the heel 81 from the housing, via the opening 331, then c) completely removing the blade from said housing via the opening.

Reference is now made to FIGS. 101 to 103 which show a variant and, in particular, a variant of the embodiments described above with reference to FIGS. 9 to 19, the description thereof applying in this case in that it does not contradict what follows.

The finger 4 is designed to be inserted between the reinforcements 32a, 32b in a direction substantially parallel to the longitudinal axis of the finger. The finger comprises on its lateral faces two apertures 41a which, in contrast to those of FIG. 9, are here substantially horizontal and extend substantially between the end free face 44 of the finger 4 and the orifice 41. These apertures 41a are designed to receive and guide the journals 31a, 31b during the mounting of the finger in the aforementioned direction. The face 44 is chamfered here to facilitate this mounting.

Figure 104:
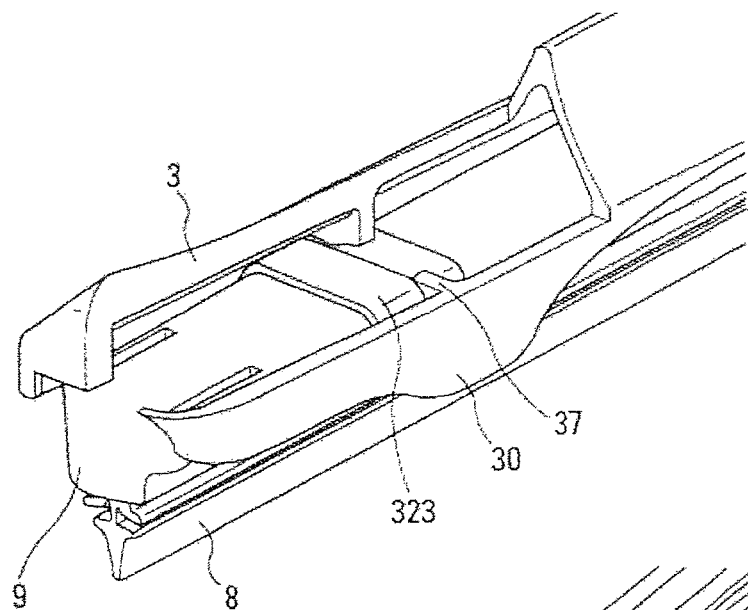
FIGS. 104 and 105 are schematic perspective views of a free end of a wiper according to the invention.
Figure 105:
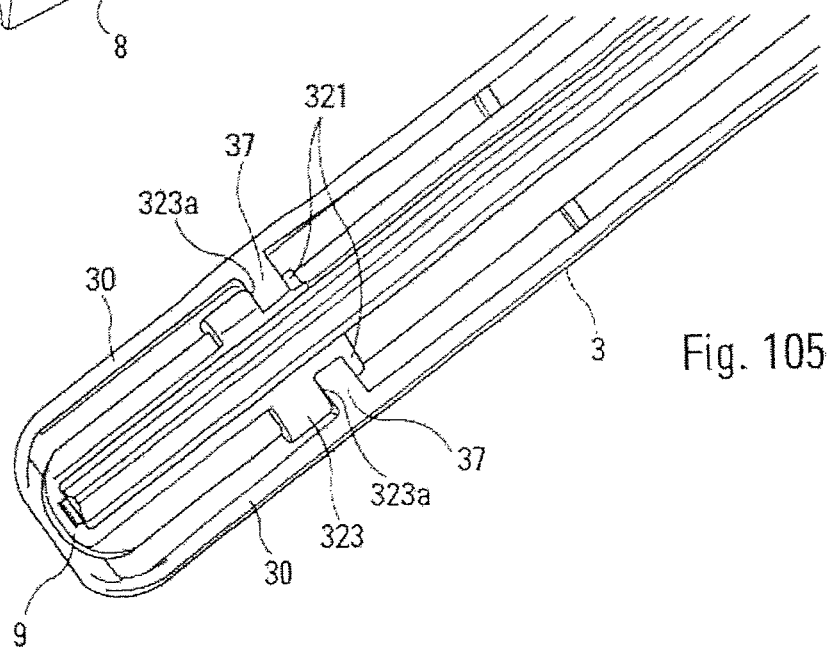

The variant of the invention shown in FIGS. 104 and 105 may be used in combination with the variant of FIGS. 101 to 103, or separately.

The streamlined portion and, in particular, each terminal cap 3 in this case is similar to that disclosed above, with reference to FIGS. 89 to 93, in particular, and comprises means for guiding designed to cooperate with the end piece 9.

The above description relative to FIGS. 89 to 93 applies, therefore, in this case in that it does not contradict what follows.

The end piece 9 differs from that disclosed above, in particular, in that its overthickness 323 in this case is axially remote from its longitudinal ends. The tracks 321 of the end piece extend in this case between the overthickness and the free end of the end piece, the housings for receiving the stiffening member and the blade 8 opening in the region thereof.

The stop surfaces 323a of the overthickness, designed to cooperate with the hooks 37 of the terminal cap 3, are in this case oriented on the side of said free end of the end piece. This cooperation permits the path of the end piece to be limited in the longitudinal direction, on the side opposing the free end of the cap 3. When this variant is associated with that of FIGS. 101 to 103, it enables the journals 31a, 31b to be prevented from leaving the orifice 41 of the finger 4.

Figure 106:
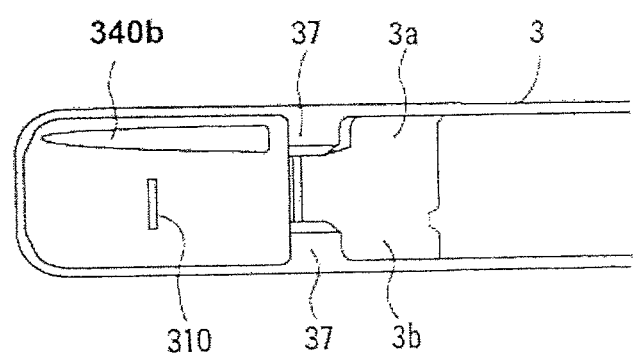
FIG. 106 is a schematic perspective view of a free end of a streamlined portion or terminal cap according to the invention.

As visible in FIG. 106, the hooks 37 of each terminal cap 3 are not necessarily perfectly symmetrical relative to a substantially vertical central longitudinal plane. In the example shown, the hook of the wall 3a has a longitudinal dimension which is greater than that of the hook of the wall 3b.

Figure 107:
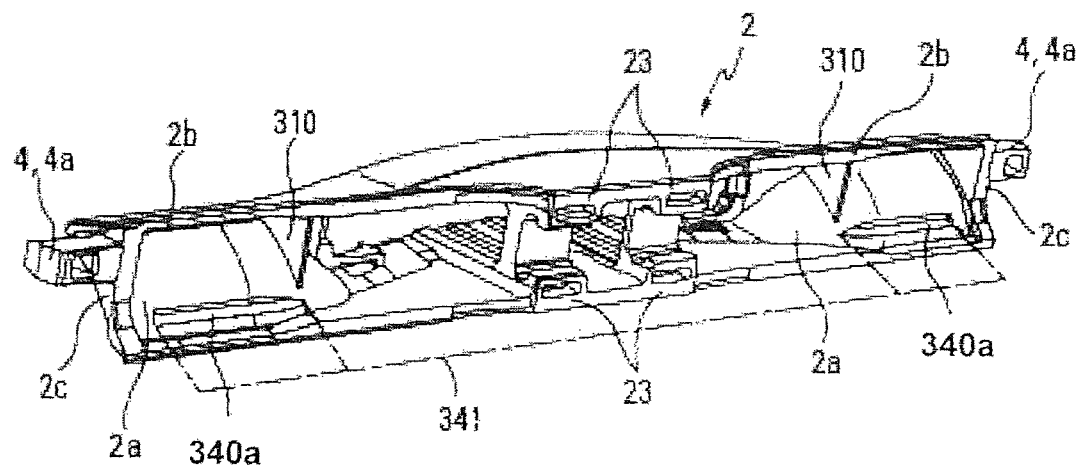
FIG. 107 is a schematic perspective view of a central mounting according to the invention.
Figure 108:
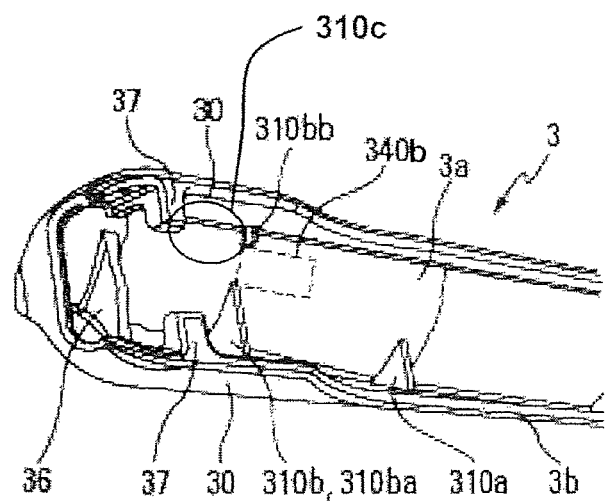
FIG. 108 is a schematic perspective view of an end of a streamlined portion or terminal cap according to the invention.

The variant of FIG. 106 also shows a further embodiment of the invention which is also illustrated by the following FIGS. 107 and 108.

According to this embodiment, at least one of the lower or internal faces of the walls 2a, 2b, 3a, 3b of the streamlined portion comprises a groove 340a and/or 340b which is configured to permit the mounting and/or the sliding of an element of the wiper or an element for supporting the wiper.

When the groove is provided in the central mounting 2, it is called first groove 340a. Similarly, when the groove is formed in a or the terminal cap 3 it is called second groove 340b, without however be dependent of the firstly character of the first groove.

In the case of FIGS. 106 and 108, at least a terminal cap 3 comprises a second groove 340b for receiving and sliding one part of the end piece 9 designed to be associated with the cap.

Each second groove 340b has a substantially longitudinal orientation. It is located on the internal face of the wall 3a. In FIG. 106, it extends substantially between a hook 37 and the free end of the cap. In FIG. 107, it is shown schematically by a rectangle in dashed lines and extends from the rib 310b (described above) in the direction of the end of the cap designed to be connected to the mounting. The second groove 340b of FIG. 108 is located between the aforementioned parts 310ba, 310bb of the rib 310b.

In the case of FIG. 107, the central mounting 2 comprises at least a first groove 340a at each of its longitudinal ends, on the internal face of its wall 2a. These first grooves 340a are designed to receive parts of an element 341 used to straighten the bend of the wiper which is schematically shown by the dashed lines.

The element 341 is, for example, a straightedge which permits the wiper to be raised and to limit its curvature, in order to facilitate its assembly. It protects the rubber blade too. It may be kept in the storage and display packaging of the wiper but it is naturally removed before mounting on a vehicle.

Each first groove 340a has a substantially longitudinal orientation. It extends substantially between a longitudinal end of the mounting 2 and a reinforcing rib 310. The first grooves 340a of the mounting 2 are substantially aligned. They extend in this case substantially in a substantially horizontal longitudinal plane passing through the lower free ends of the walls 2b of the mounting. This plane passes substantially through the lower free ends of the transverse walls 2c of the mounting.

Reference is now made to FIGS. 109a to 109i which illustrate the steps of mounting a streamlined flat windscreen wiper according to the invention, the different parts thereof having been described above.

Figure 109A:
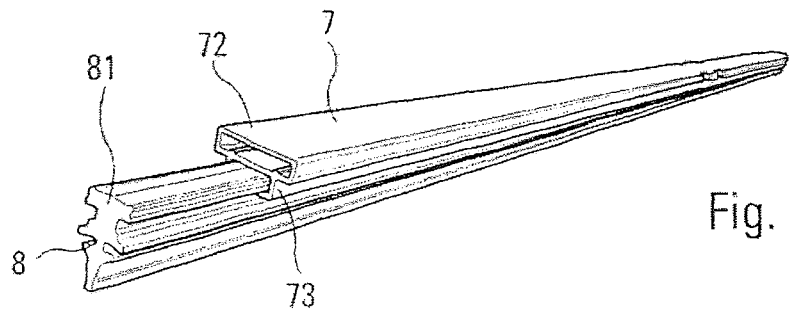
FIGS. 109a to 109i are schematic perspective views of a wiper according to the invention and showing the steps for mounting this wiper.
Figure 109B:
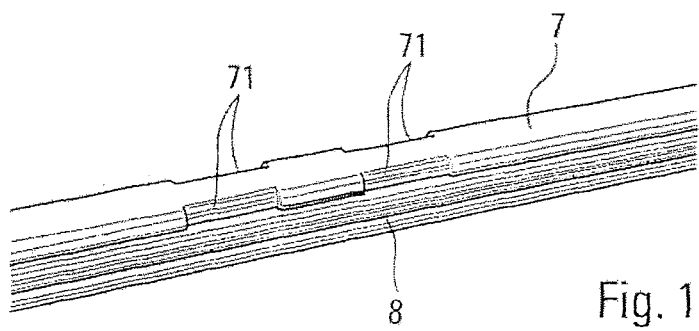
Figure 109C:
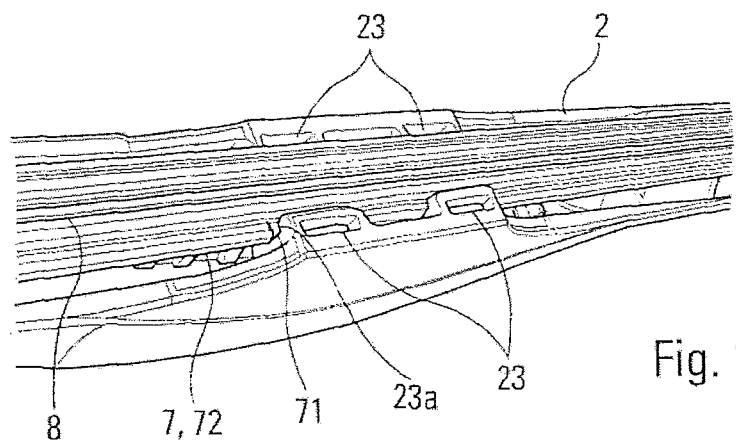

According to a first step, noted d) the blade 8 is mounted on the member 7 by inserting and sliding its heel 81 between the hooks 73 of the member (FIG. 109a).

Figure 109D:
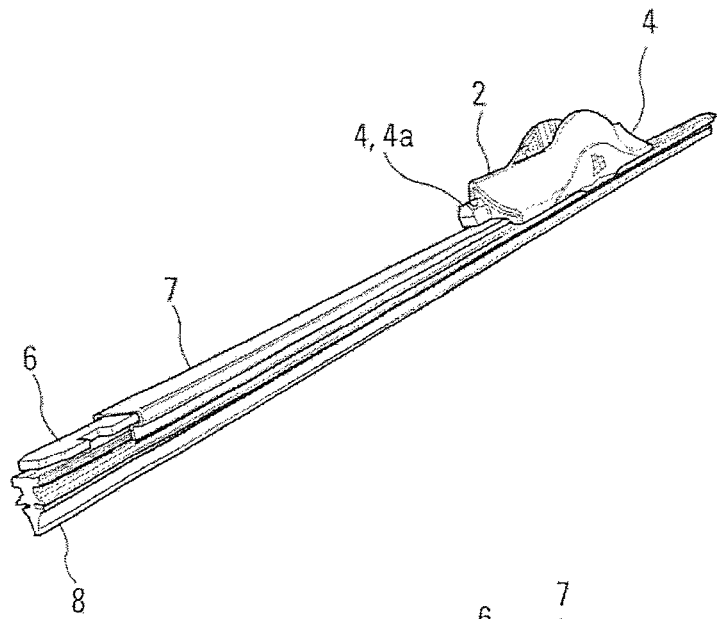
Figure 109E:
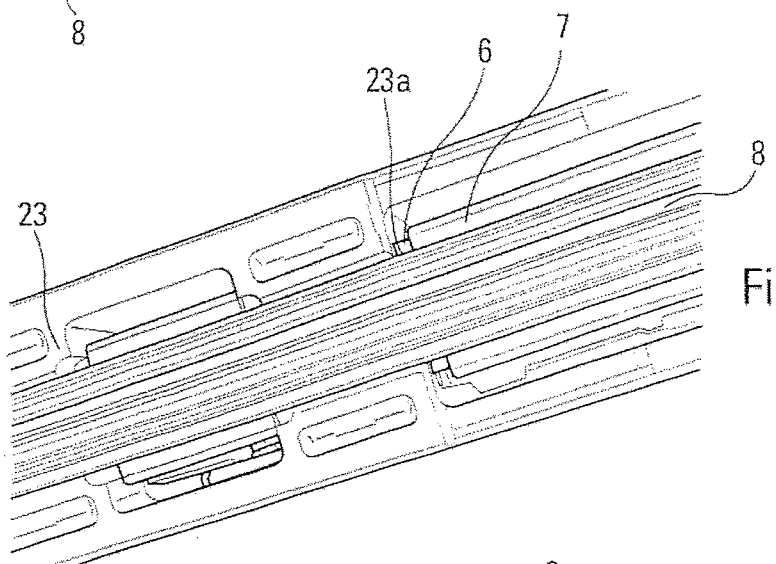

According to a second step, noted c) the central mounting 2 is mounted on the member 7 so that its hooks 23 engage in the notches 71 of the tube 72 of the member and that its grooves 23a are coplanar to the internal housing of the tube 72 (sub-step c1—FIGS. 109 and 109c), then the stiffening member 6 is inserted by longitudinal sliding in the aforementioned housing of the tube 72 and into the grooves 23a of the hooks of the mounting 2, which ensures the retention of the mounting relative to the stiffening member and vice versa (sub-step c2—FIGS. 109d and 109e).

Figure 109F:
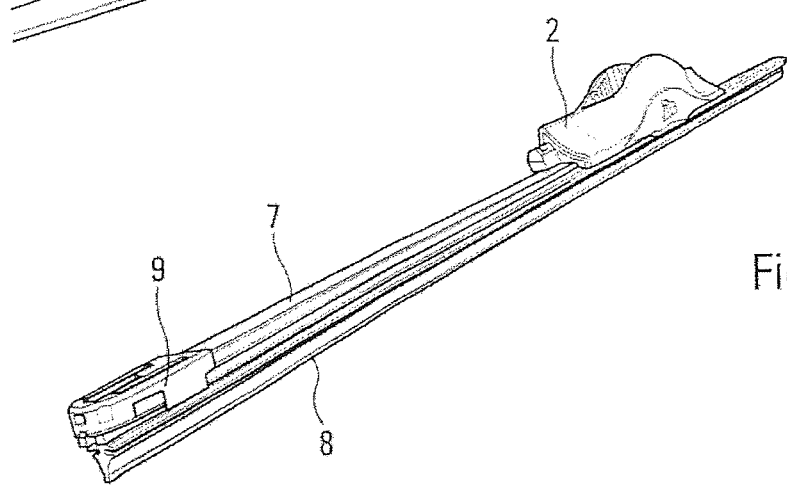

According to a further step, noted a) the end pieces 9 are mounted on the stiffening member 6 (FIG. 109f). They may be mounted simultaneously in an automated manner.

Figure 109G:
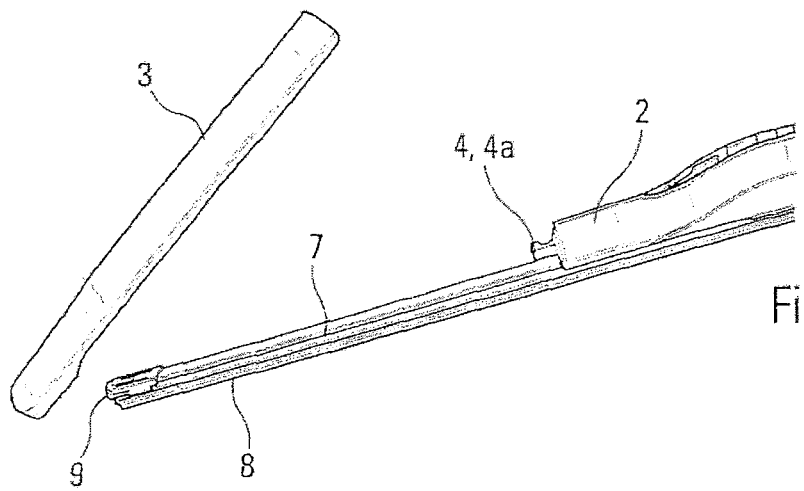
Figure 109H:
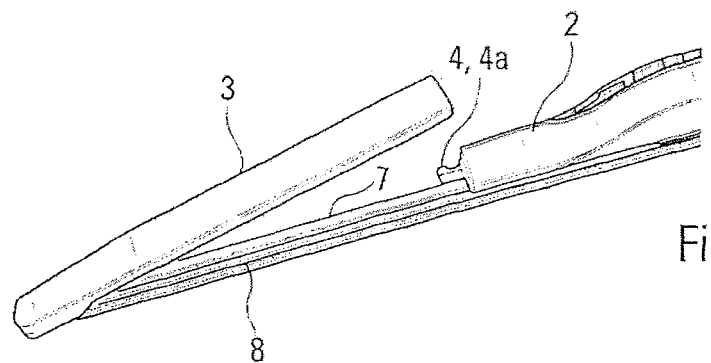
Figure 109I:
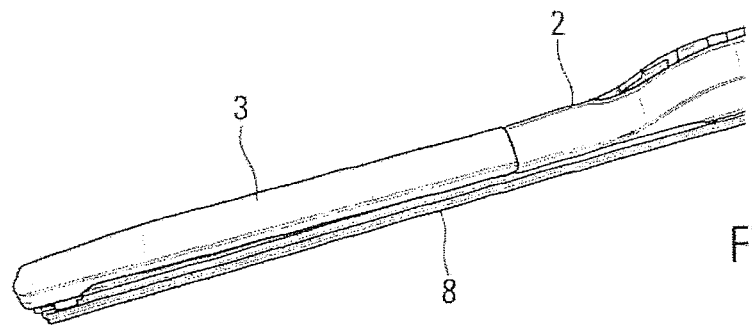

According to a further step noted b), the terminal caps 3 are mounted on the end pieces 9 and the central mounting 2 (FIGS. 109g to 109i). To achieve this, each terminal cap is shown as seen in FIGS. 109g and 109h so as to engage the corresponding end piece 9 in the free longitudinal end of the cap (sub-step b1). The cap 3 is then inclined relative to the stiffening member, in particular. The opposing longitudinal end of the cap 3 is then folded down toward the mounting 2 so that the fingers 4a, 4b or the means for connecting the cap to the mounting cooperate together and are assembled so as to form the articulation between the cap and the mounting. Said sub-steps are carried out for each cap 3.

It is the cooperation of the means for connecting, such as the engagement and interlocking of the fingers 4a, 4b with one another, which ensures the locking of the assembly. The wiper is preferably of the undetachable type as explained above.

The method of mounting may comprise a preliminary step consisting in subjecting the stiffening member to stress so that it has a substantially rectilinear shape during at least some of the aforementioned steps. This preliminary step may be implemented by means of the aforementioned support element 341 of FIG. 107.

Reference is now made to FIGS. 110 to 114 which show several variants in which the streamlined flat wiper 1 is provided with means for heating and/or means for fluid distribution.

FIGS. 110 and 111 show the means for the electrical supply 350 of the means for heating the wiper, which here comprise electrical wires which extend along the drive arm 10 of the wiper and are connected to the means for heating the wiper. These figures also show the means for the supply of fluid 360 to the means for fluid distribution of the wiper, which comprise in this case flexible tubes and/or channels which either extend along the drive arm 10 of the wiper (FIG. 110) or are integrated or mounted on one of the end pieces 9 of the wiper, said means 360 being connected to the means for fluid distribution of the wiper 1.

FIG. 112 shows an embodiment of the means for heating 351 which comprise a track of an electrical conductor made of resistive material. The means for heating 351 in this case are carried by the stiffening member 6 and are located on the upper longitudinal face thereof. They may be connected to the aforementioned electrical wires by means of connectors located substantially in the centre of the wiper.

Alternatively, an embodiment may consist in that the means for heating 351, comprising at least one track of an electrically conductive resistive material, are localised on the lower longitudinal side of the spline 6. The term lower longitudinal side corresponds to the side facing the back of the heel 81 of the wiping blade 8.

Figure 113:
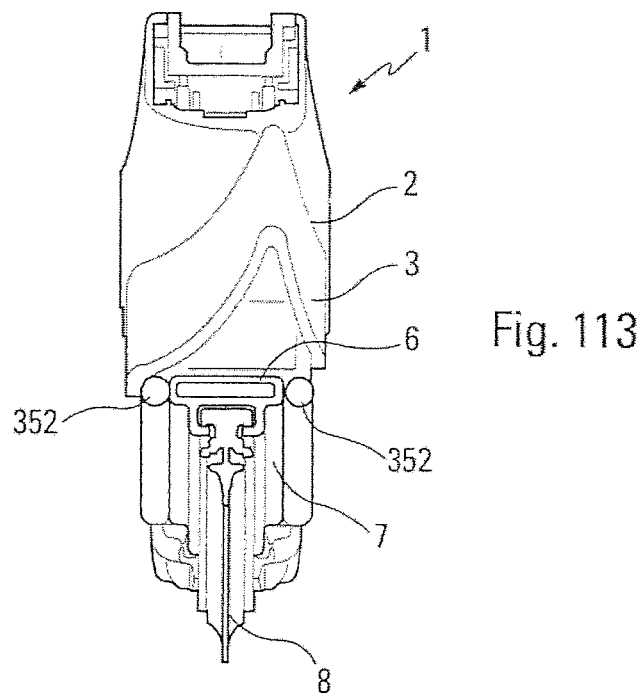
FIGS. 113 and 114 are schematic perspective views of a wiper according to the invention, provided with means for fluid distribution.
Figure 114:
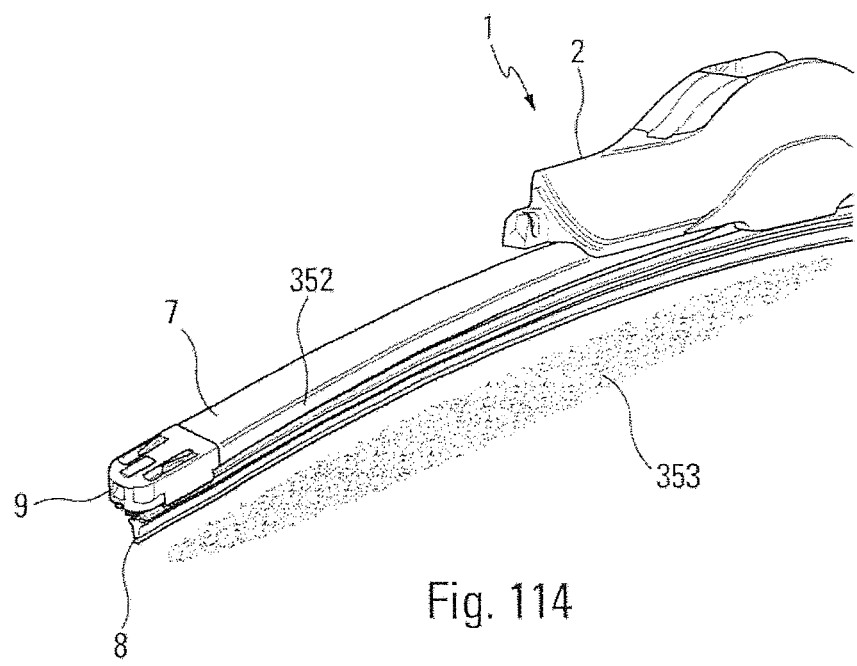

FIGS. 113 and 114 show an embodiment of the means for fluid distribution 352 which here comprise two spray lines for spraying fluid such as windscreen washer fluid on the window of a vehicle (FIG. 114). The spray lines respectively extend from the two sides of the wiper and comprise orifices for spraying onto the window. The reference 353 denotes the area of impact of the liquid on the window.

The spray lines in this case are carried by the member 7 and may be fixed to the member, such as on the sides of its tube, or formed in one piece with the member.

Figure 115:
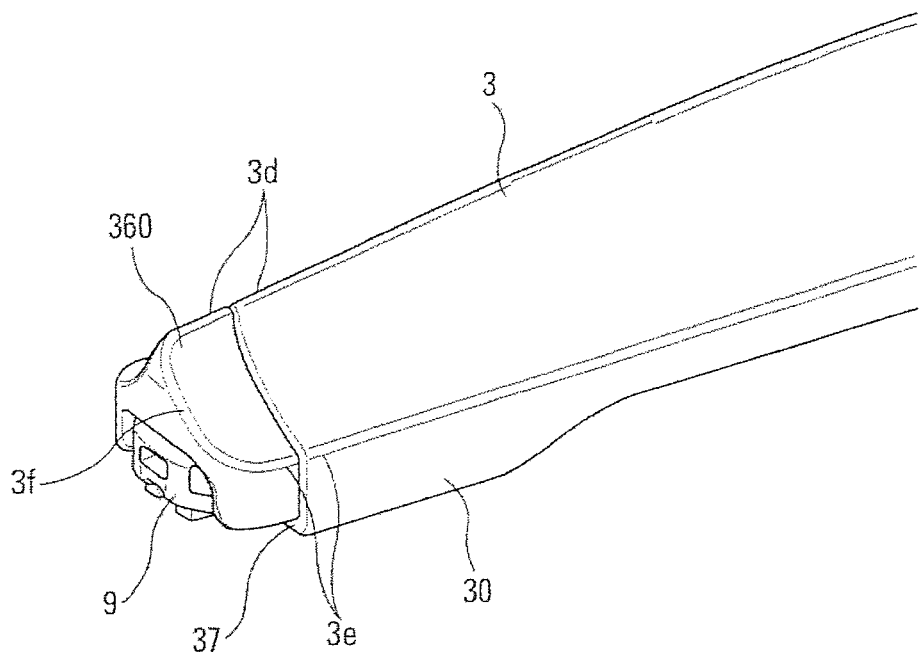
FIGS. 115 and 116 are schematic perspective views, respectively of one end of a wiper according to the invention and an end piece of said wiper.
Figure 116:
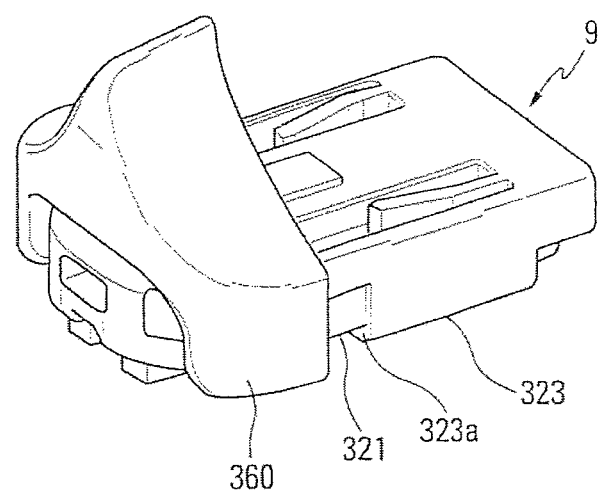

FIGS. 115 and 116 show a variant of the embodiment of the invention disclosed above in relation to FIGS. 79 to 81d.

The above description made with reference to FIGS. 79 to 81d, thus applies to this variant in that it does not contradict what follows.

A second baffle is in this case carried by each end piece 9 which bears a streamlined element 360. This streamlined element 360 defines a free end part of the streamlined portion of the wiper and thus replaces the free end part of the corresponding terminal cap. The streamlined element 360 is thus identical to the free end part of the terminal cap 3 disclosed above, and comprises an end portion of the top edge 3d, an end portion of the lower longitudinal edge 3e of the wall 3a of the cap, in addition to the terminal edge 3f which connects the edge 3d to the edge 3e and which defines a second baffle.

The streamlined element 360 may be connected and fixed to the end piece 9 or formed in one piece therewith. The end piece 9 is similar to that described above with reference to FIGS. 95a and 95b, in particular. The streamlined element 360 in this case is located on the longitudinal end of the end piece, opposing the openings of the housings of the end piece.

The terminal cap 3 comprises guide hooks 37, similar to those described above, which cooperate with the tracks 321 of the end piece 9 and which extend here between the overthickness 323 and the streamlined element 360. The hooks 37 of the cap 3 may cooperate by abutment, on the one hand, with the aforementioned stop surfaces 323a and, on the other hand, with the transverse faces opposing the streamlined element 360.

The invention claimed is:

1. A streamlined portion for a streamlined flat windscreen wiper for a vehicle, the streamlined portion having an elongated shape and comprising:
   two terminal caps; and
   a monolithic central mounting elongated in a longitudinal direction and extending between the terminal caps, and that comprises, at its longitudinal ends, fingers that connect the mounting to the terminal caps, the mounting comprising:
      an aperture which is configured to receive an adapter for connecting the wiper to a drive arm of said wiper, the aperture having an elongated shape and extending between two longitudinal lateral walls,
      a transverse pin for the articulation of the adapter extending therebetween,
   wherein the ratio between the longitudinal distance between a first transverse plane passing substantially through said transverse pin and a second transverse plane passing substantially through the fingers that connect the mounting to each cap, and half of the length of the streamlined portion, ranges between 20 and 70%,
   wherein the mounting comprises a plurality of hooks on each side, the plurality of hooks fixing the mounting to a stiffening member or to a member for retaining said stiffening member, and
   wherein the fingers and the plurality of hooks are inseparably extended from an outermost surface of the mounting, and the plurality of hooks are located in the longitudinal center of the mounting.

2. The streamlined portion according to claim 1, wherein the ratio ranges between 27 and 59%.

3. The streamlined portion according to claim 1, wherein the fingers are structured to allow for articulation.

4. The streamlined portion according to claim 1, wherein at least one of the elements from the mounting and the caps forms or comprises an aerodynamic baffle.

5. The streamlined portion according to claim 1, wherein at least one of the elements from the mounting and the caps comprises two longitudinal lateral walls, the first longitudinal edges thereof being connected together so that said walls form substantially a dihedron over at least one part of the longitudinal dimension of the element.

6. The streamlined portion according to claim 5, wherein the dihedron defines an upper longitudinal edge of the mounting or the cap.

7. The streamlined portion according to claim 6, wherein said edge extends substantially parallel to and spaced apart from a central longitudinal plane of the aperture.

8. The streamlined portion according to claim 1, wherein said longitudinal lateral walls comprise, opposite said first longitudinal edges, second longitudinal edges which are free or connected to longitudinal lateral flanges, wherein a first longitudinal end of the adapter is oriented toward a first longitudinal end of the aperture in a first mounting position, wherein the first longitudinal end of the adapter is oriented toward a second opposing longitudinal end of the aperture in a second mounting position, and wherein the first mounting position and the second mounting position permit mounting of the adapter in opposite directions in the aperture.

9. The streamlined portion according to claim 8, wherein the second longitudinal edge of one of said longitudinal lateral walls is located substantially in a first substantially horizontal longitudinal plane which is spaced apart from a second substantially horizontal longitudinal plane passing substantially through the second longitudinal edge of the other of said longitudinal lateral walls.

10. The streamlined portion according to claim 8, wherein said lateral flanges are connected to means which are configured to guide in translation the member for retaining said stiffening member.

11. The streamlined portion according to claim 10, wherein said lateral flanges are connected together by a transverse wall, a passage being formed therein for the guidance of said member.

12. The streamlined portion according to claim 1, wherein the mounting has a length ranging between 15 and 30 cm.

13. A streamlined flat windscreen wiper for a vehicle, comprising a streamlined portion according to claim 1.

* * * * *